(12) United States Patent
Fosler

(10) Patent No.: US 11,616,258 B2
(45) Date of Patent: Mar. 28, 2023

(54) DISTRIBUTED CELL FORMATION SYSTEMS FOR LITHIUM CONTAINING SECONDARY BATTERIES

(71) Applicant: Enovix Operations Inc., Fremont, CA (US)

(72) Inventor: Ross M. Fosler, Snohomish, WA (US)

(73) Assignee: Enovix Corporation, Fremont, CA (US)

( * ) Notice: Subject to any disclaimer, the term of this patent is extended or adjusted under 35 U.S.C. 154(b) by 0 days.

(21) Appl. No.: 17/851,955

(22) Filed: Jun. 28, 2022

(65) Prior Publication Data

US 2023/0006269 A1  Jan. 5, 2023

Related U.S. Application Data

(60) Provisional application No. 63/202,930, filed on Jun. 30, 2021.

(51) Int. Cl.
*H01M 10/42* (2006.01)
*H01M 10/0525* (2010.01)
(Continued)

(52) U.S. Cl.
CPC ... *H01M 10/4257* (2013.01); *H01M 10/0525* (2013.01); *H01M 10/46* (2013.01); *H01M 10/486* (2013.01); *H01M 2010/4278* (2013.01)

(58) Field of Classification Search
CPC ......... H01M 10/4257; H01M 10/0525; H01M 10/46; H01M 10/486; H01M 2010/4278
(Continued)

(56) References Cited

U.S. PATENT DOCUMENTS 6,335,115 B1  1/2002  Meissner
7,846,571 B2  12/2010  Christensen et al.
(Continued)

FOREIGN PATENT DOCUMENTS

JP  2011054324 A  3/2011
JP  2017208177 A  11/2017
(Continued)

OTHER PUBLICATIONS

International Search Report and Written Opinion issued for PCT/US2022/035282, European Patent Office, dated Dec. 16, 2022 (18 pages).
(Continued)

*Primary Examiner* — Gary D Harris
(74) *Attorney, Agent, or Firm* — Armstrong Teasdale LLP

(57) ABSTRACT

A cell formation system for lithium containing secondary batteries includes a population of formation clusters, each formation cluster includes a connector configured for connecting to a lithium containing secondary battery, a charging module connected to the connector and configured to charge the battery, a pre-lithiation module connected to the connector and configured to diffuse lithium to electrode active material layers of the battery, a discharging module connected to the connector and configured to discharge the battery, and a communication interface for communicatively coupling the formation cluster to a central controller. In response to received instructions from the central controller, the formation cluster is configured to charge the battery using the charging module, diffuse lithium to the electrode active material layers of the battery using the pre-lithiation module, and discharge the secondary battery using the discharging module after lithium has been diffused to the electrode active material layers of the battery.

15 Claims, 28 Drawing Sheets

(51) Int. Cl.
*H01M 10/46* (2006.01)
*H01M 10/48* (2006.01)

(58) Field of Classification Search
USPC ....................................................... 429/218.1
See application file for complete search history.

(56) References Cited

U.S. PATENT DOCUMENTS

| | | |
|---|---|---|
| 9,190,694 B2 | 11/2015 | Lopez et al. |
| 9,991,490 B2 | 6/2018 | Ramasubramanian et al. |
| 10,256,507 B1 | 4/2019 | Busacca et al. |
| 10,770,760 B2 | 9/2020 | Castledine et al. |
| 10,991,477 B2 | 4/2021 | Ota et al. |
| 11,043,823 B2 | 6/2021 | Matthews et al. |
| 11,128,020 B2 | 9/2021 | Busacca et al. |
| 11,189,866 B2 | 11/2021 | Moon et al. |
| 11,211,639 B2 | 12/2021 | Busacca et al. |
| 2009/0208834 A1 | 8/2009 | Ramasubramanian et al. |
| 2010/0015528 A1 | 1/2010 | Howard et al. |
| 2012/0045670 A1 | 2/2012 | Constantin et al. |
| 2013/0149560 A1 | 6/2013 | Viavattine et al. |
| 2017/0155167 A1* | 6/2017 | Abe .................. H01M 10/0525 |
| 2017/0279113 A1 | 9/2017 | Ohsawa et al. |
| 2017/0279164 A1* | 9/2017 | Herrema ............. H01M 10/484 |
| 2019/0393564 A1 | 12/2019 | Miura |
| 2020/0321612 A1 | 10/2020 | Chae et al. |
| 2020/0381785 A1 | 12/2020 | Castledine et al. |

FOREIGN PATENT DOCUMENTS

| | | |
|---|---|---|
| JP | 2020535614 A | 12/2020 |
| WO | 2012047596 A2 | 4/2012 |
| WO | 2022212436 A1 | 10/2022 |
| WO | 2022221056 A2 | 10/2022 |

OTHER PUBLICATIONS

International Search Report and Written Opinion issued for PCT/US2022/035471, European Patent Office, dated Nov. 21, 2022 (14 pages).

International Search Report and Written Opinion issued for PCT/US2022/035467, European Patent Office, dated Nov. 18, 2022 (13 pages).

* cited by examiner

DISTRIBUTED CELL FORMATION SYSTEMS FOR LITHIUM CONTAINING SECONDARY BATTERIES

CROSS-REFERENCE TO RELATED APPLICATIONS

This application claims priority to U.S. Provisional Patent Application No. 63/202,930, filed Jun. 30, 2021, the disclosure of which is hereby incorporated by reference in its entirety.

FIELD

The field of the disclosure relates generally to the formation of secondary batteries, and more specifically, to distributed cell formation systems for lithium containing secondary batteries.

BACKGROUND

In rocking-chair battery cells, both the positive electrode and the negative electrode of a secondary battery comprise materials into which a carrier ion, such as lithium, inserts and extracts. As the battery is discharged, carrier ions are extracted from the negative electrode and inserted into the positive electrode. As the battery is charged, the carrier ions are extracted from the positive electrode and inserted into the negative electrode.

Silicon has become a promising candidate to replace carbonaceous materials as the anode because of its high specific capacity. For instance, graphite anodes formed from $LiC_6$ may have a specific capacity of about 370 milli-amp hours per gram (mAh/g), while crystalline silicon anodes formed from $Li_{15}Si_4$ may have a specific capacity of about 3600 mAh/g, a nearly 10 fold increase over graphite anodes. However, the use of silicon anodes has been limited, due to the large volumetric changes (e.g., 300%) in silicon when Li carrier ions are inserted into silicon anodes. This volumetric increase along with the cracking and pulverization associated with the charge and discharge cycles has limited the use of silicon anodes in practice. In addition, the use of silicon anodes has been limited due to its poor initial columbic efficiency (ICE), which leads to a capacity loss during the initial formation of secondary batteries that utilize silicon anodes.

After a lithium containing secondary battery is assembled, the assembled battery is typically subjected to a formation process. During the formation process the battery is slowly charged and discharged one or more times. At least some known formation processes include a pre-lithiation process to add lithium to the battery. These formation processes are typically performed by large centralized systems. Such systems include a central control center that is connected to all of the batteries that are to undergo the formation process. The central control center directly controls the charging, discharging, and (where applicable) pre-lithiation of all of the batteries to which it is connected. In order to be capable of controlling the formation processes and distributing electrical power to a large number of batteries, the central control centers are relatively large and expensive systems using a significant amount of power, occupying a significant amount of space, and utilizing a large amount of wire to connect to all of the batteries undergoing formation.

BRIEF DESCRIPTION

In one aspect, a cell formation system for lithium containing secondary batteries includes a population of formation clusters. Each formation cluster of the population of formation clusters includes a connector configured for connecting to a lithium containing secondary battery. Each lithium containing secondary battery includes a population of bilayers, an electrode busbar, and a counter-electrode busbar. Each bilayer of the population of bilayers includes an electrode structure, a separator structure, and a counter-electrode structure. The electrode structure of each member of the bilayer population includes an electrode current collector and an electrode active material layer, and the counter-electrode structure of each member of the bilayer population includes a counter-electrode current collector and a counter-electrode active material layer. Each formation cluster of the population of formation clusters also includes: a charging module connected to the connector and configured to charge the lithium containing secondary battery connected to the connector; a pre-lithiation module connected to the connector and configured to diffuse lithium to the electrode active material layers of the lithium containing secondary battery connected to the connector; a discharging module connected to the connector and configured to discharge the lithium containing secondary battery connected to the connector; and a communication interface for communicatively coupling the formation cluster to a central controller. In response to received instructions from the central controller, the formation cluster is configured to: charge the lithium containing secondary battery connected to the connector using the charging module; diffuse lithium to the electrode active material layers of the lithium containing secondary battery using the pre-lithiation module after the lithium containing secondary battery has been charged; and discharge the lithium containing secondary battery using the discharging module after lithium has been diffused to the electrode active material layers of the lithium containing secondary battery using the pre-lithiation module.

In another aspect, a formation cluster for connection to a single lithium containing secondary battery in a cell formation system for lithium containing secondary batteries includes a connector configured for connecting to the lithium containing secondary battery. Each lithium containing secondary battery includes a population of bilayers, an electrode busbar, and a counter-electrode busbar. Each bilayer of the population of bilayers includes an electrode structure, a separator structure, and a counter-electrode structure. The electrode structure of each member of the bilayer population includes an electrode current collector and an electrode active material layer, and the counter-electrode structure of each member of the bilayer population includes a counter-electrode current collector and a counter-electrode active material layer. The formation cluster also includes: a charging module connected to the connector and configured to charge the lithium containing secondary battery connected to the connector; a pre-lithiation module connected to the connector and configured to diffuse lithium to the electrode active material layers of the lithium containing secondary battery connected to the connector; a discharging module connected to the connector and configured to discharge the lithium containing secondary battery connected to the connector; and at least one microcontroller. The at least one microcontroller is programmed to: charge the lithium containing secondary battery connected to the connector using the charging module; diffuse lithium to the electrode active material layers of the lithium containing secondary battery using the pre-lithiation module after the lithium containing secondary battery has been charged; and discharge the lithium containing secondary battery using the discharging module after lithium has been diffused to the electrode active material layers of the lithium containing secondary battery using the pre-lithiation module.

In yet another aspect, a distributed cell formation system for lithium containing secondary batteries includes a central controller and a population of formation clusters positioned apart from the central controller. The central controller includes a processor, a memory, and a communication interface. Each formation cluster is configured to perform multiple steps of a cell formation process for a single lithium containing secondary battery. Each lithium containing secondary battery includes a population of bilayers, an electrode busbar, and a counter-electrode busbar. Each bilayer of the population of bilayers includes an electrode structure, a separator structure, and a counter-electrode structure. The electrode structure of each member of the bilayer population includes an electrode current collector and an electrode active material layer, and the counter-electrode structure of each member of the bilayer population includes a counter-electrode current collector and a counter-electrode active material layer. Each formation cluster includes: a connector configured for connecting to the lithium containing secondary battery; a population of modules, each module of the population of modules configured to perform a different one of the multiple steps on the lithium containing secondary battery connected to the connector; a communication interface communicatively coupled to the central controller; and at least one microcontroller. The at least one microcontroller is programmed to control the population of modules to perform the multiple steps of the cell formation process in response to instructions received from the central controller.

Various refinements exist of the features noted in relation to the above-mentioned aspects. Further features may also be incorporated in the above-mentioned aspects. These refinements and additional features may exist individually or in any combination. For instance, various features discussed below in relation to any of the illustrated embodiments may be incorporated into any of the above-described aspects, alone or in any combination.

DEFINITIONS

Figure 1:
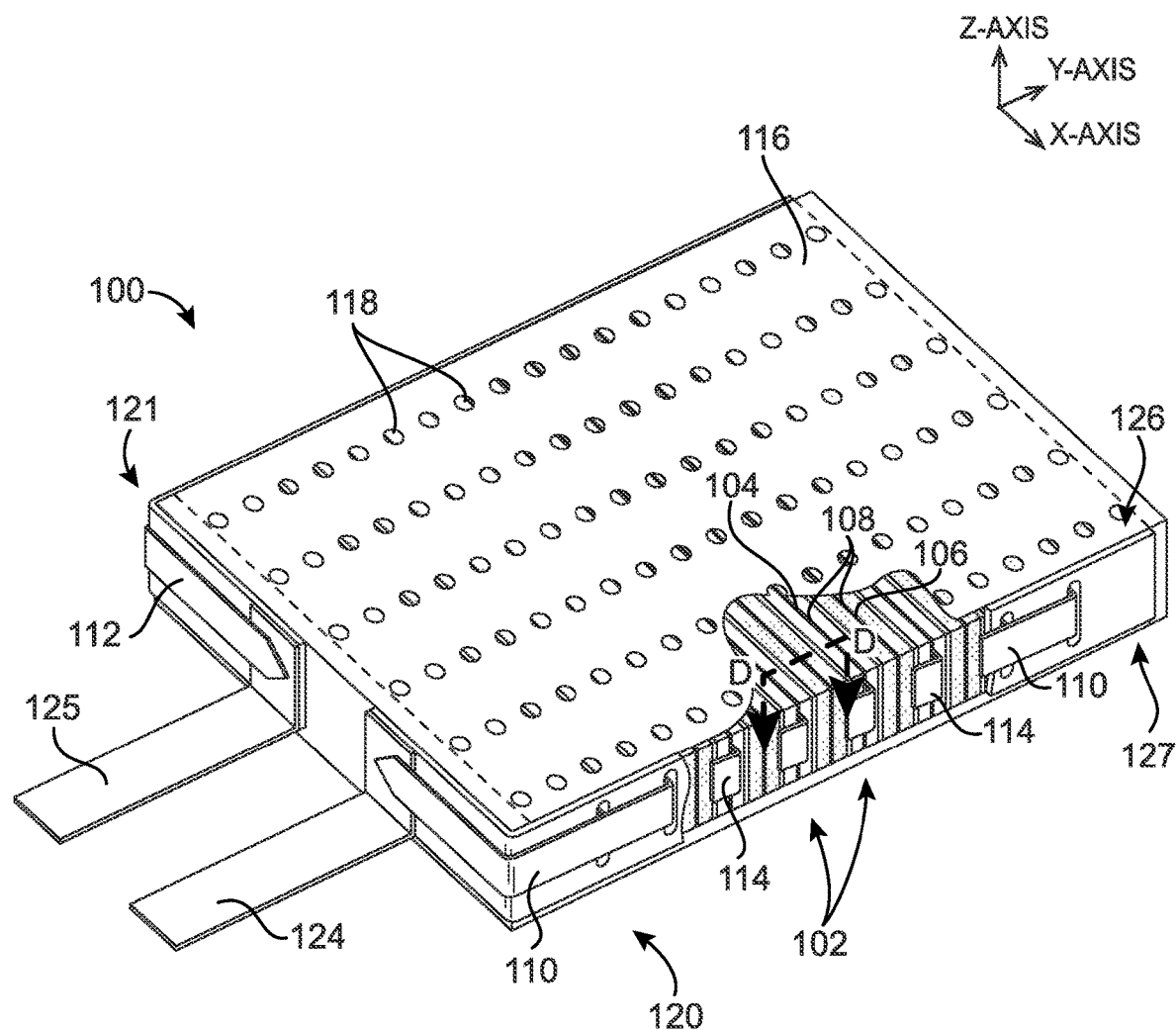
FIG. 1 is a perspective view of a secondary battery of an exemplary embodiment.

"A," "an," and "the" (i.e., singular forms) as used herein refer to plural referents unless the context clearly dictates otherwise. For example, in one instance, reference to "an electrode" includes both a single electrode and a plurality of similar electrodes.

"About" and "approximately" as used herein refers to plus or minus 10%, 5%, or 1% of the value stated. For example, in one instance, about 250 micrometers (µm) would include 225 μm to 275 μm. By way of further example, in one instance, about 1,000 μm would include 900 μm to 1,100 μm. Unless otherwise indicated, all numbers expressing quantities (e.g., measurements, and the like) and so forth used in the specification and claims are to be understood as being modified in all instances by the term "about." Accordingly, unless indicated to the contrary, the numerical parameters set forth in the following specification and attached claims are approximations. Each numerical parameter should at least be construed in light of the number of reported significant digits and by applying ordinary rounding techniques.

"Anode" as used herein in the context of a secondary battery refers to the negative electrode in the secondary battery.

"Anode material" or "Anodically active" as used herein means material suitable for use as the negative electrode of a secondary battery "Cathode" as used herein in the context of a secondary battery refers to the positive electrode in the secondary battery "Cathode material" or "Cathodically active" as used herein means material suitable for use as the positive electrode of a secondary battery.

"Conversion chemistry active material" or "Conversion chemistry material" refers to a material that undergoes a chemical reaction during the charging and discharging cycles of a secondary battery.

"Counter-electrode" as used herein may refer to the negative or positive electrode (anode or cathode), opposite of the Electrode, of a secondary battery unless the context clearly indicates otherwise.

"Counter-electrode current collector" as used herein may refer to the negative or positive (anode or cathode) current collector, opposite of the Electrode current connector, of a secondary battery unless the context clearly indicates otherwise.

"Cycle" as used herein in the context of cycling of a secondary battery between charged and discharged states refers to charging and/or discharging a battery to move the battery in a cycle from a first state that is either a charged or discharged state, to a second state that is the opposite of the first state (i.e., a charged state if the first state was discharged, or a discharged state if the first state was charged), and then moving the battery back to the first state to complete the cycle. For example, a single cycle of the secondary battery between charged and discharged states can include, as in a charge cycle, charging the battery from a discharged state to a charged state, and then discharging back to the discharged state, to complete the cycle. The single cycle can also include, as in a discharge cycle, discharging the battery from the charged state to the discharged state, and then charging back to a charged state, to complete the cycle.

"Electrochemically active material" as used herein means anodically active or cathodically active material.

"Electrode" as used herein may refer to the negative or positive electrode (anode or cathode) of a secondary battery unless the context clearly indicates otherwise.

"Electrode current collector" as used herein may refer to the negative or positive (anode or cathode) current collector of a secondary battery unless the context clearly indicates otherwise.

"Electrode material" as used herein may refer to anode material or cathode material unless the context clearly indicates otherwise.

"Electrode structure" as used herein may refer to an anode structure (e.g., negative electrode structure) or a cathode structure (e.g., positive electrode structure) adapted for use in a battery unless the context clearly indicates otherwise.

"Capacity" or "C" as used herein refers to an amount of electric charge that a battery (or a sub-portion of a battery comprising one or more pairs of electrode structures and counter-electrode structures that form a bilayer) can deliver at a pre-defined voltage unless the context clearly indicates otherwise.

"Electrolyte" as used herein refers to a non-metallic liquid, gel, or solid material in which current is carried by the movement of ions adapted for use in a battery unless the context clearly indicates otherwise.

"Charged state" as used herein in the context of the state of a secondary battery refers to a state where the secondary battery is charged to at least 75% of its rated capacity unless the context clearly indicates otherwise. For example, the battery may be charged to at least 80% of its rated capacity, at least 90% of its rated capacity, and even at least 95% of its rated capacity, such as 100% of its rated capacity.

"Discharge capacity" as used herein in connection with a negative electrode means the quantity of carrier ions available for extraction from the negative electrode and insertion into the positive electrode during a discharge operation of the battery between a predetermined set of cell end of charge and end of discharge voltage limits unless the context clearly indicates otherwise.

"Discharged state" as used herein in the context of the state of a secondary battery refers to a state where the secondary battery is discharged to less than 25% of its rated capacity unless the context clearly indicates otherwise. For example, the battery may be discharged to less than 20% of its rated capacity, such as less than 10% of its rated capacity, and even less than 5% of its rated capacity, such as 0% of its rated capacity.

"Reversible coulombic capacity" as used herein in connection with an electrode (i.e., a positive electrode, a negative electrode or an auxiliary electrode) means the total capacity of the electrode for carrier ions available for reversible exchange with a counter electrode.

"Longitudinal axis," "transverse axis," and "vertical axis," as used herein refer to mutually perpendicular axes (i.e., each are orthogonal to one another). For example, the "longitudinal axis," "transverse axis," and the "vertical axis" as used herein are akin to a Cartesian coordinate system used to define three-dimensional aspects or orientations. As such, the descriptions of elements of the disclosed subject matter herein are not limited to the particular axis or axes used to describe three-dimensional orientations of the elements. Alternatively stated, the axes may be interchangeable when referring to three-dimensional aspects of the disclosed subject matter.

"Composite material" or "Composite" as used herein refers to a material which comprises two or more constituent materials unless the context clearly indicates otherwise.

"Void fraction" or "Porosity" or "Void volume fraction" as used herein refers to a measurement of the voids (i.e., empty) spaces in a material, and is a fraction of the volume of voids over the total volume of the material, between 0 and 1, or as a percentage between 0% and 100%.

"Polymer" as used herein may refer to a substance or material consisting of repeating subunits of macromolecules unless the context clearly indicates otherwise.

"Microstructure" as used herein may refer to the structure of a surface of a material revealed by an optical microscope above about 25× magnification unless the context clearly indicates otherwise.

"Microporous" as used herein may refer to a material containing pores with diameters less than about 2 nanometers unless the context clearly indicates otherwise.

"Macroporous" as used herein may refer to a material containing pores with diameters greater than about 50 nanometers unless the context clearly indicates otherwise.

"Nanoscale" or "Nanoscopic scale" as used herein may refer to structures with a length scale in the range of about 1 nanometer to about 100 nanometers.

"Pre-lithiation" or "Pre-lithiate" as used herein may refer to the addition of lithium to the active lithium content of a lithium containing secondary battery as part of the formation process prior to battery operation to compensate for the loss of active lithium.

DETAILED DESCRIPTION

Embodiments of the present disclosure provide a distributed formation process where modern electronics and distributed embedded network strategies are employed. Thus, instead of a centralized system that requires dedicated connections to every battery undergoing the formation process and that controls the formation process for hundreds or thousands of batteries, the formation process in example embodiments of this disclosure is distributed among smaller clusters, each of which directly handles the formation process for a battery to which it is connected. These embodiments may simplify the construction of formation systems by requiring a less powerful central controller and less interconnection wiring, while allowing the formation processing system to be more easily scaled up or down, and physically distributed where desired.

Some embodiments of the present disclosure may provide benefits such as mitigation or improvement of the poor ICE associated with silicon-based anodes in secondary batteries utilizing an auxiliary anode electrochemically coupled with the secondary battery that provides additional carrier ions during and/or subsequent to initial battery formation. The use of an auxiliary anode mitigates the initial loss of carrier ions in the secondary battery during initial formation, thereby providing a technical benefit of, for example, increasing the capacity of the secondary battery after formation. Further, the introduction of additional carrier ions after battery formation mitigates the cycle-based decrease in carrier ions that are typically lost through secondary reactions, thereby providing a technical benefit of decreasing the cycle-by-cycle capacity loss in a secondary battery. Further still, the introduction of additional carrier ions after battery formation improves the cycling performance of the secondary battery by maintaining the anode of the secondary battery at a lower potential voltage at discharge, as the anode includes additional carrier ions. In some embodiments, the auxiliary anode is removed from the secondary battery after formation, thereby providing a technical benefit of increasing the energy density of the battery.

Figure 2:
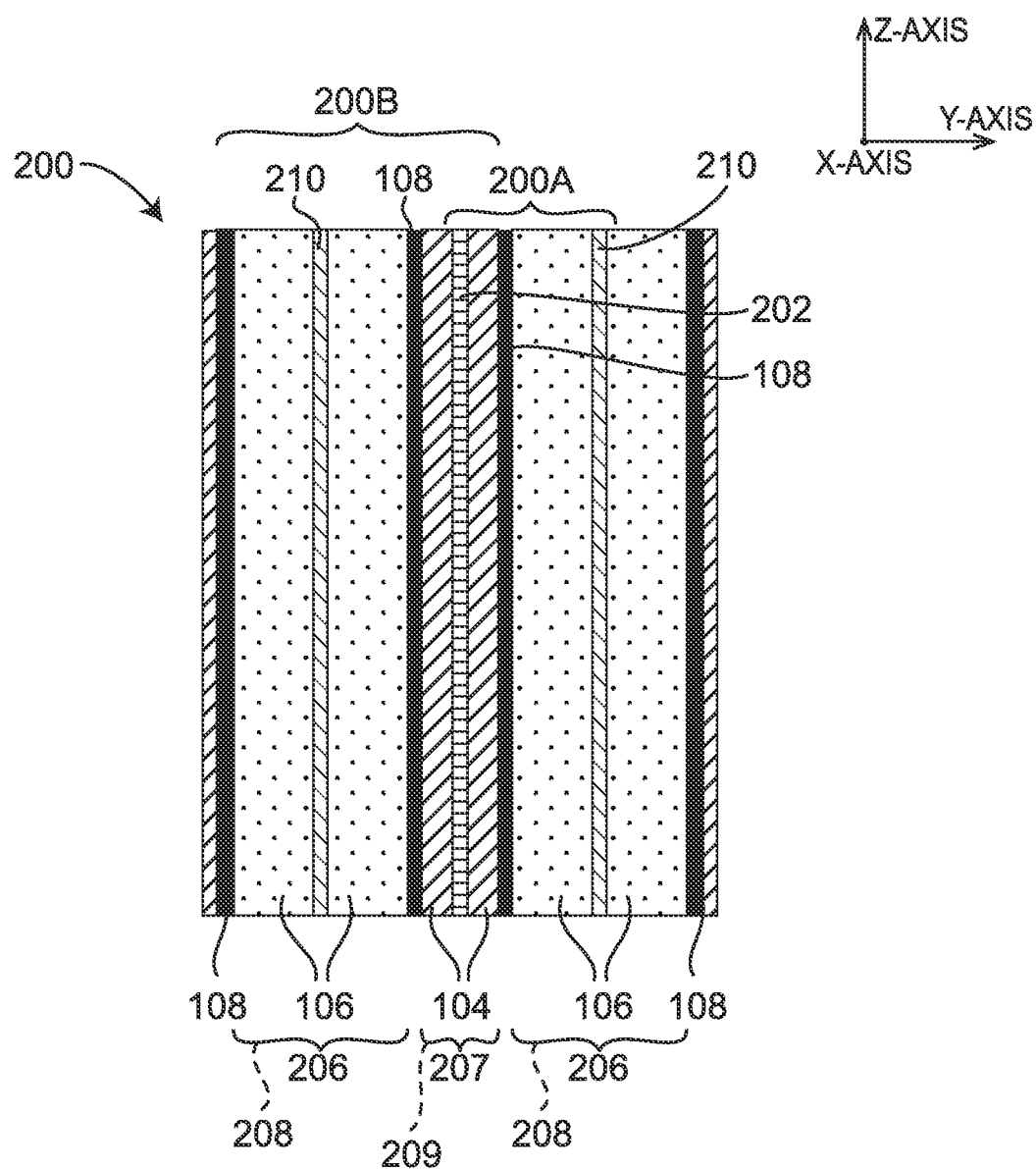
FIG. 2 depicts a unit cell for the secondary battery of FIG. 1.

FIG. 1 is a perspective view of a secondary battery 100 of an exemplary embodiment, and FIG. 2 depicts a unit cell 200 for the secondary battery 100. The secondary battery 100 in FIG. 1 has a portion exposed showing some of the internal structures of the secondary battery, as further described below.

As illustrated in FIG. 1, the secondary battery 100 includes a plurality of adjacent electrode sub-units 102. Each electrode sub-unit 102 has a dimension in the X-axis, Y-axis and Z-axis, respectively. The X-axis, Y-axis and Z-axis are each mutually perpendicular, akin to a Cartesian coordinate system. As used herein, dimensions of each electrode sub-unit 102 in the Z-axis may be referred to as a "height", dimensions in the X-axis may be referred to as a "length" and dimensions in the Y-axis may be referred to as a "width." The electrode sub-units 102 may be combined into one or more unit cells 200 (see FIG. 2). Each of the unit cells 200 comprises at least one anodically active material layer 104 and at least one cathodically active material layer 106. The anodically active material layer 104 and the cathodically active material layer 106 are electrically isolated from each other by a separator layer 108. It should be appreciated that in suitable embodiments of the present disclosure, any number of the electrode sub-units 102 may be used, such as from 1 to 200 or more of the electrode sub-units 102 in the secondary battery 100.

Referring to FIG. 1, the secondary battery 100 includes a first busbar 110 and a second busbar 112 that are in electrical contact with the anodically active material layer 104 and the cathodically active material layer 106 of each of the electrode sub-units 102, respectively, via electrode tabs 114. The electrode tabs 114 are only visible on a first side 120 of the secondary battery 100 in FIG. 1, although a different set of the electrode tabs 114 are present on a second side 121 of the secondary battery. The electrode tabs 114 on the first side 120 of the secondary battery 100 are electrically coupled with the first busbar 110, which may be referred to as an anode busbar. The electrode tabs 114 on the second side 121 of the secondary battery 100 (not visible in FIG. 1) are electrically coupled to the second busbar 112, which may be referred to as a cathode busbar. In this embodiment, the first busbar 110 is electrically coupled with a first electrical terminal 124 of the secondary battery 100, which is electrically conductive. When the first busbar 110 comprises an anode busbar for the secondary battery 100, the first electrical terminal 124 comprises a negative terminal for the secondary battery 100. Further in this embodiment, the second busbar 112 is electrically coupled with a second electrical terminal 125 of the secondary battery 100, which is electrically conductive. When the second busbar 112 comprises a cathode busbar for the secondary battery 100, the second electrical terminal 125 comprises a positive terminal for the secondary battery 100.

In one embodiment, a casing 116, which may be referred to as a constraint, may be applied over one or both of the X-Y surfaces of the secondary battery 100. In the embodiment shown in FIG. 1, the casing 116 includes a plurality of perforations 118 to facilitate distribution or flow of an electrolyte solution once the secondary battery 100 has been fully assembled. In one embodiment, the casing 116 comprises stainless steel, such as SS301, SS316, 440C or 440C hard. In other embodiments, the casing 116 comprises aluminum (e.g., aluminum 7075-T6, hard H18, etc.), titanium (e.g., 6Al-4V), beryllium, beryllium copper (hard), copper (02 free, hard), nickel, other metals or metal alloys, composite, polymer, ceramic (e.g., alumina (e.g., sintered or Coorstek AD96), zirconia (e.g., Coorstek YZTP), yttriastabilizedzirconia (e.g., ENrG E-Strate®)), glass, tempered glass, polyetheretherketone (PEEK) (e.g., Aptiv 1102), PEEK with carbon (e.g., Victrex 90HMF40 or Xycomp 1000-04), polyphenylene sulfide (PPS) with carbon (e.g., Tepex Dynalite 207), polyetheretherketone (PEEK) with 30% glass (e.g., Victrex 90HMF40 or Xycomp 1000-04), polyimide (e.g., Kapton®), E Glass Std Fabric/Epoxy, 0 deg, E Glass UD/Epoxy, 0 deg, Kevlar Std Fabric/Epoxy, 0 deg, Kevlar UD/Epoxy, 0 deg, Carbon Std Fabric/Epoxy, 0 deg, Carbon UD/Epoxy, 0 deg, Toyobo Zylon® HM Fiber/Epoxy, Kevlar 49 Aramid Fiber, S Glass Fibers, Carbon Fibers, Vectran UM LCP Fibers, Dyneema, Zylon, or other suitable material.

In some embodiments, the casing 116 comprises a sheet having a thickness in the range of about 10 to about 100 micrometers (m). In one embodiment, the casing 116 comprises a stainless-steel sheet (e.g., SS316) having a thickness of about 30 m. In another embodiment, the casing 116 comprises an aluminum sheet (e.g., 7075-T6) having a thickness of about 40 m. In another embodiment, the casing 116 comprises a zirconia sheet (e.g., Coorstek YZTP) having a thickness of about 30 m. In another embodiment, the casing 116 comprises an E Glass UD/Epoxy 0 deg sheet having a thickness of about 75 m. In another embodiment, the casing 116 comprises 12 m carbon fibers at >50% packing density.

In this embodiment, the secondary battery 100 includes a first major surface 126 and a second major surface 127 that opposes the first major surface 126. The major surfaces 126, 127 of the secondary battery 100 may be substantially planar is some embodiments.

With reference to FIG. 2, which depicts the secondary battery 100 along cut lines D-D in FIG. 1, the individual layers of the unit cell 200, which may be the same as or similar to the electrode sub-units 102, is shown. For each of the unit cells 200, in some embodiments, the separator layer 108 is an ionically permeable microporous polymeric material suitable for use as a separator in a secondary battery. In an embodiment, the separator layer 108 is coated with ceramic particles on one or both sides. In this embodiment, unit cell 200 includes an anode current collector 202 in the center, which may comprise or be electrically coupled with, one of the electrode tabs 114 on one of the sides 120, 121 of the secondary battery 100 (see FIG. 1). The unit cell 200 further includes the anodically active material layer 104, the separator layer 108, the cathodically active material layer 106, and a cathode current collector 204 in a stacked formation. The cathode current collector 204 may comprise or be electrically coupled with, one of the electrode tabs 114 on one of the sides 120, 121 of the secondary battery 100 that is different than the anode current collector 202.

In an alternative embodiment, the placement of the cathodically active material layer 106 and the anodically active material layer 104 may be swapped, such that the cathodically active material layers are toward the center and the anodically active material layers are distal to the cathodically active material layers. In one embodiment, a unit cell 200A includes, from left to right in stacked succession, the anode current collector 202, the anodically active material layer 104, the separator layer 108, the cathodically active material layer 106, and the cathode current collector 204. In an alternative embodiment, a unit cell 200B includes, from left to right in stacked succession, the separator layer 108, a first layer of the cathodically active material layer 106, the cathode current collector 204, a second layer of the cathodically active material layer 106, the separator layer 108, a first layer of the anodically active material layer 104, the anode current collector 202, a second layer of the anodically active material layer 104, and the separator layer 108.

In FIG. 2, the layered structure comprising the cathodically active material layer 106 and the cathode current collector 204 may be referred to as a cathode structure 206, while the layered structure comprising the anodically active material layer 104 and the anode current collector 202 may be referred to as an anode structure 207. Collectively, the population of the cathode structures 206 for the secondary battery 100 may be referred to as a positive electrode 208 of the secondary battery 100, and the population of the anode structures 207 for the secondary battery 100 (only one of the anode structures 207 are shown in FIG. 2) may be referred to as the negative electrode 209 of the secondary battery 100.

A voltage difference V exists between adjacent cathode structures 206 and anode structures 207, with the adjacent structures considered a bilayer in some embodiments. Each bilayer has a capacity C determined by the makeup and configuration of the cathode structures 206 and the anode structures 207. In this embodiment, each bilayer produces a voltage difference of about 4.35 volts. In other embodiments, each bilayer has a voltage difference of about 0.5 volts, about 1.0 volts, about 1.5 volts, about 2.0 volts, about 2.5 volts, about 3.0 volts, about 3.5 volts, about 4.0 volts, 4.5 volts, about 5.0 volts, between 4 and 5 volts, or any other suitable voltage. During cycling between a charged state and a discharged state, the voltage may vary, for example, between about 2.5 volts and about 4.35 volts. The capacity C of a bilayer in this embodiment is about 3.5 milliampere-hour (mAh). In other embodiments, the capacity C of a bilayer is about 2 mAh, less than 5 mAh, or any other suitable capacity. In some embodiments, the capacity C of a bilayer may be up to about 10 mAh.

The cathode current collector 204 may comprise aluminum, nickel, cobalt, titanium, and tungsten, or alloys thereof, or any other material suitable for use as a cathode current collector layer. In general, the cathode current collector 204 will have an electrical conductivity of at least about $10^3$ Siemens/cm. For example, in one such embodiment, the cathode current collector 204 will have a conductivity of at least about $10^4$ Siemens/cm. By way of further example, in one such embodiment, the cathode current collector 204 will have a conductivity of at least about $10^5$ Siemens/cm. In general, the cathode current collector 204, may comprise a metal such as aluminum, carbon, chromium, gold, nickel, NiP, palladium, platinum, rhodium, ruthenium, an alloy of silicon and nickel, titanium, or a combination thereof (see "Current collectors for positive electrodes of lithium-based batteries" by A. H. Whitehead and M. Schreiber, Journal of the Electrochemical Society, 152(11) A2105-A2113 (2005)). By way of further example, in one embodiment, the cathode current collector 204 comprises gold or an alloy thereof such as gold silicide. By way of further example, in one embodiment, the cathode current collector 204 comprise nickel or an alloy thereof such as nickel silicide.

The cathodically active material layer 106 may be an intercalation-type chemistry active material, a conversion chemistry active material, or a combination thereof.

Exemplary conversion chemistry materials useful in the present disclosure include, but are not limited to, S (or $Li_2S$ in the lithiated state), LiF, Fe, Cu, Ni, $FeF_2$, $FeO_dF_{3.2d}$, $FeF_3$, $CoF_3$, $CoF_2$, $CuF_2$, $NiF_2$, where $0 \leq d \leq 0.5$, and the like.

Exemplary cathodically active material layers 106 also include any of a wide range of intercalation-type cathodically active materials. For example, for a lithium-ion battery, the cathodically active material may comprise a cathodically active material selected from transition metal oxides, transition metal sulfides, transition metal nitrides, lithium-transition metal oxides, lithium-transition metal sulfides, and lithium-transition metal nitrides may be selectively used. The transition metal elements of these transition metal oxides, transition metal sulfides, and transition metal nitrides can include metal elements having a d-shell or f-shell. Specific examples of such metal element are Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag, and Au. Additional cathodically active materials include $LiCoO_2$, $LiNi_{0.5}Mn_{1.5}O_4$, $Li(Ni_xCo_yAl_z)O_2$, $LiFePO_4$, $Li_2MnO_4$, $V_2O_5$, molybdenum oxysulfides, phosphates, silicates, vanadates, sulfur, sulfur compounds, oxygen (air), $Li(Ni_xMn_y\text{-}Co_z)O_2$, and combinations thereof.

In general, the cathodically active material layers 106 will have a thickness of at least about 20 m. For example, in one embodiment, the cathodically active material layers 106 will have a thickness of at least about 40 m. By way of further example, in one such embodiment, the cathodically active material layers 106 will have a thickness of at least about 60 m. By way of further example, in one such embodiment, the cathodically active material layers 106 will have a thickness of at least about 100 m. Typically, the cathodically active material layers 106 will have a thickness of less than about 90 m or less than about 70 m.

Figure 3:
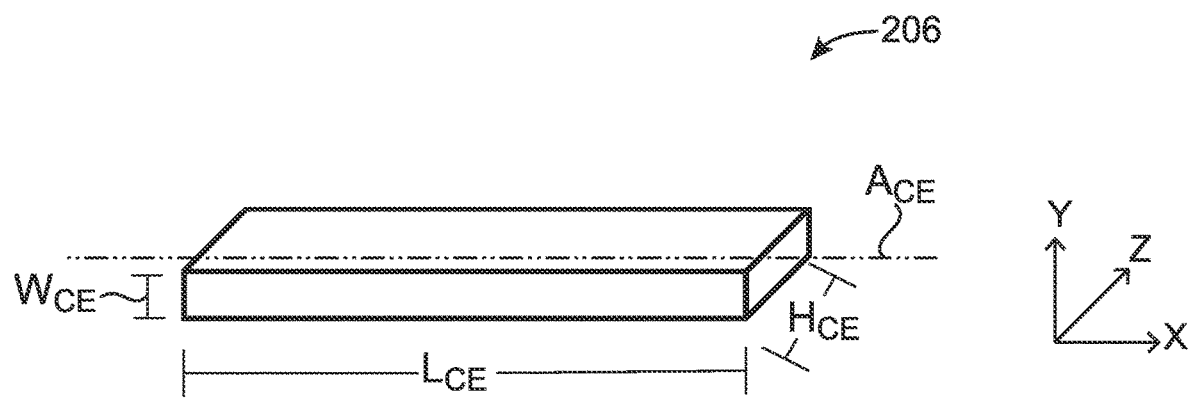
FIG. 3 depicts a cathode structure for the unit cell of FIG. 2.

FIG. 3 depicts one of the cathode structures 206 of FIG. 2. Each cathode structure 206 has a length ($L_{CE}$) measured along the longitudinal axis ($A_{CE}$), a width ($W_{CE}$), and a height ($H_{CE}$) measured in a direction that is perpendicular to each of the directions of measurement of the length $L_{CE}$ and the width $W_{CE}$.

The length $L_{CE}$ of the cathode structures 206 will vary depending upon the secondary battery 100 and its intended use. In general, however, each cathode structure 206 will typically have a length $L_{CE}$ in the range of about 5 millimeters (mm) to about 500 mm. For example, in one such embodiment, each cathode structure 206 has a length $L_{CE}$ of about 10 mm to about 250 mm. By way of further example, in one such embodiment each cathode structure 206 has a length $L_{CE}$ of about 25 mm to about 100 mm. According to one embodiment, the cathode structures 206 include one or more first electrode members having a first length, and one or more second electrode members having a second length that is different than the first length. In yet another embodiment, the different lengths for the one or more first electrode members and one or more second electrode members may be selected to accommodate a predetermined shape for an electrode assembly, such as an electrode assembly shape having a different lengths along one or more of the longitudinal and/or transverse axis, and/or to provide predetermined performance characteristics for the secondary battery 100.

The width $W_{CE}$ of the cathode structures 206 will also vary depending upon the secondary battery 100 and its intended use. In general, however, the cathode structures 206 will typically have a width $W_{CE}$ within the range of about 0.01 mm to 2.5 mm. For example, in one embodiment, the width $W_{CE}$ of each cathode structure 206 will be in the range of about 0.025 mm to about 2 mm. By way of further example, in one embodiment, the width $W_{CE}$ of each cathode structure 206 will be in the range of about 0.05 mm to about 1 mm. According to one embodiment, the cathode structures 206 include one or more first electrode members having a first width, and one or more second electrode members having a second width that is different than the first width. In yet another embodiment, the different widths for the one or more first electrode members and one or more second electrode members may be selected to accommodate a predetermined shape for the secondary battery 100, such as an assembly having a different widths along one or more of the longitudinal and/or transverse axis, and/or to provide predetermined performance characteristics for the secondary battery 100.

The height $H_{CE}$ of the cathode structures 206 will also vary depending upon the secondary battery 100 and its intended use. In general, however, the cathode structures 206 will typically have a height $H_{CE}$ within the range of about 0.05 mm to about 25 mm. For example, in one embodiment, the height $H_{CE}$ of each cathode structure 206 will be in the range of about 0.05 mm to about 5 mm. By way of further example, in one embodiment, the height $H_{CE}$ of each cathode structure 206 will be in the range of about 0.1 mm to about 1 mm. According to one embodiment, the cathode structures 206 include one or more first cathode members having a first height, and one or more second cathode members having a second height that is different than the first height. In yet another embodiment, the different heights for the one or more first cathode members and one or more second cathode members may be selected to accommodate a predetermined shape for the secondary battery 100, such as a shape having a different heights along one or more of the longitudinal and/or transverse axis, and/or to provide predetermined performance characteristics for the secondary battery 100.

In general, each cathode structure 206 has a length $L_{CE}$ that is substantially greater than its width $W_{CE}$ and substantially greater than its height $H_{CE}$. For example, in one embodiment, the ratio of $L_{CE}$ to each of $W_{CE}$ and $H_{CE}$ is at least 5:1, respectively (that is, the ratio of $L_{CE}$ to $W_{CE}$ is at least 5:1, respectively and the ratio of $L_{CE}$ to $H_{CE}$ is at least 5:1, respectively), for each cathode structure 206. By way of further example, in one embodiment the ratio of $L_{CE}$ to each of $W_{CE}$ and $H_{CE}$ is at least 10:1 for each cathode structure 206. By way of further example, in one embodiment, the ratio of $L_{CE}$ to each of $W_{CE}$ and $H_{CE}$ is at least 15:1 for each cathode structure 206. By way of further example, in one embodiment, the ratio of $L_{CE}$ to each of $W_{CE}$ and $H_{CE}$ is at least 20:1 for each cathode structure 206.

In one embodiment, the ratio of the height $H_{CE}$ to the width $W_{CE}$ of the cathode structures 206 is at least 0.4:1, respectively. For example, in one embodiment, the ratio of $H_{CE}$ to $W_{CE}$ will be at least 2:1, respectively, for each cathode structure 206. By way of further example, in one embodiment, the ratio of $H_{CE}$ to $W_{CE}$ will be at least 10:1, respectively, for each cathode structure 206. By way of further example, in one embodiment, the ratio of $H_{CE}$ to $W_{CE}$ will be at least 20:1, respectively, for each cathode structure 206. Typically, however, the ratio of $H_{CE}$ to $W_{CE}$ will generally be less than 1,000:1, respectively, for each cathode structure 206. For example, in one embodiment, the ratio of $H_{CE}$ to $W_{CE}$ will be less than 500:1, respectively, for each cathode structure 206. By way of further example, in one embodiment, the ratio of $H_{CE}$ to $W_{CE}$ will be less than 100:1, respectively. By way of further example, in one embodiment, the ratio of $H_{CE}$ to $W_{CE}$ will be less than 10:1, respectively. By way of further example, in one embodiment, the ratio of $H_{CE}$ to $W_{CE}$ will be in the range of about 2:1 to about 100:1, respectively, for each cathode structure 206.

Anodic Type Structures and Materials

Referring again to FIG. 2, the anode current collector 202 in the unit cell 200 may comprise a conductive material such as copper, carbon, nickel, stainless-steel, cobalt, titanium, and tungsten, and alloys thereof, or any other material suitable as an anode current collector layer. In general, the anode current collector 202 will have an electrical conductivity of at least about $10^3$ Siemens/cm. For example, in one such embodiment, the anode current collector 202 will have a conductivity of at least about $10^4$ Siemens/cm. By way of further example, in one such embodiment, the anode current collector 202 will have a conductivity of at least about $10^5$ Siemens/cm.

In general, the anodically active material layers 104 in the unit cell 200 may be selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide, $ZnCo_2O_4$; (f) particles of graphite and carbon; (g) lithium metal; and (h) combinations thereof.

Exemplary anodically active material layers 104 include carbon materials such as graphite and soft or hard carbons, or graphene (e.g., single-walled or multi-walled carbon nanotubes), or any of a range of metals, semi-metals, alloys, oxides, nitrides and compounds capable of intercalating lithium or forming an alloy with lithium. Specific examples of the metals or semi-metals capable of constituting the anode material include graphite, tin, lead, magnesium, aluminum, boron, gallium, silicon, Si/C composites, Si/graphite blends, silicon oxide (SiOx), porous Si, intermetallic Si alloys, indium, zirconium, germanium, bismuth, cadmium, antimony, silver, zinc, arsenic, hafnium, yttrium, lithium, sodium, graphite, carbon, lithium titanate, palladium, and mixtures thereof. In one exemplary embodiment, the anodically active material comprises aluminum, tin, or silicon, or an oxide thereof, a nitride thereof, a fluoride thereof, or other alloy thereof. In another exemplary embodiment, the anodically active material layers 104 comprise silicon or an alloy or oxide thereof.

In one embodiment, the anodically active material layers 104 are microstructured to provide a significant void volume fraction to accommodate volume expansion and contraction as lithium ions (or other carrier ions) are incorporated into or leave the anodically active material layers 104 during charging and discharging processes for the secondary battery 100. In general, the void volume fraction of (each of) the anodically active material layer 104 is at least 0.1. Typically, however, the void volume fraction of (each of) the anodically active material layer 104 is not greater than 0.8. For example, in one embodiment, the void volume fraction of (each of) the anodically active material layer 104 is about 0.15 to about 0.75. By way of the further example, in one embodiment, the void volume fraction of (each of) the anodically active material layer 104 is about 0.2 to about 0.7. By way of the further example, in one embodiment, the void volume fraction of (each of) the anodically active material layer 104 is about 0.25 to about 0.6.

Depending upon the composition of the microstructured anodically active material layers 104 and the method of their formation, the microstructured anodically active material layers 104 may comprise macroporous, microporous, or mesoporous material layers or a combination thereof, such as a combination of microporous and mesoporous, or a combination of mesoporous and macroporous. Microporous material is typically characterized by a pore dimension of less than 10 nanometer (nm), a wall dimension of less than 10 nm, a pore depth of 1 m to 50 m, and a pore morphology that is generally characterized by a "spongy" and irregular appearance, walls that are not smooth, and branched pores. Mesoporous material is typically characterized by a pore dimension of 10 nm to 50 nm, a wall dimension of 10 nm to 50 nm, a pore depth of 1 m to 100 m, and a pore morphology that is generally characterized by branched pores that are somewhat well defined or dendritic pores. Macroporous material is typically characterized by a pore dimension of greater than 50 nm, a wall dimension of greater than 50 nm, a pore depth of 1 m to 500 m, and a pore morphology that may be varied, straight, branched, or dendritic, and smooth or rough-walled. Additionally, the void volume may comprise open or closed voids, or a combination thereof. In one embodiment, the void volume comprises open voids, that is, the anodically active material layers 104 contain voids having openings at the lateral surface of the anodically active material layers through which lithium ions (or other carrier ions) can enter or leave. For example, lithium ions may enter the anodically active material layers 104 through the void openings after leaving the cathodically active material layers 106. In another embodiment, the void volume comprises closed voids, that is, the anodically active material layers 104 contain voids that are enclosed. In general, open voids can provide greater interfacial surface area for the carrier ions whereas closed voids tend to be less susceptible to SEI formation, while each provides room for the expansion of anodically active material layers 104 upon the entry of carrier ions. In certain embodiments, therefore, it is preferred that the anodically active material layers 104 comprise a combination of open and closed voids.

In one embodiment, the anodically active material layers 104 comprise porous aluminum, tin or silicon or an alloy, an oxide, or a nitride thereof. Porous silicon layers may be formed, for example, by anodization, by etching (e.g., by depositing precious metals such as gold, platinum, silver or gold/palladium on the surface of single crystal silicon and etching the surface with a mixture of hydrofluoric acid and hydrogen peroxide), or by other methods known in the art such as patterned chemical etching. Additionally, the porous anodically active material layers 104 will generally have a porosity fraction of at least about 0.1, but less than 0.8 and have a thickness of about 1 m to about 100 m. For example, in one embodiment, the anodically active material layers 104 comprise porous silicon, have a thickness of about 5 m to about 100 m, and have a porosity fraction of about 0.15 to about 0.75. By way of further example, in one embodiment, the anodically active material layers 104 comprise porous silicon, have a thickness of about 10 m to about 80 m, and have a porosity fraction of about 0.15 to about 0.7. By way of further example, in one such embodiment, the anodically active material layers 104 comprise porous silicon, have a thickness of about 20 m to about 50 m, and have a porosity fraction of about 0.25 to about 0.6. By way of further example, in one embodiment, the anodically active material layers 104 comprise a porous silicon alloy (such as nickel silicide), have a thickness of about 5 m to about 100 m, and have a porosity fraction of about 0.15 to about 0.75.

In another embodiment, the anodically active material layers 104 comprise fibers of aluminum, tin, or silicon, or an alloy thereof. Individual fibers may have a diameter (thickness dimension) of about 5 nm to about 10,000 nm and a length generally corresponding to the thickness of the anodically active material layers 104. Fibers (nanowires) of silicon may be formed, for example, by chemical vapor deposition or other techniques known in the art such as vapor liquid solid (VLS) growth and solid liquid solid (SLS) growth. Additionally, the anodically active material layers 104 will generally have a porosity fraction of at least about 0.1, but less than 0.8 and have a thickness of about 1 m to about 200 m. For example, in one embodiment, the anodically active material layers 104 comprise silicon nanowires, have a thickness of about 5 m to about 100 m, and a porosity fraction of about 0.15 to about 0.75. By way of further example, in one embodiment, the anodically active material layers 104 comprise silicon nanowires, have a thickness of about 10 µm to about 80 µm, and a porosity fraction of about 0.15 to about 0.7. By way of further example, in one such embodiment, the anodically active material layers 104 comprise silicon nanowires, have a thickness of about 20 µm to about 50 µm, and a porosity fraction of about 0.25 to about 0.6. By way of further example, in one embodiment, the anodically active material layers 104 comprise nanowires of a silicon alloy (such as nickel silicide), have a thickness of about 5 µm to about 100 µm, and a porosity fraction of about 0.15 to about 0.75.

In yet other embodiments, the anodically active material layers 104 are coated with a particulate lithium material selected from the group consisting of stabilized lithium metal particles, e.g., lithium carbonate-stabilized lithium metal powder, lithium silicate stabilized lithium metal powder, or other source of stabilized lithium metal powder or ink. The particulate lithium material may be applied on the anodically active material layers 104 by spraying, loading, or otherwise disposing the lithium particulate material onto the anodically active material layers 104 at a loading amount of about 0.05 mg/cm$^2$ to 5 mg/cm$^2$, e.g., about 0.1 mg/cm$^2$ to 4 mg/cm$^2$, or even about 0.5 mg/cm$^2$ to 3 mg/cm$^2$. The average particle size ($D_{50}$) of the lithium particulate material may be 5 µm to 200 µm, e.g., about 10 µm to 100 µm, 20 µm to 80 µm, or even about 30 µm to 50 µm. The average particle size ($D_{50}$) may be defined as a particle size corresponding to 50% in a cumulative volume-based particle size distribution curve. The average particle size ($D_{50}$) may be measured, for example, using a laser diffraction method.

In one embodiment, the anode current collector 202, has an electrical conductance that is substantially greater than the electrical conductance of its associated anodically active material layers 104. For example, in one embodiment, the ratio of the electrical conductance of the anode current collector 202 to the electrical conductance of the anodically active material layers 104 is at least 100:1 when there is an applied current to store energy in the secondary battery 100 or an applied load to discharge the secondary battery 100. By way of further example, in some embodiments, the ratio of the electrical conductance of the anode current collector 202 to the electrical conductance of the anodically active material layers 104 is at least 500:1 when there is an applied current to store energy in the secondary battery 100 or an applied load to discharge the secondary battery 100. By way of further example, in some embodiments, the ratio of the electrical conductance of the anode current collector 202 to the electrical conductance of the anodically active material layers 104 is at least 1000:1 when there is an applied current to store energy in the secondary battery 100 or an applied load to discharge the secondary battery 100. By way of further example, in some embodiments, the ratio of the electrical conductance of the anode current collector 202 to the electrical conductance of the anodically active material layers 104 is at least 5000:1 when there is an applied current to store energy in the secondary battery 100 or an applied load to discharge the secondary battery 100. By way of further example, in some embodiments, the ratio of the electrical conductance of the anode current collector 202 to the electrical conductance of the anodically active material layers 104 is at least 10,000:1 when there is an applied current to store energy in the secondary battery 100 or an applied load to discharge the secondary battery 100.

Figure 4:
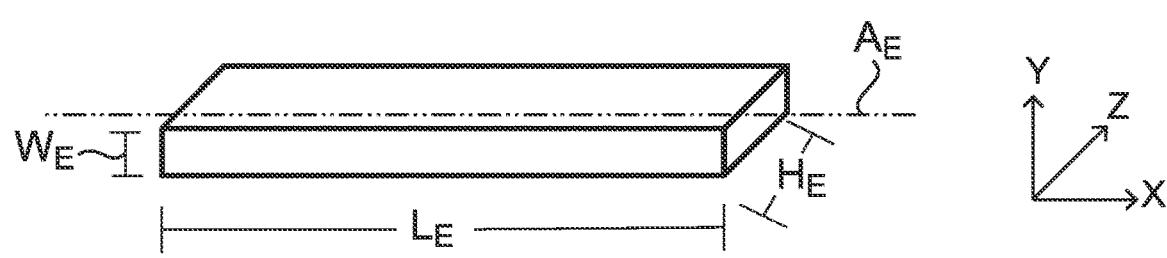
FIG. 4 depicts an anode structure for the unit cell of FIG. 2.

FIG. 4 depicts one of the anode structures 207 of FIG. 2 of an exemplary embodiment. Each anode structure 207 has a length ($L_E$) measured along a longitudinal axis ($A_E$) of the electrode, a width ($W_E$), and a height ($H_E$) measured in a direction that is orthogonal to each of the directions of measurement of the length $L_E$ and the width $W_E$.

The length $L_E$ of the anode structures 207 will vary depending upon the secondary battery 100 and its intended use. In general, however, the anode structures 207 will typically have a length $L_E$ in the range of about 5 millimeter (mm) to about 500 mm. For example, in one such embodiment, the anode structures 207 have a length $L_E$ of about 10 mm to about 250 mm. By way of further example, in one such embodiment, the anode structures 207 have a length $L_E$ of about 25 mm to about 100 mm. According to one embodiment, the anode structure 207 include one or more first electrode members having a first length, and one or more second electrode members having a second length that is different than the first length. In yet another embodiment, the different lengths for the one or more first electrode members and the one or more second electrode members may be selected to accommodate a predetermined shape for the secondary battery 100, such as a shape having a different lengths along one or more of the longitudinal and/or transverse axis, and/or to provide predetermined performance characteristics for the secondary battery 100.

The width $W_E$ of the anode structures 207 will also vary depending upon the secondary battery 100 and its intended use. In general, however, each anode structure 207 will typically have a width $W_E$ within the range of about 0.01 mm to 2.5 mm. For example, in one embodiment, the width $W_E$ of each anode structure 207 will be in the range of about 0.025 mm to about 2 mm. By way of further example, in one embodiment, the width $W_E$ of each anode structure 207 will be in the range of about 0.05 mm to about 1 mm. According to one embodiment, the anode structures 207 include one or more first electrode members having a first width, and one or more second electrode members having a second width that is different than the first width. In yet another embodiment, the different widths for the one or more first electrode members and one or more second electrode members may be selected to accommodate a predetermined shape for the secondary battery 100, such as a shape having a different widths along one or more of the longitudinal and/or transverse axis, and/or to provide predetermined performance characteristics for the secondary battery 100.

The height $H_E$ of the anode structures 207 will also vary depending upon the secondary battery 100 and its intended use. In general, however, the anode structures 207 will typically have a height $H_E$ within the range of about 0.05 mm to about 25 mm. For example, in one embodiment, the height $H_E$ of each anode structure 207 will be in the range of about 0.05 mm to about 5 mm. By way of further example, in one embodiment, the height $H_E$ of each anode structure 207 will be in the range of about 0.1 mm to about 1 mm. According to one embodiment, the anode structures 207 include one or more first electrode members having a first height, and one or more second electrode members having a second height that is different than the first height. In yet another embodiment, the different heights for the one or more first electrode members and one or more second electrode members may be selected to accommodate a predetermined shape for the secondary battery 100, such as a shape having a different heights along one or more of the longitudinal and/or transverse axis, and/or to provide predetermined performance characteristics for the secondary battery 100.

In general, the anode structures 207 each have a length $L_E$ that is substantially greater than each of its width $W_E$ and its height $H_E$. For example, in one embodiment, the ratio of $L_E$ to each of $W_E$ and $H_E$ is at least 5:1, respectively (that is, the ratio of $L_E$ to $W_E$ is at least 5:1, respectively and the ratio of $L_E$ to $H_E$ is at least 5:1, respectively), for each anode structure 207. By way of further example, in one embodiment, the ratio of $L_E$ to each of $W_E$ and $H_E$ is at least 10:1. By way of further example, in one embodiment, the ratio of $L_E$ to each of $W_E$ and $H_E$ is at least 15:1. By way of further example, in one embodiment, the ratio of $L_E$ to each of $W_E$ and $H_E$ is at least 20:1, for each anode structure 207.

In one embodiment, the ratio of the height $H_E$ to the width $W_E$ of the anode structures 207 is at least 0.4:1, respectively. For example, in one embodiment, the ratio of $H_E$ to $W_E$ will be at least 2:1, respectively, for each anode structure 207. By way of further example, in one embodiment, the ratio of $H_E$ to $W_E$ will be at least 10:1, respectively. By way of further example, in one embodiment, the ratio of $H_E$ to $W_E$ will be at least 20:1, respectively. Typically, however, the ratio of $H_E$ to $W_E$ will generally be less than 1,000:1, respectively. For example, in one embodiment, the ratio of $H_E$ to $W_E$ will be less than 500:1, respectively. By way of further example, in one embodiment, the ratio of $H_E$ to $W_E$ will be less than 100:1, respectively. By way of further example, in one embodiment, the ratio of $H_E$ to $W_E$ will be less than 10:1, respectively. By way of further example, in one embodiment, the ratio of $H_E$ to $W_E$ will be in the range of about 2:1 to about 100:1, respectively, for each anode structure 207.

Separator Structures, Separator Materials, and Electrolytes

Referring again to FIG. 2, the separator layer(s) 108 separate the cathode structures 206 from the anode structures 207. The separator layers 108 are made of electrically insulating but ionically permeable separator material. The separator layers 108 are adapted to electrically isolate each member of the plurality of the cathode structures 206 from each member of the plurality of the anode structures 207. Each separator layer 108 will typically include a microporous separator material that can be permeated with a non-aqueous electrolyte; for example, in one embodiment, the microporous separator material includes pores having a diameter of at least 50 Angstroms (Å), more typically in the range of about 2,500 Å, and a porosity in the range of about 25% to about 75%, more typically in the range of about 35% to 55%

In general, the separator layers 108 will each have a thickness of at least about 4 μm. For example, in one embodiment, the separator layers 108 will have a thickness of at least about 8 μm. By way of further example, in one such embodiment, the separator layers 108 will have a thickness of at least about 12 μm. By way of further example, in one such embodiment, the separator layers 108 will have a thickness of at least about 15 μm. In some embodiments, the separator layers 108 will have a thickness of up to 25 μm, up to 50 μm, or any other suitable thickness. Typically, however, the separator layers 108 will have a thickness of less than about 12 μm or less than about 10 μm.

In general, the material of the separator layers 108 may be selected from a wide range of material having the capacity to conduct carrier ions between the anodically active material layers 104 and the cathodically active material layers 106 of the unit cell 200. For example, the separator layers 108 may comprise a microporous separator material that may be permeated with a liquid, non-aqueous electrolyte.

Alternatively, the separator layers 108 may comprise a gel or solid electrolyte capable of conducting carrier ions between the anodically active material layers 104 and the cathodically active material layers 106 of the unit cell 200.

In one embodiment, the separator layers 108 may comprise a polymer-based electrolyte. Exemplary polymer electrolytes include PEO-based polymer electrolytes, and polymer-ceramic composite electrolytes.

In another embodiment, the separator layers 108 may comprise an oxide-based electrolyte. Exemplary oxide-based electrolytes include lithium lanthanum titanate ($Li_{0.34}La_{0.56}TiO_3$), Al-doped lithium lanthanum zirconate ($Li_{6.24}La_3Zr_2Al_{0.24}O_{11.98}$), Ta-doped lithium lanthanum zirconate ($Li_{6.4}La_3Zr_{1.4}Ta_{0.6}O_{12}$), and lithium aluminum titanium phosphate ($Li_{1.4}Al_{0.4}Ti_{1.6}(PO_4)_3$).

In another embodiment, the separator layers 108 may comprise a solid electrolyte. Exemplary solid electrolytes include sulfide-based electrolytes such as lithium tin phosphorus sulfide ($Li_{10}SnP_2S_{12}$), lithium phosphorus sulfide ($\beta$-$Li_3PS_4$), and lithium phosphorus sulfur chloride iodide ($Li_6PS_5Cl_{0.9}I_{0.1}$).

In some embodiments, the separator layers 108 may comprise a solid-state lithium ion conducting ceramic, such as a lithium-stuffed garnet.

In one embodiment, the separator layers 108 comprise a microporous separator material comprising a particulate material and a binder, with the microporous separator material having a porosity (void fraction) of at least about 20 vol. %. The pores of the microporous separator material will have a diameter of at least 50 Å and will typically fall within the range of about 250 Å to about 2,500 Å. The microporous separator material will typically have a porosity of less than about 75%. In one embodiment, the microporous separator material has a porosity (void fraction) of at least about 25 vol %. In one embodiment, the microporous separator material will have a porosity of about 35-55%.

The binder for the microporous separator material may be selected from a wide range of inorganic or polymeric materials. For example, in one embodiment, the binder is an organic material selected from the group consisting of silicates, phosphates, aluminates, aluminosilicates, and hydroxides such as magnesium hydroxide, calcium hydroxide, etc. For example, in one embodiment, the binder is a fluoropolymer derived from monomers containing vinylidene fluoride, hexafluoropropylene, tetrafluoropropene, and the like. In another embodiment, the binder is a polyolefin such as polyethylene, polypropylene, or polybutene, having any of a range of varying molecular weights and densities. In another embodiment, the binder is selected from the group consisting of ethylene-diene-propene terpolymer, polystyrene, polymethyl methacrylate, polyethylene glycol, polyvinyl acetate, polyvinyl butyral, polyacetal, and polyethyleneglycol diacrylate. In another embodiment, the binder is selected from the group consisting of methyl cellulose, carboxymethyl cellulose, styrene rubber, butadiene rubber, styrene-butadiene rubber, isoprene rubber, polyacrylamide, polyvinyl ether, polyacrylic acid, polymethacrylic acid, and polyethylene oxide. In another embodiment, the binder is selected from the group consisting of acrylates, styrenes, epoxies, and silicones. In another embodiment, the binder is a copolymer or blend of two or more of the aforementioned polymers.

The particulate material comprised by the microporous separator material may also be selected from a wide range of materials. In general, such materials have a relatively low electronic and ionic conductivity at operating temperatures and do not corrode under the operating voltages of the battery electrode or current collector contacting the microporous separator material. For example, in one embodiment, the particulate material has a conductivity for carrier ions (e.g., lithium) of less than $1\times10^{-4}$ Siemens/cm (S/cm). By way of further example, in one embodiment, the particulate material has a conductivity for carrier ions of less than $1\times10^{-5}$ S/cm. By way of further example, in one embodiment, the particulate material has a conductivity for carrier ions of less than $1\times10^{-6}$ S/cm. Exemplary particulate materials include particulate polyethylene, polypropylene, a $TiO_2$-polymer composite, silica aerogel, fumed silica, silica gel, silica hydrogel, silica xerogel, silica sol, colloidal silica, alumina, titania, magnesia, kaolin, talc, diatomaceous earth, calcium silicate, aluminum silicate, calcium carbonate, magnesium carbonate, or a combination thereof. For example, in one embodiment, the particulate material comprises a particulate oxide or nitride such as $TiO_2$, $SiO_2$, $Al_2O_3$, $GeO_2$, $B_2O_3$, $Bi_2O_3$, $BaO$, $ZnO$, $ZrO_2$, $BN$, $Si_3N_4$, and $Ge_3N_4$. See, for example, P. Arora and J. Zhang, "Battery Separators" Chemical Reviews 2004, 104, 4419-4462). In one embodiment, the particulate material will have an average particle size of about 20 nm to 2 μm, more typically 200 nm to 1.5 μm. In one embodiment, the particulate material will have an average particle size of about 500 nm to 1 μm.

In an alternative embodiment, the particulate material comprised by the microporous separator material may be bound by techniques such as sintering, binding, curing, etc. while maintaining the void fraction desired for electrolyte ingress to provide the ionic conductivity for the functioning of the battery.

In the secondary battery 100 (see FIG. 1), the microporous separator material of the separator layers 108 are permeated with a non-aqueous electrolyte suitable for use as a secondary battery electrolyte. Typically, the non-aqueous electrolyte comprises a lithium salt and/or mixture of salts dissolved in an organic solvent and/or solvent mixture. Exemplary lithium salts include inorganic lithium salts such as $LiClO_4$, $LiBF_4$, $LiPF_6$, $LiAsF_6$, $LiCl$, and $LiBr$; and organic lithium salts such as $LiB(C_6H_5)_4$, $LiN(SO_2CF_3)_2$, $LiN(SO_2CF_3)_3$, $LiNSO_2CF_3$, $LiNSO_2CF_5$, $LiNSO_2C_4F_9$, $LiNSO_2C_5Fn$, $LiNSO_2C_6F_{13}$, and $LiNSO_2C_7F_{15}$. Exemplary organic solvents to dissolve the lithium salt include cyclic esters, chain esters, cyclic ethers, and chain ethers. Specific examples of the cyclic esters include propylene carbonate, butylene carbonate, γ-butyrolactone, vinylene carbonate, 2-methyl-γ-butyrolactone, acetyl-γ-butyrolactone, and γ-valerolactone. Specific examples of the chain esters include dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, alkyl propionates, dialkyl malonates, and alkyl acetates. Specific examples of the cyclic ethers include tetrahydrofuran, alkyltetrahydrofurans, dialkyltetrahydrofurans, alkoxytetrahydrofurans, dialkoxytetrahydrofurans, 1,3-dioxolane, alkyl-1,3-dioxolanes, and 1,4-dioxolane. Specific examples of the chain ethers include 1,2-dimethoxyethane, 1,2-diethoxythane, diethyl ether, ethylene glycol dialkyl ethers, diethylene glycol dialkyl ethers, triethylene glycol dialkyl ethers, and tetraethylene glycol dialkyl ethers.

Additional Embodiments of the Present Disclosure

When a secondary battery is assembled, the amount of carrier ions available for cycling between the anode and the cathode is often initially provided in the cathode, because cathodically active materials, such as lithium cobalt oxide, are relatively stable in ambient air (e.g., they resist oxidation) compared to lithiated anode materials such as lithiated graphite. When a secondary battery is charged for the first time, the carrier ions are extracted from the cathode and introduced into the anode. As a result, the anode potential is lowered significantly (toward the potential of the carrier ions), and the cathode potential is increased (to become even more positive). These changes in potential may give rise to parasitic reactions on both the cathode and the anode, but sometimes more severely on the anode. For example, a decomposition product comprising lithium (or other carrier ions) and electrolyte components, known as solid electrolyte interphase (SEI), may readily form on the surfaces of carbon anodes. These surfaces or covering layers are carrier ion conductors, which establish an ionic connection between the anode and the electrolyte and prevent the reactions from proceeding any further.

Although formation of the SEI layer is desired for the stability of a half-cell system comprising the anode and the electrolyte, a portion of the carrier ions introduced into the cells via the cathode is irreversibly bound and thus removed from cyclic operation, i.e., from the capacity available to the user. As a result, during the initial discharge, fewer carrier ions are returned to the cathode from the anode than was initially provided by the cathode during the initial charging operation, leading to irreversible capacity loss. During each subsequent charge and discharge cycle, the capacity losses resulting from mechanical and/or electrical degradation to the anode and/or the cathode tend to be much less per cycle, but even the relatively small carrier ion losses per cycle contribute significantly to reductions in energy density and cycle life as the battery ages. In addition, chemical and electrochemical degradation may also occur on the electrodes and cause capacity losses. To compensate for the formation of SEI (or another carrier ion-consuming mechanism such as mechanical and/or electrical degradation of the negative electrode), additional or supplementary carrier ions may be provided from an auxiliary electrode after formation of the battery.

In general, the positive electrode 208 of the secondary battery 100 (e.g., the collective population of the cathode structures 206 in the secondary battery 100) preferably has a reversible coulombic capacity that is matched to the discharge capacity of the negative electrode 209 (e.g., the collective population of the anode structures 207 in the secondary battery 100). Stated differently, the positive electrode 208 of the secondary battery 100 is sized to have a reversible coulombic capacity that corresponds to the discharge capacity of the negative electrode 209 which, in turn, is a function of the negative electrode 209 end of discharge voltage.

In some embodiments, the negative electrode 209 of the secondary battery 100 (e.g., the collective population of the anode structures 207 in the secondary battery 100) is designed to have a reversible coulombic capacity that exceeds the reversible coulombic capacity of the positive electrode 208. For example, in one embodiment, a ratio of the reversible coulombic capacity of the negative electrode 209 to the reversible coulombic capacity of the positive electrode 208 is at least 1.2:1, respectively. By way of further example, in one embodiment, a ratio of the reversible coulombic capacity of the negative electrode 209 to the reversible coulombic capacity of the positive electrode 208 is at least 1.3:1, respectively. By way of further example, in one embodiment, a ratio of the reversible coulombic capacity of the negative electrode 209 to the reversible coulombic capacity of the positive electrode 208 is at least 2:1, respectively. By way of further example, in one embodiment, a ratio of the reversible coulombic capacity of the negative electrode 209 to the reversible coulombic capacity of the positive electrode 208 is at least 3:1, respectively. By way of further example, a ratio of the reversible coulombic capacity of the negative electrode 209 to the reversible coulombic capacity of the positive electrode 208 is at least 4:1, respectively. By way of further example, a ratio of the reversible coulombic capacity of the negative electrode 209 to the reversible coulombic capacity of the positive electrode 208 is at least 5:1, respectively. Advantageously, the excess coulombic capacity of the negative electrode 209 provides a source of anodically active material to allow the secondary battery 100 to reversibly operate within a specified voltage that inhibits formation of crystalline phases (incorporating carrier ions) on the negative electrode 209 that reduce cycle-life of the negative electrode 209 as result of cycling.

As previously noted, the formation of SEI during the initial charge/discharge cycle reduces the amount of carrier ions available for reversible cycling. Mechanical and/or electrical degradation of the negative electrode 209 during cycling of the secondary battery 100 may further reduce the amount of carrier ions available for reversible cycling. To compensate for the formation of SEI (or another carrier ion-consuming mechanism such as mechanical and/or electrical degradation of the negative electrode), therefore, additional or supplementary carrier ions may be provided from an auxiliary electrode after formation of the secondary battery 100. In the embodiments of the present disclosure, the auxiliary electrode is used to electrochemically transfer additional carrier ions to the positive electrode 208 and/or the negative electrode 209 of the secondary battery 100 during and/or after formation. In one embodiment, the auxiliary electrode is removed after transferring the additional carrier ions to the secondary battery 100 in order to improve the energy density of the secondary battery in its final form.

Figure 5:
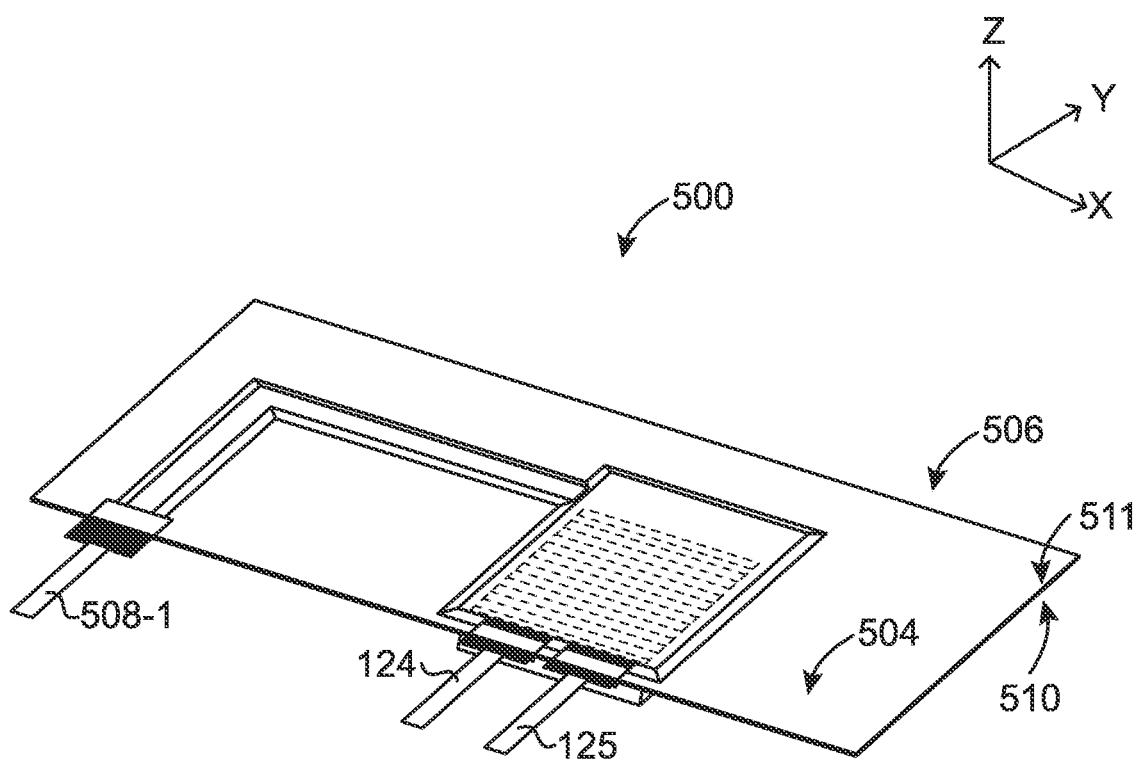
FIG. 5 depicts a perspective view of a buffer system of an exemplary embodiment.
Figure 6:
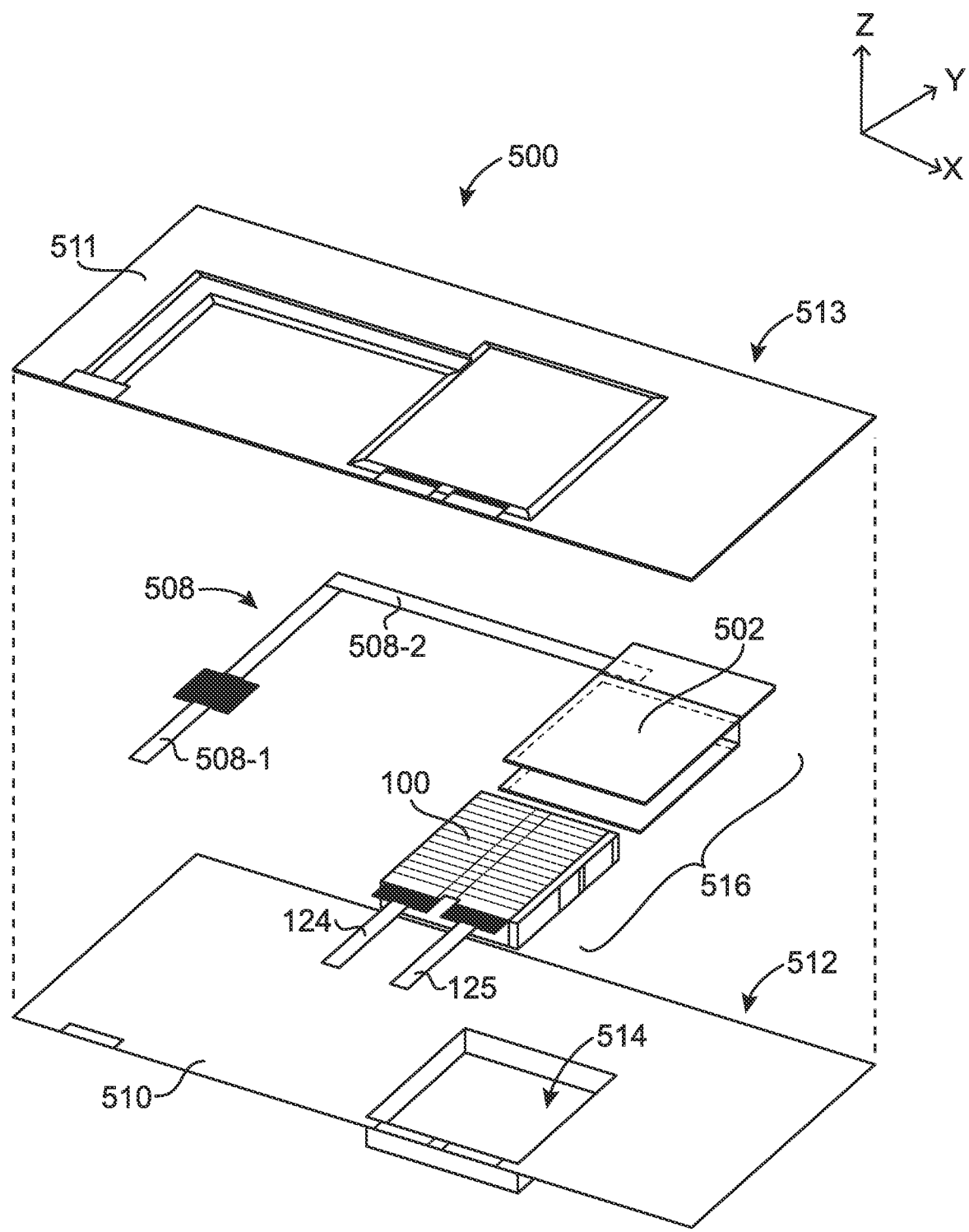
FIG. 6 depicts an exploded view of the buffer system of FIG. 5.

FIG. 5 is a perspective view of a buffer system 500 of an exemplary embodiment, and FIG. 6 is an exploded view of the buffer system 500. Generally, the buffer system 500 may be temporarily assembled during or after initial formation of the secondary battery 100 and the buffer system 500 is used to introduce additional carrier ions into the positive electrode 208 and/or the negative electrode 209 of the secondary battery 100 using an auxiliary electrode 502 (see FIG. 6). In this embodiment, the buffer system 500 includes an enclosure 504 that encapsulates the auxiliary electrode 502 (see FIG. 6) and the secondary battery 100 within a perimeter 506 of the enclosure 504. In FIG. 5, the electrical terminals 124, 125 of the secondary battery 100 and a segment of a conductive tab 508-1 extend from the perimeter 506 of the enclosure 504, providing electrical connections to the auxiliary electrode 502 and the secondary battery 100. In this embodiment, the enclosure 504 comprises a first enclosure layer 510 and a second enclosure layer 511 that are joined together to form the enclosure 504.

Referring to FIG. 6, the first enclosure layer 510 has a perimeter 512 and the second enclosure layer 511 has a perimeter 513. Each of the enclosure layers 510, 511 may comprise a flexible or semi-flexible material, such as aluminum, polymer, a thin film flexible metal, or the like. In one embodiment, one or more of the enclosure layers 510, 511 comprises a multi-layer aluminum polymer material, plastic, or the like. In another embodiment, one or more of the enclosure layers 510, 511 comprises a polymer material laminated on a metal substrate, such as aluminum. In one embodiment, the first enclosure layer 510 includes a pouch 514 (e.g., an indentation) that is sized and shaped to match the outer surface size and shape of the secondary battery 100.

The auxiliary electrode 502 partially surrounds the secondary battery 100 in the buffer system 500, and contains a source of carrier ions to replenish the lost energy capacity of the secondary battery 100 after formation (i.e., to compensate for the loss of carrier ions upon the formation of SEI and other carrier ion losses in the first charge and/or discharge cycle of the secondary battery 100). In embodiments, the auxiliary electrode 502 may comprise a foil of the carrier ions in metallic form (e.g., a foil of lithium, magnesium, or aluminum), or any of the previously mentioned materials used for the cathodically active material layers 106 and/or the anodically active material layers 104 (see FIG. 2) in their carrier ion-containing form. For example, the auxiliary electrode 502 may comprise lithiated silicon or a lithiated silicon alloy. When the buffer system 500 is assembled, the combination of the auxiliary electrode 502 and the secondary battery 100, which may be referred to as an auxiliary subassembly 516 (see FIG. 6), are inserted into the pouch 514, and the enclosure layers 510, 511 are sealed together to form the buffer system 500 as depicted in FIG. 5. The specific details of the assembly process for the buffer system 500 and how the buffer system 500 is used during a carrier ion transfer process to the secondary battery 100 will be discussed in more detail below. The auxiliary electrode 502 in this embodiment includes an electrically conductive tab 508, which may be segmented into a conductive tab 508-2 that is covered by the enclosure 504 and a conductive tab 508-1 that is partially exposed by the enclosure as depicted in FIG. 5, for example, for ease of manufacturing.

Figure 7:
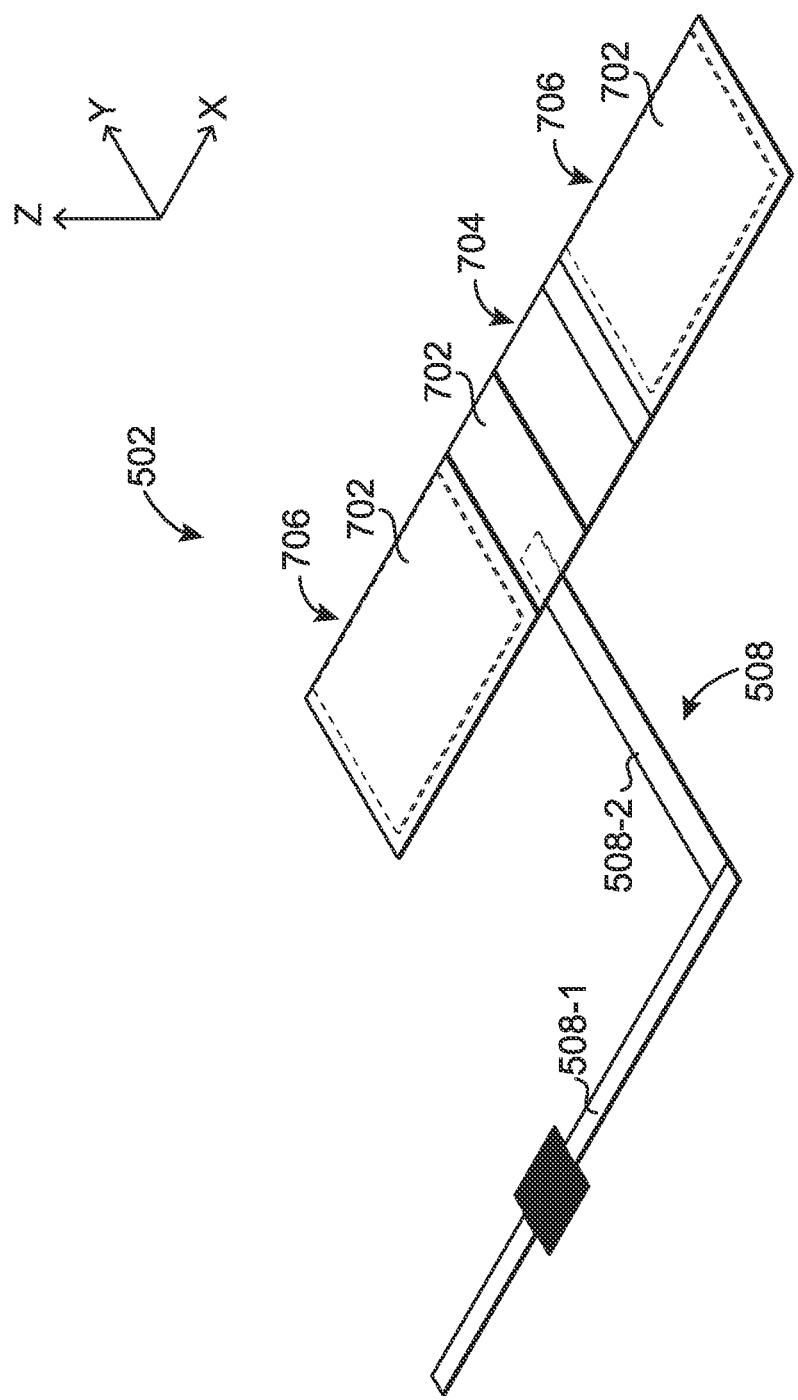
FIG. 7 depicts a perspective view of an auxiliary electrode of an exemplary embodiment.
Figure 8:
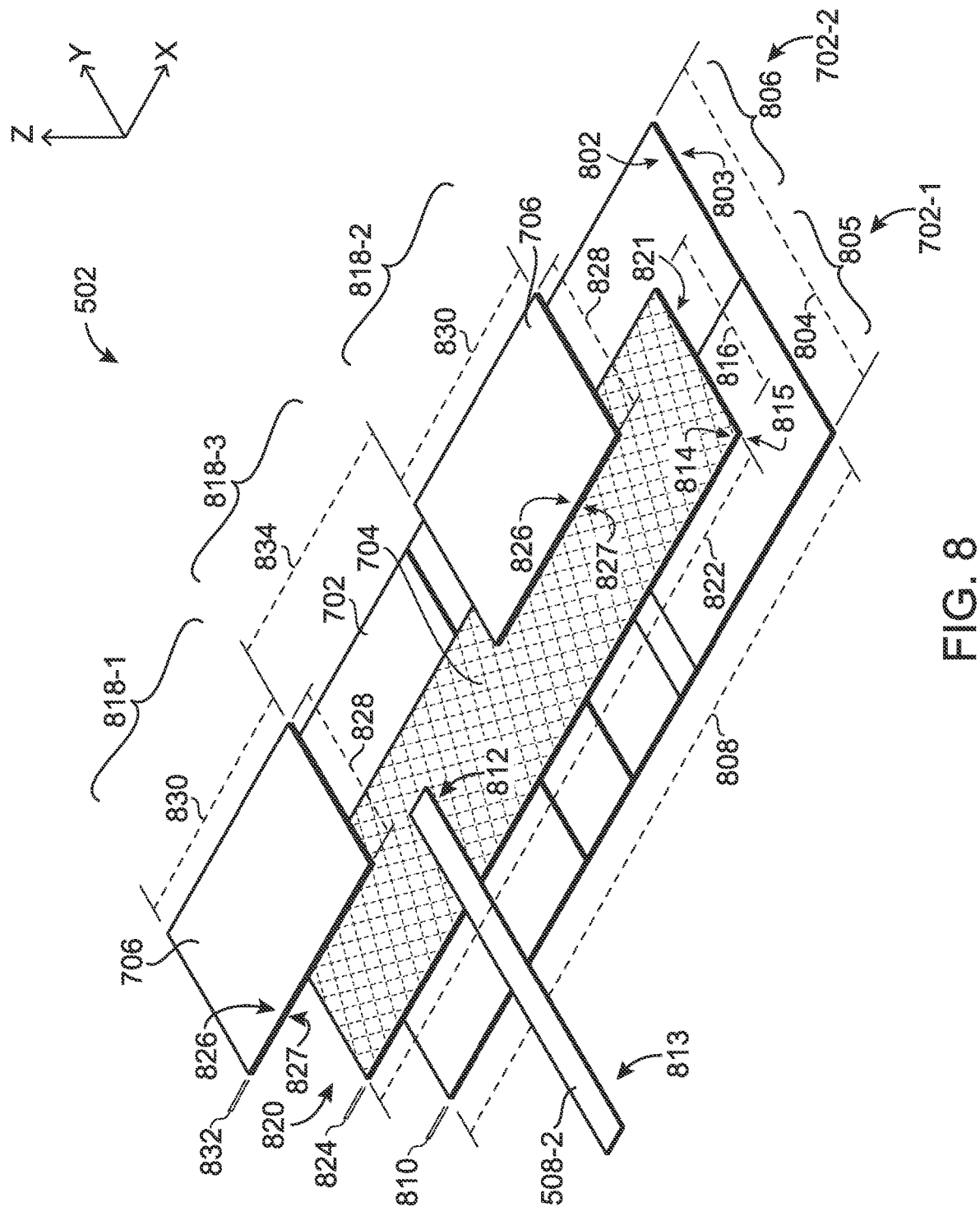
FIG. 8 depicts an exploded view of the auxiliary electrode of FIG. 7.

FIG. 7 is a perspective view of the auxiliary electrode 502 of an exemplary embodiment, and FIG. 8 is an exploded view of the auxiliary electrode. Referring to FIG. 7, the auxiliary electrode 502 generally includes a separator 702, which covers a conductive layer 704 and carrier ion supply layers 706. When the auxiliary electrode 502 is formed into the shape depicted in FIG. 6, the carrier ion supply layers 706 are located proximate to major surfaces 126, 127 of the secondary battery 100 (see FIG. 1), with the separator 702 insulating the casing 116 of the secondary battery 100 from the conductive layer 704 and the carrier ion supply layers 706. The separator 702 includes an electrolyte, which facilitates the transfer of carrier ions from the carrier ion supply layers 706 to the secondary battery 100 during a buffer process.

Referring to FIG. 8, the auxiliary electrode 502 includes, from bottom to top in FIG. 8, the separator 702, the conductive layer 704, and the population of carrier ion supply layers 706. The auxiliary electrode 502 in this embodiment further includes the conductive tab 508-2, which is electrically conductive and electrically coupled with the conductive layer 704. The conductive tab 508-2 provides an electrical connection with the auxiliary electrode 502. Generally, the auxiliary electrode 502 is used during the buffer process to transfer carrier ions from the carrier ion supply layers 706 to the positive electrode 208 and/or the negative electrode 209 of the secondary battery 100 during or after formation of the secondary battery 100.

The separator 702 may comprise any of the materials previously described with respect to the separator layer 108 of the secondary battery 100. The separator 702 may be permeated with an electrolyte that serves as a medium to conduct carrier ions from the carrier ion supply layers 706 to the positive electrode 208 of the secondary battery 100 and/or the negative electrode 209 of the secondary battery.

The electrolyte may comprise any of the materials previously described with respect to the secondary battery 100.

The separator 702 in this embodiment includes a first surface 802 and a second surface 803 that opposes the first surface 802. The surfaces 802, 803 of the separator 702 form major surfaces for the separator 702 and are disposed in the X-Y plane in FIG. 8. The separator 702 in this embodiment has a width 804 that extends in a direction of the Y-axis. The separator 702 in this embodiment is segmented in the width 804 into a first portion 805 and a second portion 806. In some embodiments, the separator 702 may comprise a first separator layer 702-1 corresponding to the first portion 805 and a second separator layer 702-2 corresponding to the second portion 806.

In one embodiment, the width 804 of the separator 702 is about 34 mm. In other embodiments, the width 804 of the separator is about 30 mm, about 35 mm, or another suitable value. In some embodiments, the width 804 of the separator 702 lies in a range of values of about 10 mm to about 200 mm, or some other suitable range that allows the separator 702 to function as described herein.

The separator 702, in one embodiment, has a length 808 that extends in a direction of the X-axis. In an embodiment, the length 808 of the separator 702 is about 72 mm. In other embodiments, the length 808 of the separator 702 is about 65 mm, about 70 mm, about 75 mm, or some other suitable value that allows the separator 702 to function as described herein. In some embodiments, the length 808 of the separator 702 lies in a range of values of about 30 mm to about 200 mm, or some other suitable range of values that allows the separator 702 to function as described herein.

In one embodiment, the separator 702 has a thickness 810 that extends in the direction of the Z-axis. Generally, the thickness 810 is a distance from the first surface 802 of the separator 702 to (and including) the second surface 803 of the separator. In one embodiment, the thickness 810 of the separator 702 is about 0.025 mm. In other embodiments, the thickness 810 of the separator 702 is about 0.015 mm, about 0.02 mm, about 0.03 mm, about 0.035 mm, or some other suitable value. In some embodiments, the thickness 810 of the separator 702 lies in a range of values of about 0.01 mm to about 1.0 mm, or some other suitable range of values that allows the separator 702 to function as described herein.

The conductive layer 704 is electrically conductive, and may comprise a metal, a metalized film, an insulating base material with a conductive material applied thereto, or some other type of electrically conductive material. In some embodiments, the conductive layer 704 comprises copper. In other embodiments, the conductive layer 704 comprises aluminum or another metal. In this embodiment, the conductive layer 704 is electrically coupled with the conductive tab 508-2, which is also electrically conductive. The conductive tab 508-2 has a first end 812 disposed proximate to the conductive layer 704 and a second end 813 disposed distal to the conductive layer 704 that opposes the first end 812. The first end 812 of the conductive tab 508-2 is electrically coupled to the conductive layer 704. In some embodiments, the first end 812 of the conductive tab 508-2 is spot-welded to the conductive layer 704. In other embodiments, the first end 812 of the conductive tab 508-2 is soldered to the conductive layer 704. Generally, the conductive tab 508-2 may be affixed at the first end 812 to the conductive layer 704 using any suitable means that ensure a mechanical connection and an electrical connection to the conductive layer. The conductive tab 508-2 may comprise any type of electrically conductive material as desired. In one embodiment, the conductive tab 508-2 comprises a metal. In these embodiments, the conductive tab 508-2 may comprise nickel, copper, aluminum, or other suitable metals or metal alloys that allows the conductive tab 508-2 to function as described herein.

The conductive layer 704 in this embodiment includes a first surface 814 and a second surface 815 that opposes the first surface 814. The surfaces 814, 815 of the conductive layer 704 form major surfaces for the conductive layer 704 and are disposed in the X-Y plane in FIG. 8. The conductive layer 704 in this embodiment has a width 816 that extends in a direction of the Y-axis. In an embodiment, the width 816 of the conductive layer 704 is about 15 mm. In other embodiments, the width 816 of the conductive layer 704 is about 10 mm, about 20 mm, or some other suitable value that allows the conductive layer 704 to function as described herein.

In some embodiments, the width 816 of the conductive layer 704 lies in a range of values of about 5 mm to about 100 mm, or some other suitable range of values that allows the conductive layer 704 to function as described herein. The first surface 814 of the conductive layer 704 in this embodiment is segmented into a first region 818-1, disposed proximate to a first end 820 of the conductive layer 704, a second region 818-2, disposed proximate to a second end 821 of the conductive layer 704, and a third region 818-3 disposed between the first region 818-1 and the second region 818-2.

The conductive layer 704 has a length 822 that extends in a direction of the X-axis. In one embodiment, the length 822 of the conductive layer 704 is about 70 mm. In other embodiments, the length 822 of the conductive layer 704 is about 60 mm, about 65 mm, about 75 mm, or some other suitable value that allows the conductive layer 704 to function as described herein. In some embodiments, the length 822 of the conductive layer 704 lies in a range of values of about 30 mm to about 200 mm, or some other suitable range of values that allows the conductive layer 704 to function as described herein.

The conductive layer 704 has a thickness 824 that extends in a direction of the Z-axis. Generally, the thickness 824 is a distance from the first surface 814 of the conductive layer 704 to (and including) the second surface 815 of the conductive layer 704. In one embodiment, the thickness 824 of the conductive layer 704 is about 0.1 mm. In other embodiments, the thickness 824 of the conductive layer 704 is about 0.005 mm, about 0.15 mm, or about 0.2 mm. In some embodiments, the thickness 824 of the conductive layer 704 lies in a range of values of about 0.01 mm to about 1.0 mm, or any other suitable range for the thickness that allows the conductive layer 704 to function as described herein.

The carrier ion supply layers 706, which comprise a population of carrier ion supply layers 706 in an embodiment, comprise any carrier ion containing material previously described that may be utilized to supply carrier ions to the positive electrode 208 and/or the negative electrode 209 of the secondary battery 100. The carrier ion supply layers 706 may comprise one or more sources of lithium ions, sodium ions, potassium ions, calcium ions, magnesium ions, and aluminum ions. In this embodiment, the carrier ion supply layers 706 are disposed within the first region 818-1 and the second region 818-2 of the conductive layer 704. In some embodiments, the carrier ion supply layers 706 are also disposed in the third region 818-3 of the conductive layer 704.

The carrier ion supply layers 706 in this embodiment include a first surface 826 and a second surface 827 that opposes the first surface 826. The surfaces 826, 827 of the carrier ion supply layers 706 form major surfaces for the carrier ion supply layers 706 and are disposed in the X-Y plane in FIG. 8. The carrier ion supply layers 706 in this embodiment have a width 828 that extends in a direction of the Y-axis. In an embodiment, the width 828 of the carrier ion supply layers 706 are about 15 mm. In other embodiments, the width 828 of the carrier ion supply layers 706 are about 10 mm, about 20 mm, or some other suitable value that allow the carrier ion supply layers 706 to function as described herein. In some embodiments, the width 828 of the carrier ion supply layers 706 lies in a range of values of about 5 mm to about 100 mm, or some other suitable range of values that allows the carrier ion supply layers 706 to function as described herein.

The carrier ion supply layers 706, in one embodiment, have a length 830 that extends in a direction of the X-axis. In an embodiment, the length 830 of the carrier ion supply layers 706 are about 23 mm. In other embodiments, the length 830 of the carrier ion supply layers 706 are about 15 mm, about 20 mm, about 25 mm, or some other suitable length that allows the carrier ion supply layers 706 to function as described herein. In some embodiments, the length 830 of the carrier ion supply layers 706 lie in a range of values of about 10 mm to about 100 mm, or some other suitable range of values that allow the carrier ion supply layers 706 to function as described herein.

The carrier ion supply layers 706 each have a thickness 832 that extends in a direction of the Z-axis. Generally, the thickness 832 is a distance between the first surface 826 of the carrier ion supply layers 706 and the second surface 827 of the carrier ion supply layers 706. In one embodiment, the thickness 832 of the carrier ion supply layers 706 are about 0.13 mm. In other embodiments, the thickness 832 of the carrier ion supply layers 706 are about 0.005 mm, about 0.15 mm, or about 0.2 mm. In some embodiments, the thickness 832 of the carrier ion supply layers 706 lie in a range of values of about 0.01 mm to about 1.0 mm, or any other suitable range of values for the thickness 832 that allows the carrier ion supply layers 706 to function as described herein.

In this embodiment, the carrier ion supply layers 706 are separated from each other by a distance 834, corresponding to the third region 818-3. In one embodiment, the distance 834 is about 23 mm. In other embodiments, the distance 834 is about 15 mm, about 20 mm, about 25 mm, or about 30 mm. In some embodiments, the distance 834 lies in a range of values of about 10 mm to about 50 mm, or any other suitable range of values that allows the carrier ion supply layers 706 to function as described herein.

In one embodiment, the carrier ion supply layers 706 are sized to be capable of providing at least 15% of the reversible coulombic capacity of the positive electrode 208 of the secondary battery 100. For example, in one such embodiment, the carrier ion supply layers 706 are sized such that they contain sufficient carrier ions (e.g., lithium, magnesium, or aluminum ions) to provide at least 30% of the reversible coulombic capacity of the positive electrode 208 of the secondary battery 100. By way of further example, in one such embodiment, the carrier ion supply layers 706 are sized such that they contain sufficient carrier ions to provide at least 100% of the reversible coulombic capacity of the positive electrode 208 of the secondary battery 100. By way of further example, in one such embodiment, the carrier ion supply layers 706 are sized such that they contain sufficient carrier ions to provide at least 200% of the reversible coulombic capacity of the positive electrode 208 of the secondary battery 100. By way of further example, in one such embodiment, the carrier ion supply layers 706 are sized such that they contain sufficient carrier ions to provide at least 300% of the reversible coulombic capacity of the positive electrode 208 of the secondary battery 100. By way of further example, in one such embodiment, the carrier ion supply layers 706 are sized such that they contain sufficient carrier ions to provide about 100% to about 200% of the reversible coulombic capacity of the positive electrode 208 of the secondary battery 100.

During an assembly process for the auxiliary electrode 502, the separator 702 may be cut from stock material or prefabricated to achieve the width 804 and the length 808 as shown in FIG. 8. The conductive layer 704 may be cut from stock material or prefabricated to achieve the width 816 and the length 822 shown in FIG. 8. In some embodiments, the conductive layer 704 is prefabricated to include the conductive tab 508-2 with the first end 812 mechanically and electrically affixed to the conductive layer 704 as depicted in FIG. 8. In other embodiments, the conductive tab 508-2 is cut from a stock material and mechanically and electrically coupled with the conductive layer 704 (e.g., by spot welding or soldering first end 812 to the conductive layer 704). In some embodiments, the carrier ion supply layers 706 are cut to size from stock materials, and bonded or otherwise laminated to the conductive layer 704 (e.g. by cold welding the carrier ion supply layers 706 onto the conductive layer 704) to achieve the orientation depicted in FIG. 8, with the second surface 827 of the carrier ion supply layers 706 in contact with the first surface 814 of the conductive layer 704. For example, the material used to form the carrier ion supply layers 706 (e.g., lithium) may exist in stock form as rolls of lithium sheets that are cut to size.

In other embodiments, the conductive layer 704 is prefabricated to include the carrier ion supply layers 706 arranged in the orientation depicted in FIG. 8. In this embodiment, the conductive layer 704 is disposed within the first portion 805 of the separator 702 in a direction of the X-axis, with the second surface 815 of the conductive layer 704 contacting the first surface 802 of the separator 702.

Figure 9:
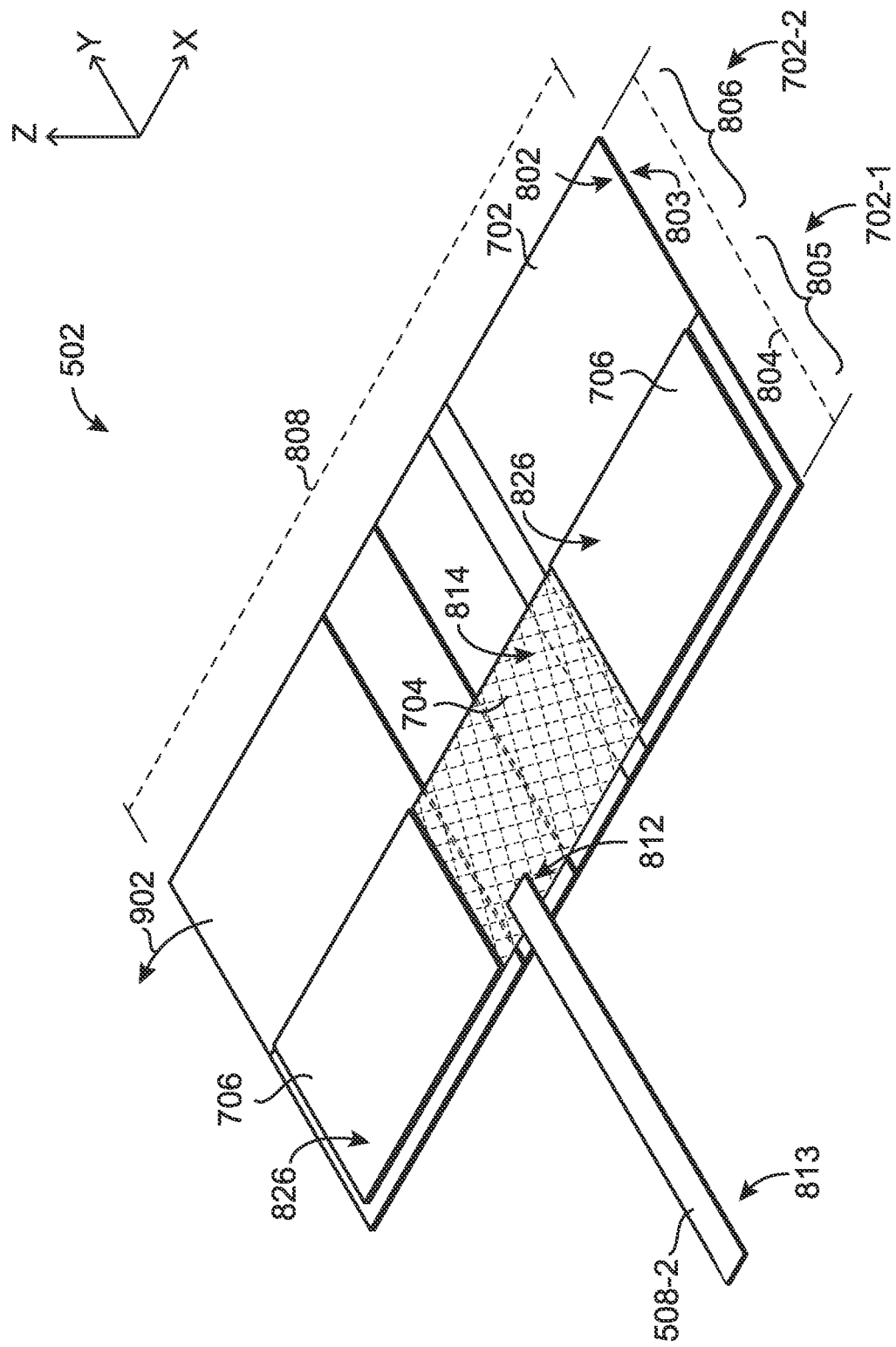
FIG. 9 is a perspective view of the auxiliary electrode of FIG. 7 at a stage in an assembly process for the auxiliary electrode of FIG. 7.

FIG. 9 is a perspective view of the auxiliary electrode 502 at an intermediate stage of the fabrication process for the auxiliary electrode. At this stage, the conductive layer 704 is disposed on the first portion 805 of the separator 702, and the conductive tab 508-2 extends to the left (in the Y-axis direction) in FIG. 9 from the first end 812, which is affixed to the conductive layer 704, away from the separator 702 and the conductive layer 704 towards the second end 813. The first surface 802 of the separator 702 is covered by the conductive layer 704 within the first portion 805 of the separator 702, while the first surface 802 of separator remains uncovered within the second portion 806 of the separator 702.

To continue the fabrication process of the auxiliary electrode 502, in one embodiment, the second portion 806 of the separator 702 is folded in the direction of an arrow 902 towards the left (about an axis parallel to the X-axis) in FIG. 9, such that the first surface 802 within the second portion 806 of the separator 702 contacts the first surfaces 826 of the carrier ion supply layers 706 and the first surface 814 of the conductive layer 704 that is exposed between the carrier ion supply layers 706. When the separator 702 comprises the first separator layer 702-1 and the second separator layer 702-2, the second separator layer may be placed such that the first surface 802 of the second separator layer contacts the first surfaces 826 of the carrier ion supply layers 706 and the first surface 814 of the conductive layer 704 that is exposed between the carrier ion supply layers 706.

Figure 10:
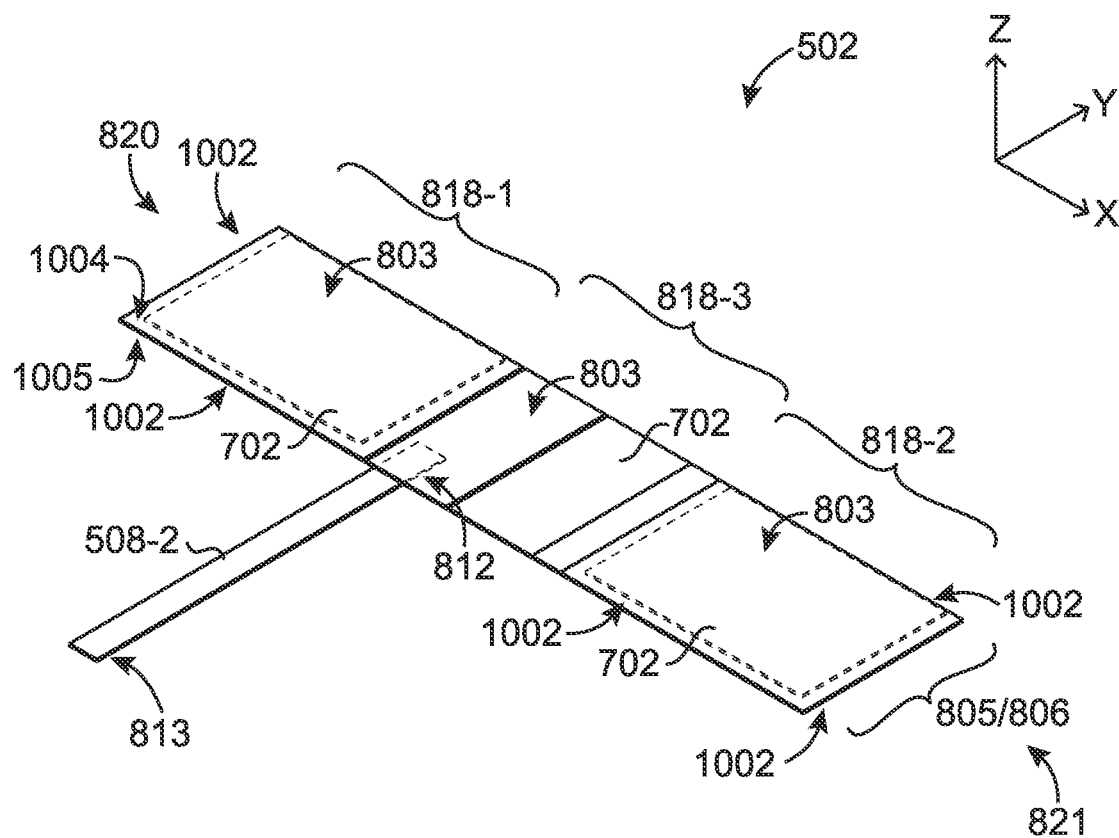
FIG. 10 is a perspective view of the auxiliary electrode of FIG. 7 at another stage in an assembly process for the auxiliary electrode of FIG. 7.

FIG. 10 is a perspective view of the auxiliary electrode 502 at another intermediate stage in the fabrication process, after folding the second portion 806 of the separator 702 as described above. At this stage, the separator 702 encapsulates the conductive layer 704 and the carrier ion supply layers 706, leaving a portion between the first end 812 of the conductive tab 508-2 and the second end 813 of the conductive tab 508-2 uncovered by the separator 702. The separator 702 may then be bonded to itself along at least a portion of an outer perimeter 1002 of the separator to encapsulate the conductive layer 704 within the first portion 805 of the separator and the second portion 806 of the separator along the first surface 802 of the separator (not visible in FIG. 10).

Figure 11:
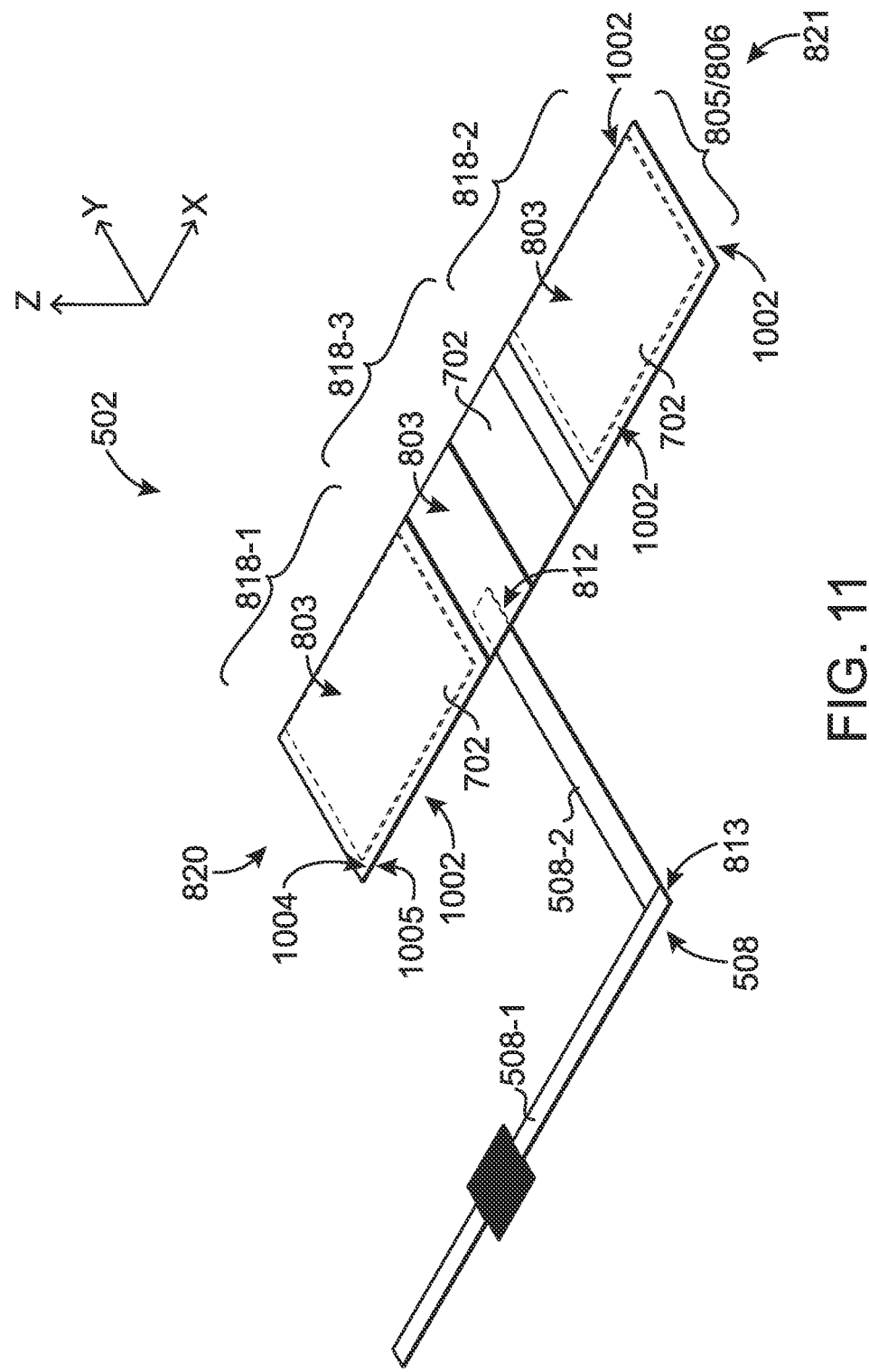
FIG. 11 is a perspective view of the auxiliary electrode of FIG. 7 at yet another stage in an assembly process that adds an extension tab to the auxiliary electrode of FIG. 7.

In one embodiment, the separator 702 is bonded to itself along at least a portion of an outer perimeter 1002 of the separator using a hot melt process, a welding process, a bonding process, etc. In FIG. 10, the auxiliary electrode 502 at this stage includes a first side 1004 and a second side 1005 that opposes the first side 1004. The first side 1004 includes the second surface 803 of the separator 702, which covers the carrier ion supply layers 706 in first region 818-1 proximate to first end 820 of the conductive layer 704 (not visible in FIG. 10) and the second region 818-2 proximate to the second end 821 of the conductive layer 704 (not visible in this view). In FIG. 10, the first region 818-1 is proximate to the first end 812 of the conductive tab 508-2 and the second region 818-2 is disposed away from the first end 812 of the conductive tab 508-2. The first end 812 of the conductive tab 508-2 is electrically coupled to the conductive layer 704 within the third region 818-3 of the conductive layer 704. In some embodiments, the conductive tab 508 may be extended (e.g., with the conductive tab 508-1, as shown in FIG. 11, which depicts the auxiliary electrode 502 after assembly).

Figure 12:
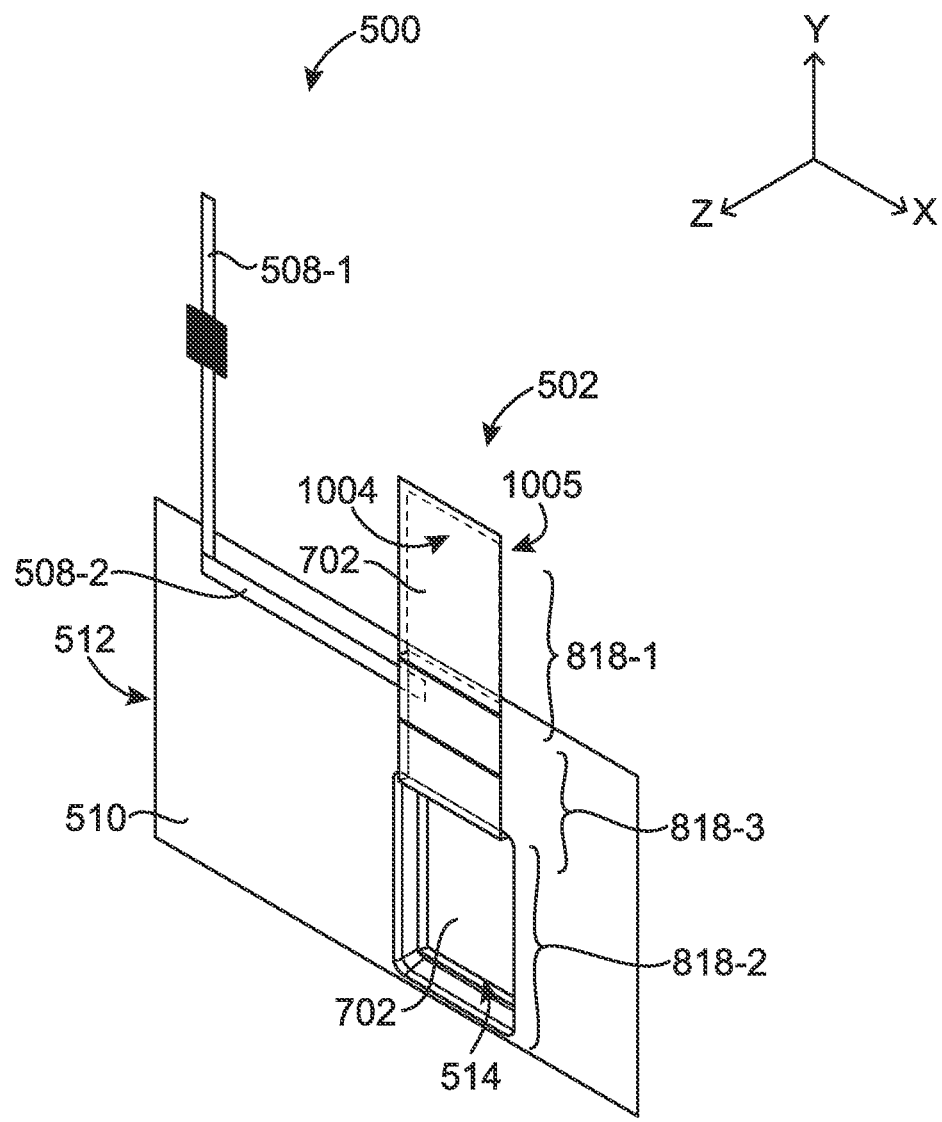
FIG. 12 is a perspective view of the buffer system of FIG. 5 at a stage in an assembly process for the buffer system.

In response to fabricating the auxiliary electrode 502, performing a fabrication process for the buffer system 500 (see FIGS. 6 and 7) continues as follows. FIGS. 12-16 are perspective views of the buffer system 500 during various stages in a fabrication process. Referring to FIG. 12, the second region 818-2 of the auxiliary electrode 502 is inserted into the pouch 514 of the first enclosure layer 510, with the second side 1005 of the auxiliary electrode disposed towards the first enclosure layer 510 within the pouch 514 and the first side 1004 of the auxiliary electrode disposed away from the first enclosure layer 510 within the pouch 514. The third region 818-3 and the first region 818-1 of the auxiliary electrode 502 extend away from the pouch 514 in the direction of the Y-axis.

Figure 13:
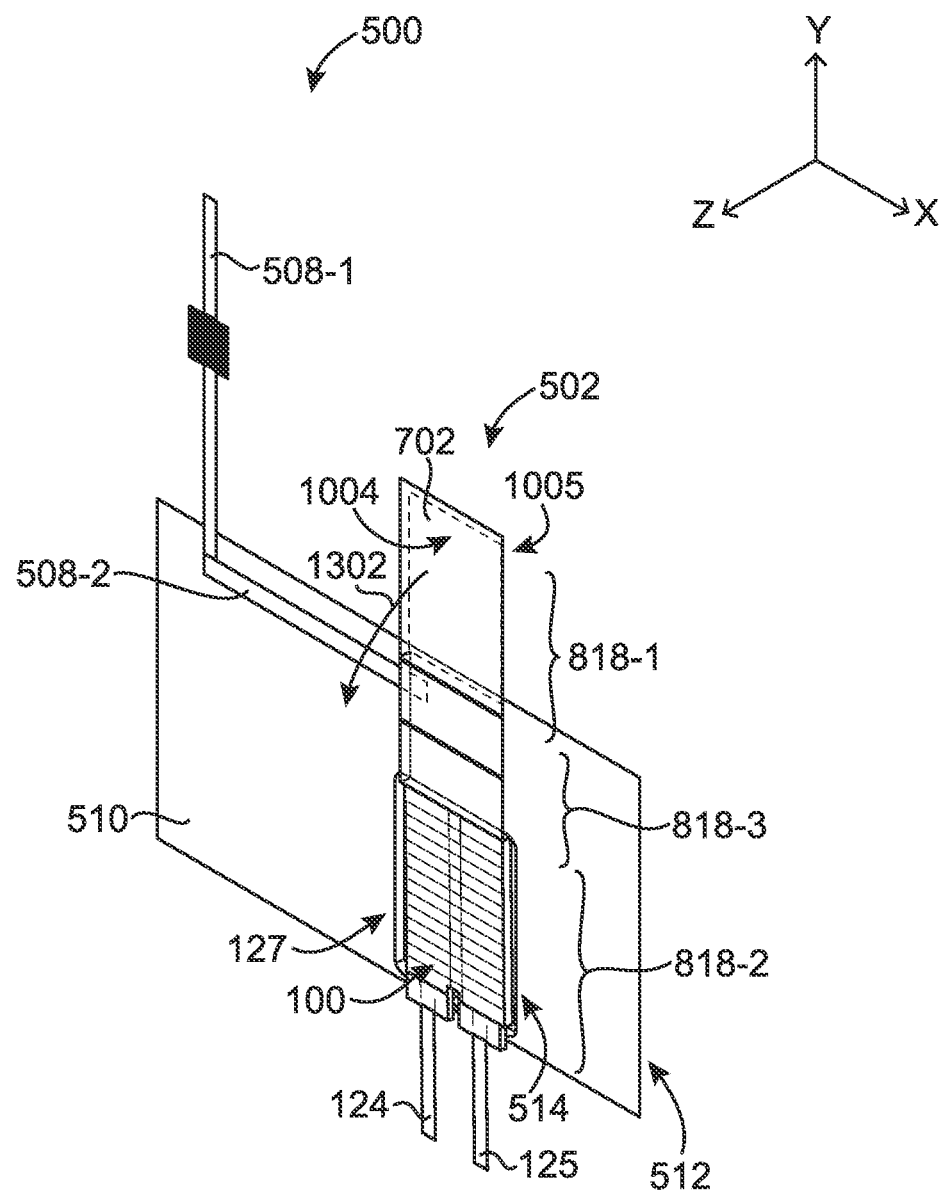
FIG. 13 is a perspective view of the buffer system of FIG. 5 at another stage in an assembly process for the buffer system.

With the auxiliary electrode 502 oriented within the pouch 514 as depicted in FIG. 12, the secondary battery 100 is placed on the auxiliary electrode 502 within the pouch 514, which corresponds to the second region 818-2 of the auxiliary electrode 502 (see FIG. 13). In this embodiment, the first major surface 126 of the secondary battery 100 (see FIG. 1, not visible in FIG. 13) contacts the auxiliary electrode 502 within the pouch 514 and the second major surface 127 of the secondary battery is disposed away from the auxiliary electrode 502. The electrical terminals 124, 125 of the secondary battery 100 extend away from the pouch 514 in the direction of the Y-axis in FIG. 13, placing the electrical terminals outside of the perimeter 512 of the first enclosure layer 510. At this stage of the fabrication process for the buffer system 500, in one embodiment, an electrolyte is added to the pouch 514. In another embodiment, the separator 702 of the auxiliary electrode 502 is pre-impregnated with the electrolyte.

Figure 14:
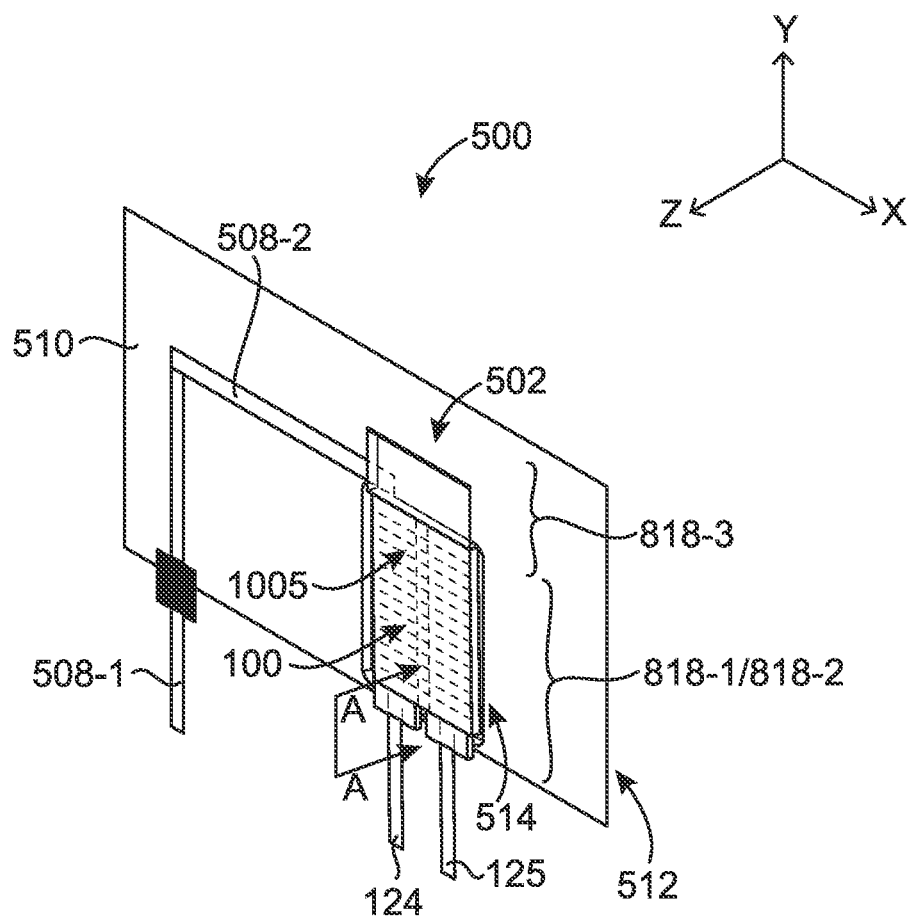
FIG. 14 is a perspective view of the buffer system of FIG. 5 at yet another stage in an assembly process for the buffer system.

With the secondary battery 100 loaded onto the second region 818-2 of the auxiliary electrode 502 within the pouch 514, the auxiliary electrode 502 is folded in the direction of an arrow 1302 in order to position the first side 1004 of the first region 818-1 of the auxiliary electrode 502 in contact with the second major surface 127 of the secondary battery 100, the result of which is depicted in FIG. 14. In this configuration, both major surfaces 126, 127 of the secondary battery 100 (see FIG. 1) are electrochemically coupled with the carrier ion supply layers 706 of the auxiliary electrode 502, using the separator 702 (see FIGS. 7-11) and an electrolyte disposed between each of the major surfaces 126, 127 of the secondary battery 100 and the carrier ion supply layers 706.

Figure 15:
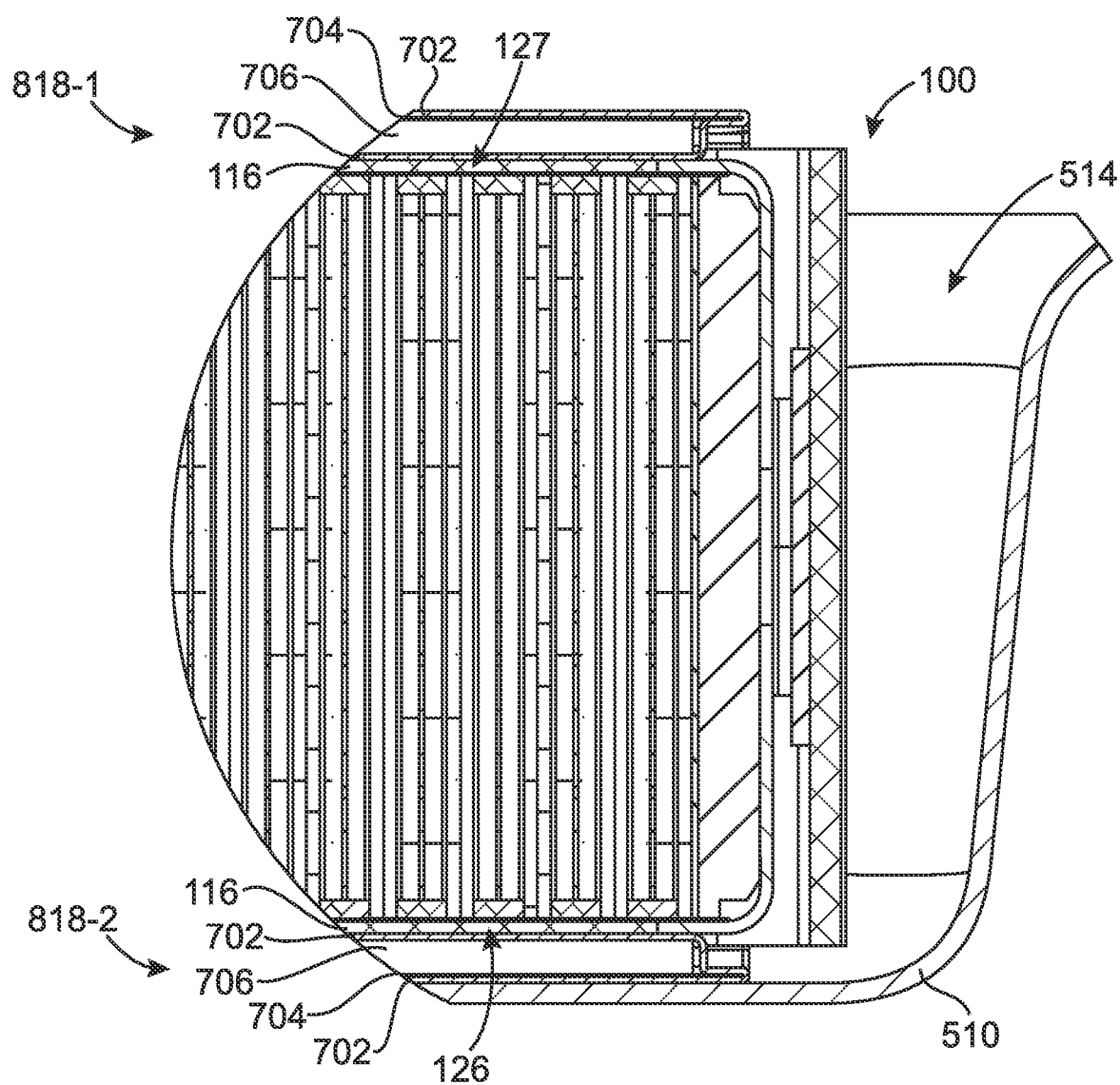
FIG. 15 is a cross-sectional view of a portion of the buffer system of FIG. 14.

FIG. 15 is a cross-sectional view of the buffer system 500 along cut lines A-A of FIG. 14. In this view, the layers of the buffer system 500 at the pouch 514 of the first enclosure layer 510 are visible. In particular, FIG. 15 illustrates the placement of the secondary battery 100 and the auxiliary electrode 502 in the pouch 514, and specifically, from top to bottom in stacked succession, the separator 702, the conductive layer 704, one of the carrier ion supply layers 706, the separator 702, and the second major surface 127 of the secondary battery 100 at the casing 116. FIG. 15 further illustrates, from bottom to top in stacked succession, the first enclosure layer 510, the separator 702, the conductive layer 704, one of the carrier ion supply layers 706, the separator 702, and the first major surface 126 of the secondary battery 100 at the casing 116.

Figure 16:
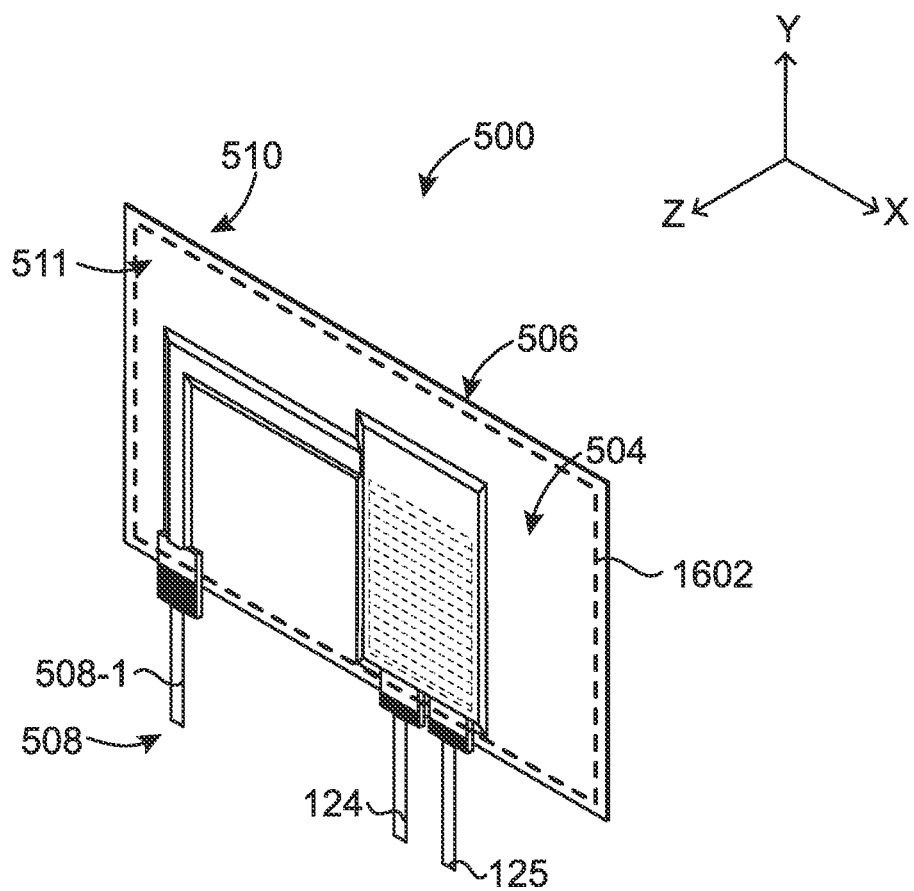
FIG. 16 is a perspective view of the buffer system of FIG. 5 at yet another stage in an assembly process for the buffer system.

With the secondary battery 100 sandwiched by the auxiliary electrode 502 within the pouch 514 as illustrated in FIG. 15, the second enclosure layer 511 is aligned to the first enclosure layer 510, as depicted in FIG. 16. After proper placement of the second enclosure layer 511 relative to the first enclosure layer 510, the enclosure layers 510, 511 are sealed along a sealing line 1602 (denoted by the dashed line in FIG. 16) to form the enclosure 504. The enclosure layers 510, 511 may be sealed along the sealing line 1602 by welding, heat sealing, adhesive, combinations thereof, or the like. In another embodiment, the enclosure layers 510, 511 may be sealed along three sides of the sealing line 1602 creating a pocket therein. In this embodiment, the secondary battery 100 may be placed within the pocket, and the final edge of the sealing line 1602 is subsequently sealed. In one embodiment, the sealing line 1602 is sealed using a hot press, that applies a controlled temperature and pressure to the sealing line 1602 causing the enclosure layers 510, 511 to adhere or fuse together along the sealing line 1602. In another embodiment, a vacuum is applied to the secondary battery 100 during the sealing process to evacuate any excess volume occupied by air or other gas. The time for which the sealing line 1602 is subject to the hot press may be controlled and is dependent upon the materials selected for the enclosure layers 510, 511. Once sealed over the secondary battery 100, the sealed enclosure layers 510, 511 form the buffer system 500. Upon sealing, the buffer system 500 is liquid tight and/or air-tight, depending on the desired application. The electrical terminals 124 and 125 of the secondary battery 100 and the conductive tab 508-1 remain exposed and are not covered by the enclosure layers 510, 511 to allow for a subsequent buffer process to be applied to the secondary battery 100.

With the secondary battery 100 and the carrier ion supply layers 706 of the auxiliary electrode 502 (not visible in FIG. 16) electrochemically coupled together within the enclosure 504 of the buffer system 500, a carrier ion buffer process is performed on the secondary battery 100 during or after initial formation of the secondary battery 100. Generally, this carrier ion buffer process transfers carrier ions from the carrier ion supply layers 706 of the auxiliary electrode 502 into each of the first major surface 126 of the secondary battery 100 and the second major surface 127 of the secondary battery 100 (see FIG. 15). Generally, transferring the carrier ions to the secondary battery 100 from both major surfaces 126, 127 of the secondary battery 100, as depicted in FIG. 15, provides a technical benefit of distributing the forces generated by anode and/or cathode swelling more equally across the casing 116 of the secondary battery 100 as more carrier ions are loaded into the anode and/or the cathode of the secondary battery 100.

Either prior to inserting the secondary battery 100 into the buffer system 500, or after, the secondary battery 100 is charged (e.g., via the electrical terminals 124, 125) by transferring carrier ions from the cathode structures 206 of the secondary battery to the anode structures 207 of the secondary battery. Charging may be discontinued when the positive electrode 208 of the secondary battery 100 reaches its the end-of-charge design voltage. During the initial charging cycle, SEI may form on the surfaces of the anode structures 207 of the secondary battery 100. To compensate for the loss of carrier ions to SEI, and to further provide additional carrier ions to mitigate the long term secondary reactions during cycling where carrier ions are lost due to side reactions, the positive electrode 208 and/or the negative electrode 209 of the secondary battery 100 may be replenished by applying a voltage across the auxiliary electrode 502 and the cathode structures 206 and/or the anode structures 207 (e.g., via the conductive tab 508-1 of the auxiliary electrode 502 and one of the electrical terminals 124, 125) to drive carrier ions from the carrier ion supply layers 706 of the auxiliary electrode 502 to the cathode structures 206 and/or the anode structures 207 of the secondary battery 100. Once the transfer of carrier ions from the auxiliary electrode 502 to the secondary battery 100 is complete, the negative electrode 209 of the secondary battery 100 is again charged, this time with carrier ions transferred from the cathode structures 206 of the secondary battery 100 to the anode structures 207 of the secondary battery.

In one embodiment, the amount of carrier ions transferred from the auxiliary electrode 502 to the secondary battery 100 during the buffer process is about 50% of the reversable columbic capacity of the positive electrode 208 of the secondary battery 100. In other embodiments, the amount of carrier ions transferred from the auxiliary electrode 502 to the secondary battery 100 during the buffer process is about 55%, about 60%, about 65%, about 70%, about 75%, about 80%, about 85%, about 90%, about 95%, or about 100% of the reversable columbic capacity of the positive electrode 208 of the secondary battery 100. In some embodiments, the amount of carrier ions transferred from the auxiliary electrode 502 to the secondary battery 100 lies in a range of values of about 1% to about 100% of the reversable columbic capacity of the positive electrode 208 of the secondary battery 100. In one particular embodiment, the negative electrode 209 of the secondary battery 100 has about 170% of the reversable columbic capacity of the positive electrode 208 of the secondary battery 100 stored as carrier ions when the secondary battery 100 is charged, and about 70% of the reversable columbic capacity of the positive electrode 208 of the secondary battery 100 stored as carrier ions when the secondary battery 100 is discharged. An excess of carrier ions at the negative electrode 209 of the secondary battery 100 provided during the buffer process provides a technical benefit of mitigating the loss of carrier ions at the secondary battery 100 due to SEI at initial formation. Further, an excess of carrier ions at the negative electrode 209 of the secondary battery 100 provided during the buffer process provides a technical benefit of mitigating the loss of carrier ions at the secondary battery 100 due to side reactions that deplete carrier ions in the secondary battery 100 as the secondary battery 100 is cycled during use, which reduces the capacity loss of the secondary battery 100 over time.

In some embodiments, transferring carrier ions from the auxiliary electrode 502 to the secondary battery 100 may occur concurrently with an initial formation of the secondary battery 100 (e.g., during the first charge of the secondary battery 100), and/or during a subsequent charge of the secondary battery 100 after initial formation. In these embodiments, carrier ions are transferred from the positive electrode 208 of the secondary battery 100 to the negative electrode 209 of the secondary battery 100. Concurrently with or based on a temporal delay or a temporal pattern, carrier ions are transferred from the auxiliary electrode 502 to the positive electrode 208 and/or the negative electrode 209 of the secondary battery 100.

In yet another embodiment, the positive electrode 208 may be replenished with carrier ions by simultaneously transferring carrier ions from the auxiliary electrode 502 to the positive electrode 208 of the secondary battery 100, while also transferring carrier ions from the positive electrode 208 of the secondary battery 100 to the negative electrode 209 of the secondary battery 100. Referring to FIG. 6, a voltage is applied across the electrical terminals 124, 125 of the secondary battery 100, to drive carrier ions from the positive electrode 208 to the negative electrode 209 of the secondary battery 100. While the carrier ions are being transferred from the positive electrode 208 to the negative electrode 209, a voltage is applied across the conductive tab 508-1 of the auxiliary electrode 502 and the positive electrode 208 of secondary battery 100 to drive carrier ions from the auxiliary electrode 502 to the positive electrode 208 of the secondary battery 100. Thus, carrier ions are transferred from the auxiliary electrode 502 to the positive electrode 208 of the secondary battery 100 at the same time that carrier ions are being transferred from the positive electrode 208 to the negative electrode 209 of the secondary battery 100. That is, a voltage is maintained across the positive electrode 208 and the negative electrode 209 of the secondary battery 100 that is sufficient to drive carrier ions from the positive electrode 208 to the negative electrode 209 of the secondary battery 100, at the same time that a voltage is maintained across the conductive tab 508-1 of the auxiliary electrode 502 and the positive electrode 208 of the secondary battery 100 that is sufficient to drive carrier ions from the auxiliary electrode 502 to the positive electrode 208. In another embodiment, the onset of transfer of carrier ions from the auxiliary electrode 502 to the positive electrode 208 of the secondary battery 100 may commence simultaneously with onset of the transfer of carrier ions from the positive electrode 208 to the negative electrode 209 of the secondary battery 100. In one embodiment, the rate of transfer of carrier ions from the positive electrode 208 to the negative electrode 209 of the secondary battery 100 is greater than or equal to the rate of transfer of carrier ions from the auxiliary electrode 502 to the positive electrode 208 of the secondary battery 100, such that a good overall rate of transfer of carrier ions from the auxiliary electrode 502 to the negative electrode 209 of the secondary battery 100 via the positive electrode 208 can be maintained. That is, the relative rates of transfer between the positive electrode 208 and the negative electrode 209 of the secondary battery 100, and the auxiliary electrode 502 and the positive electrode 208, may be maintained such that the overall capacity of the positive electrode 208 for additional carrier ions is not exceeded. The positive electrode 208 may thus be maintained in a state where it has the ability to accept new carrier ions from the auxiliary electrode 502, which may allow for subsequent transfer of carrier ions to the negative electrode 209 of the secondary battery 100.

In one embodiment, without being limited by any particular theory, the carrier ions are transferred from the auxiliary electrode 502 to the positive electrode 208 of the secondary battery 100 as a part of the replenishment of the negative electrode 209 of the secondary battery 100 (as opposed to transferring from the auxiliary electrode 502 directly to the negative electrode 209 of the secondary battery), because the positive electrode 208 may be capable of more uniformly accepting carrier ions across the surface thereof, thus allowing the carrier ions to more uniformly participate in the transfer thereof between the positive electrode 208 and the negative electrode 209 of the secondary battery 100.

Figure 17:
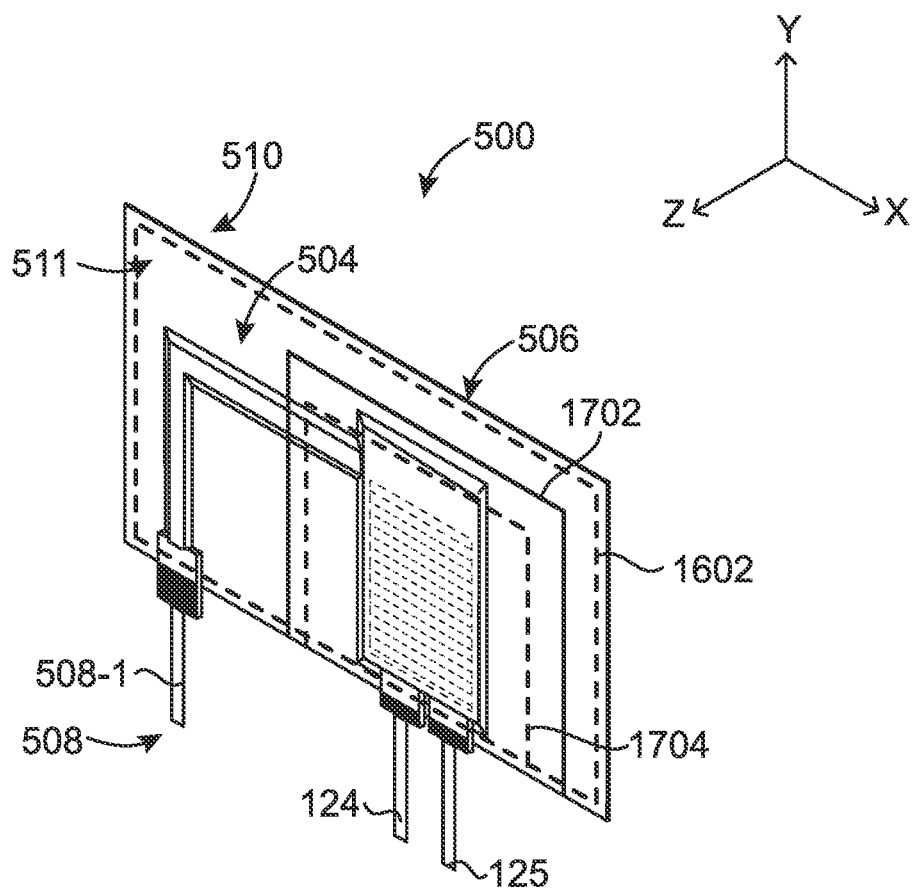
FIG. 17 is a perspective view of the buffer system of FIG. 5 subsequent to performing a buffer process on a secondary battery.

After the buffer process is performed on the secondary battery 100 utilizing the buffer system 500, the auxiliary electrode 502 may be removed from the buffer system 500 in order to improve the energy density of the secondary battery 100 in its final form. For example, after the buffer process, the carrier ion supply layers 706 (see FIG. 7) may have been removed from the conductive layer 704, having been electrochemically transferred to the secondary battery 100. Thus, the auxiliary electrode 502 may be superfluous at this point. To remove the auxiliary electrode 502 from the enclosure 504 after the buffer process is performed, the enclosure layers 510, 511 of the enclosure may be cut along cut lines 1702, illustrated in FIG. 17 as solid lines, allowing the enclosure layers 510, 511 to be peeled back proximate to the auxiliary electrode 502. The auxiliary electrode 502 is removed from the enclosure 504 of the buffer system 500, while the secondary battery 100 remains within the pouch 514 (see FIG. 12). The enclosure layers 510, 511 may then be re-sealed along a final sealing line 1704 illustrated as dashed lines to form the enclosure 504 in its final form prior to placing the secondary battery 100 in service. This re-seal may be performed using any of the previously described processes for sealing the first enclosure layer 510 and the second enclosure layer 511 together.

Figure 18:
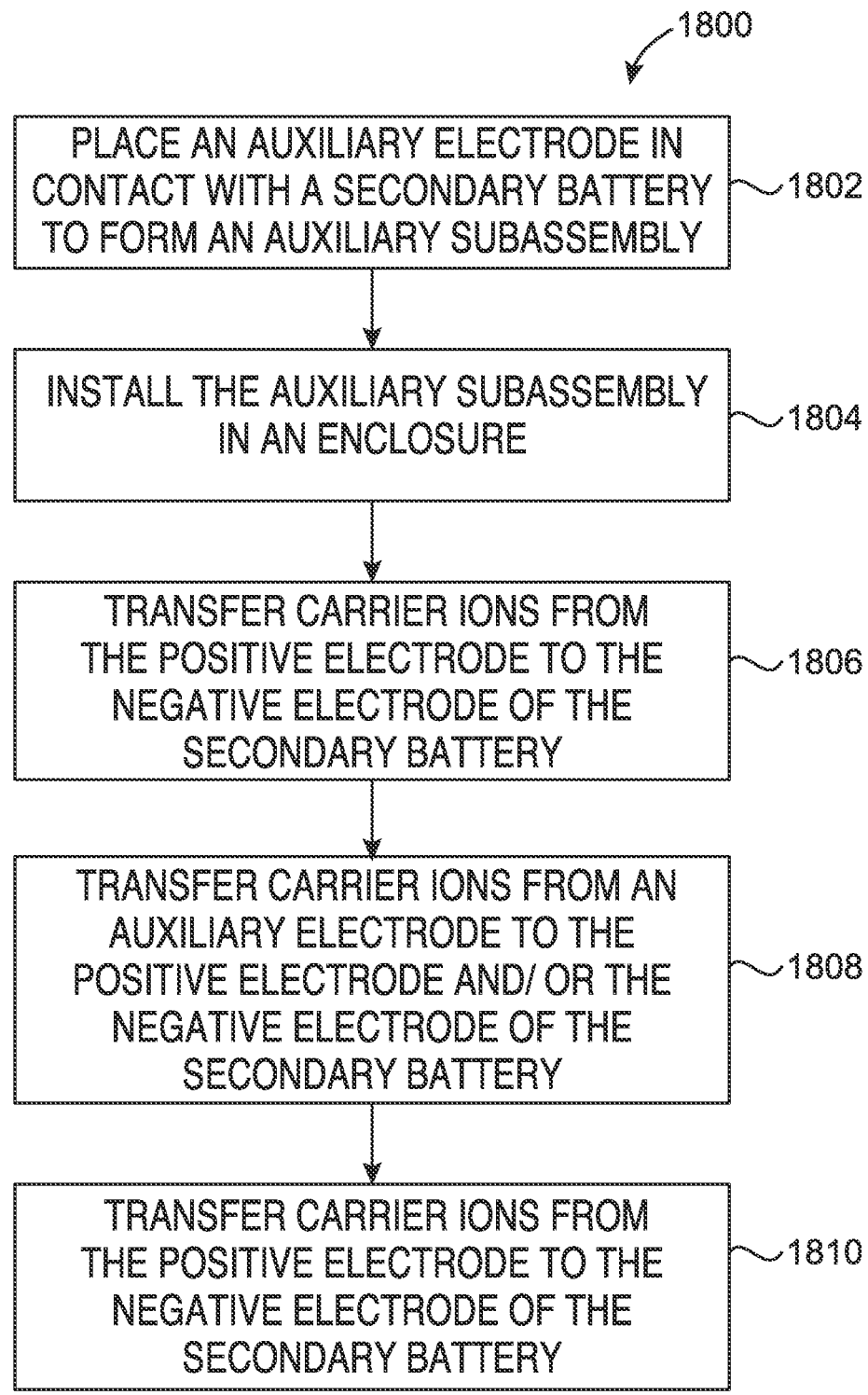
FIG. 18 is a flow chart of a method of pre-lithiating a secondary battery with carrier ions using an auxiliary electrode of an exemplary embodiment.
Figure 19:
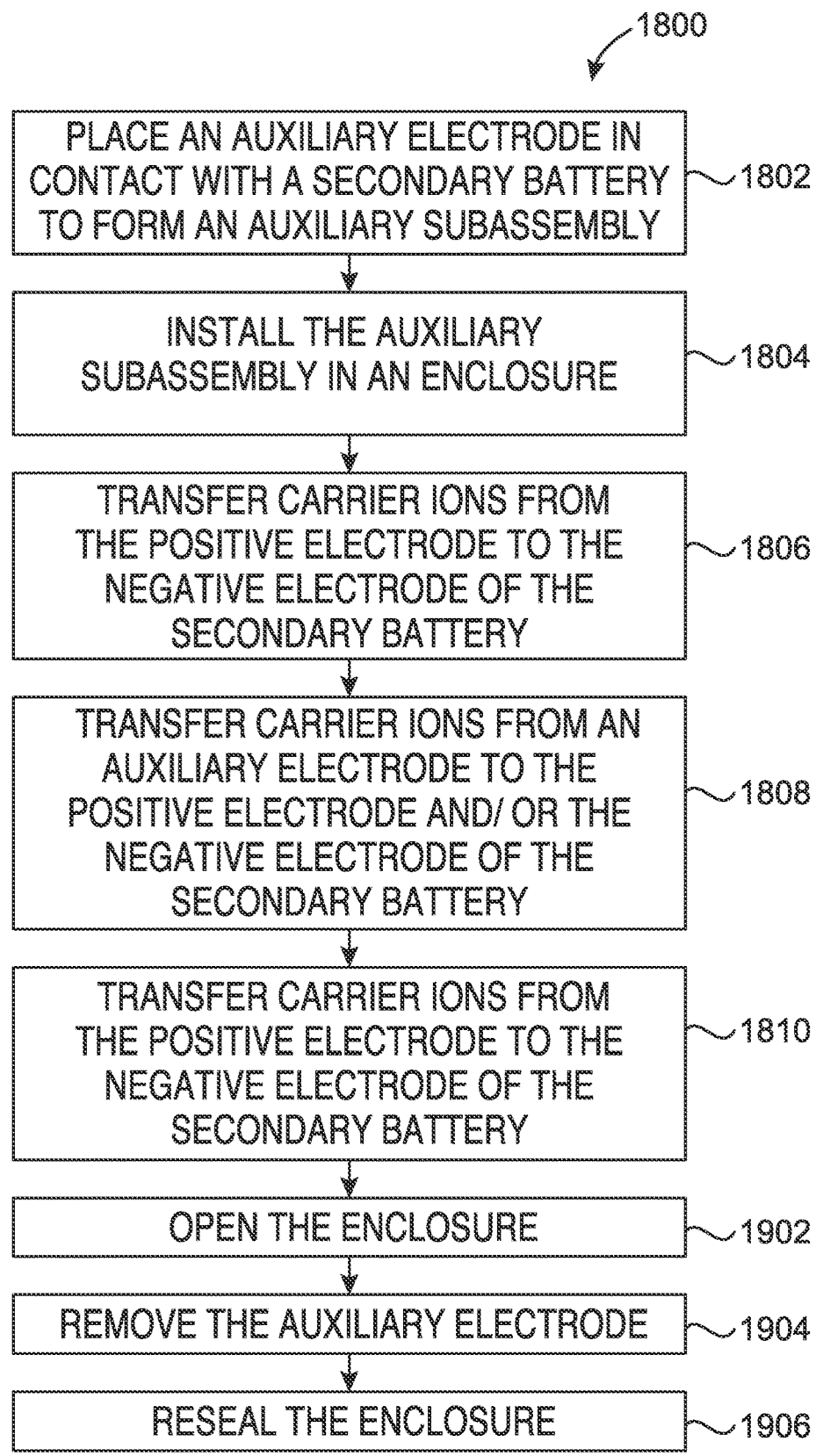
FIG. 19 is a flow chart depicting additional details of the method of FIG. 18.
Figure 20:
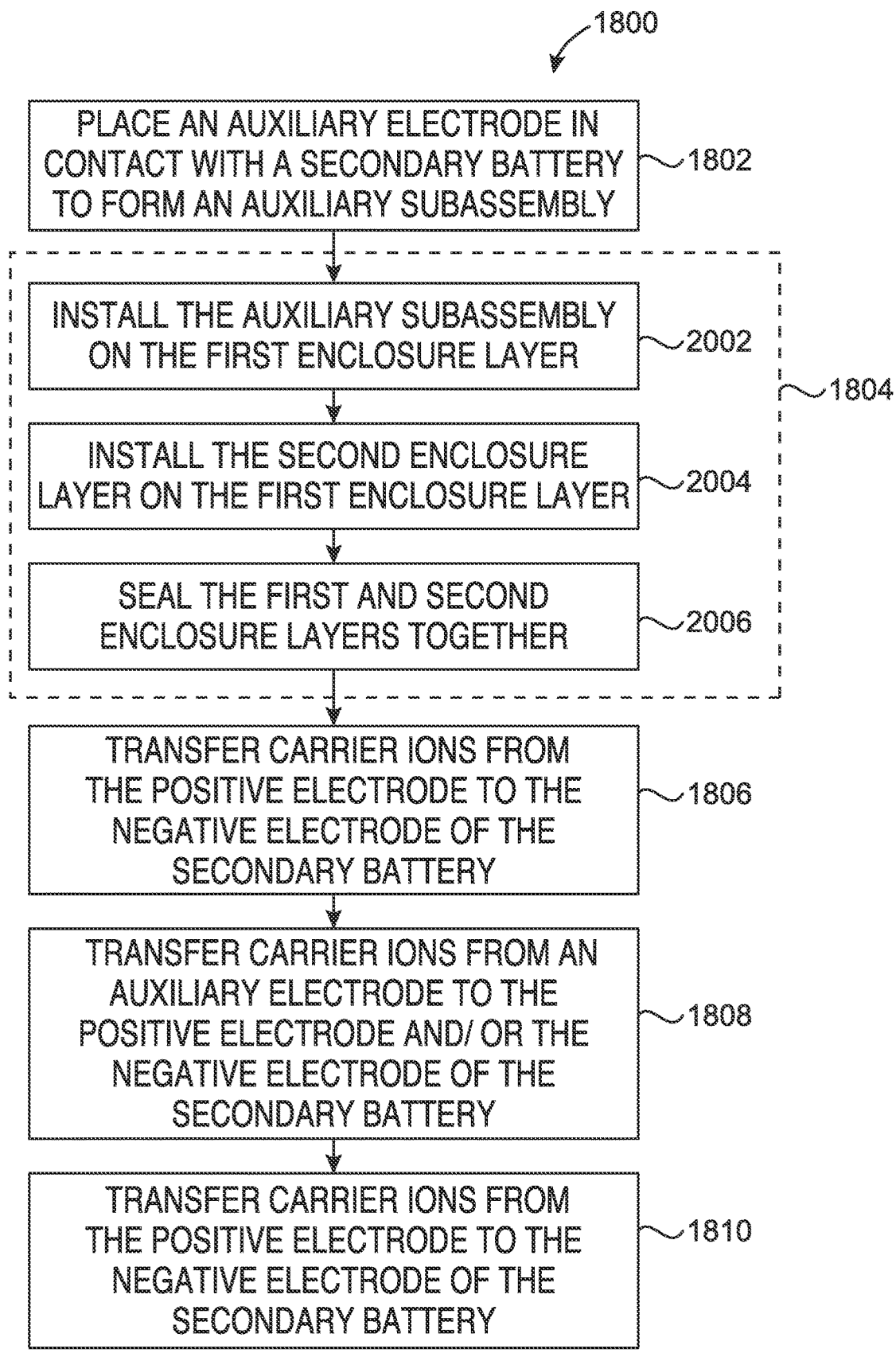
FIG. 20 is a flow chart depicting additional details of the method of FIG. 18.
Figure 21:
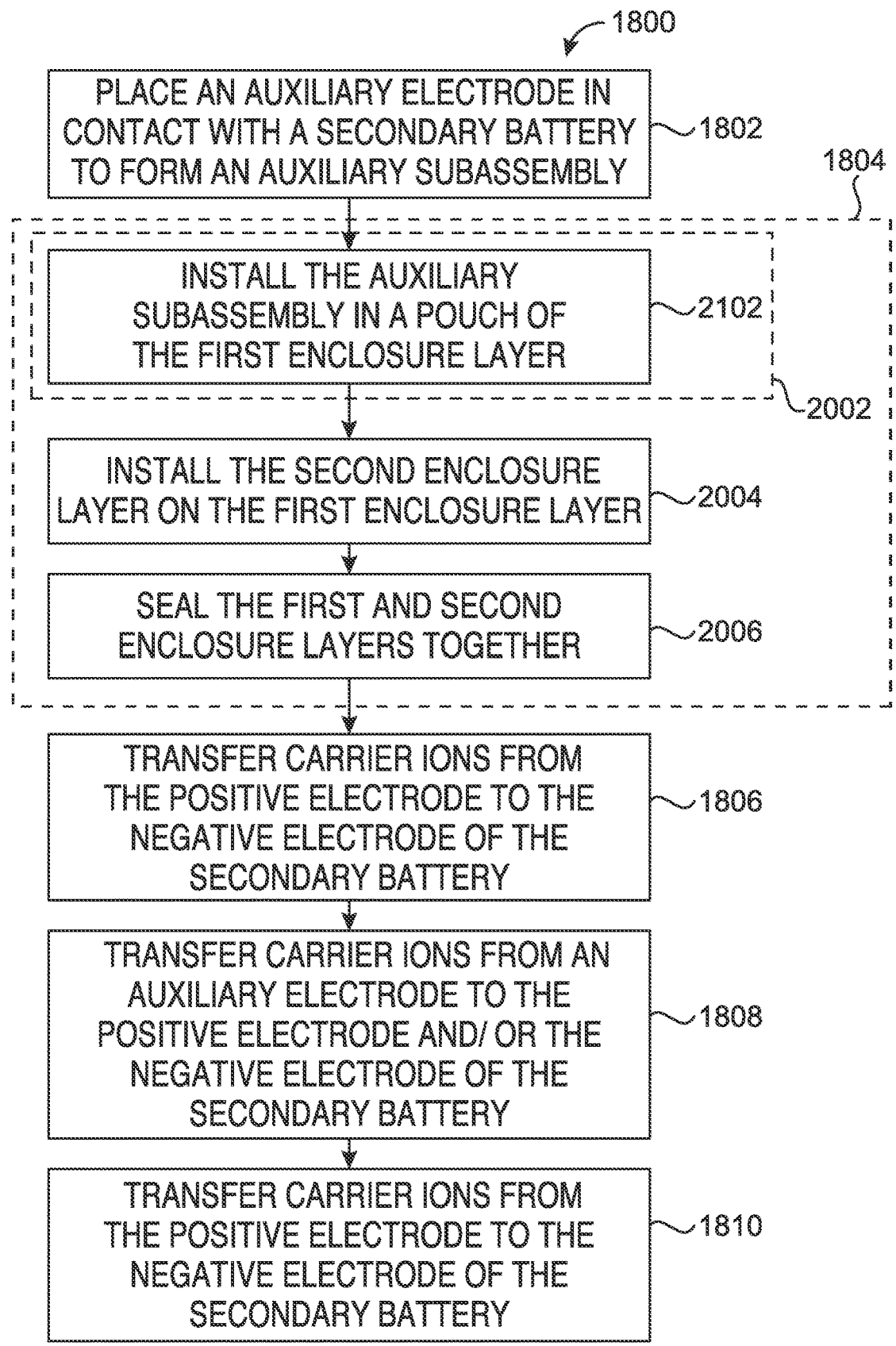
FIG. 21 is a flow chart depicting additional details of the method of FIG. 18.

FIG. 18 is a flow chart of a method 1800 of pre-lithiating a secondary battery with carrier ions using an auxiliary electrode of an exemplary embodiment, and FIGS. 19-21 are flow charts depicting additional details of the method 1800. The method 1800 will be described with respect to the secondary battery 100, the buffer system 500, and the auxiliary electrode 502 of FIGS. 1-17, although the method 1800 may apply to other systems, not shown. The steps of the method 1800 are not all inclusive, and the method 1800 may include other steps, not shown. Further, the steps of the method 1800 may be performed in an alternate order.

In this embodiment, the secondary battery 100 (see FIG. 1) has major surfaces 126, 127 that oppose each other, and the electrical terminals 124, 125. The electrical terminals 124, 125 are coupled to one of the positive electrode 208 of the secondary battery 100 (e.g., the population of the cathode structures 206 in the secondary battery 100, as depicted in FIG. 2) and the negative electrode 209 of the secondary battery 100 (e.g., the population of the anode structures 207 in the secondary battery 100, as depicted in FIG. 2). The secondary battery 100 comprises the microporous separator layer 108 (see FIG. 2) between the negative electrode 209 and the positive electrode 208 that is permeated with an electrolyte in ionic contact with the negative electrode 209 and the positive electrode 208. The negative electrode 209 comprises the anodically active material layer 104, such as silicon or an alloy thereof, having a coulombic capacity for the carrier ions. The positive electrode 208 comprises the cathodically active material layer 106, having a coulombic capacity for the carrier ions, with a negative electrode 209 coulombic capacity exceeding a positive electrode 208 coulombic capacity.

The auxiliary electrode 502 (see FIG. 6) is placed in contact with the major surfaces 126, 127 of the secondary battery 100 to form the auxiliary subassembly 516, where the auxiliary electrode 502 includes the electrically conductive layer 704, the carrier ion supply layers 706 disposed on the conductive layer 704 that are proximate to the major surfaces 126, 127 of the secondary battery 100, the separator 702 disposed between the carrier ion supply layers 706 and the major surfaces 126, 127 of the secondary battery, and the electrically conductive tab 508 coupled to the conductive layer 704 (see step 1802 of FIG. 18, and FIGS. 12-15).

The auxiliary subassembly 516 is installed in the enclosure 504, where the electrical terminals 124, 125 of the secondary battery 100 and the electrically conductive tab 508 of the auxiliary electrode 502 electrically extend from the perimeter 506 of enclosure 504 (see step 1804, and FIG. 16).

Carrier ions are transferred from the positive electrode 208 of the secondary battery 100 to the negative electrode 209 of the secondary battery 100 to at least partially charge the secondary battery 100 by applying a potential voltage across the electrical terminals 124, 125 (see step 1806). Charging may be discontinued when the positive electrode 208 of the secondary battery 100 reaches its the end-of-charge design voltage. During the initial charging cycle, SEI may form on the internal structural surfaces of the negative electrode 209 of the secondary battery 100.

To compensate for the loss of carrier ions to SEI, and to further provide additional carrier ions to mitigate the long term secondary reactions during cycling where carrier ions are lost due to side reactions, carrier ions are transferred from the carrier ion supply layers 706 of the auxiliary electrode 502 to the positive electrode 208 and/or the negative electrode 209 of the secondary battery 100 by applying a potential voltage across the electrically conductive tab 508 of the auxiliary electrode 502 and one or more of the electrical terminals 124, 125 of the secondary battery 100 (see step 1808, FIG. 16). Generally, this carrier ion buffer process transfers carrier ions from the carrier ion supply layers 706 of the auxiliary electrode 502 into each of the first major surface 126 of the secondary battery 100 and the second major surface 127 of the secondary battery 100 (see FIG. 15). Generally, transferring carrier ions to the secondary battery 100 from both of the major surfaces 126, 127 of the secondary battery 100, as depicted in FIG. 15, provides a technical benefit of distributing the forces generated by anode and/or cathode swelling more equally across the casing 116 of the secondary battery 100 as more carrier ions are loaded into the cathode and/or the anode of the secondary battery 100.

In one embodiment, the amount of carrier ions transferred from the auxiliary electrode 502 to the secondary battery 100 is about 50% of the reversable columbic capacity of the positive electrode 208 of the secondary battery 100. In other embodiments, the amount of carrier ions transferred from the auxiliary electrode 502 to the secondary battery 100 is about 55%, about 60%, about 65%, about 70%, about 75%, about 80%, about 85%, about 90%, about 95%, or about 100% of the reversable columbic capacity of the positive electrode 208 of the secondary battery 100. In some embodiments, the amount of carrier ions transferred from the auxiliary electrode 502 to the secondary battery 100 lies in a range of values of about 1% to about 100% of the reversable columbic capacity of the positive electrode 208 of the secondary battery 100. In one particular embodiment, the negative electrode 209 of the secondary battery 100 has about 170% of the reversable columbic capacity of the positive electrode 208 of the secondary battery 100 stored as carrier ions when the secondary battery 100 is charged, and about 70% of the reversable columbic capacity of the positive electrode 208 of the secondary battery 100 stored as carrier ions when the secondary battery 100 is discharged. An excess of carrier ions at the negative electrode 209 of the secondary battery 100 provided during the buffer process provides a technical benefit of mitigating the loss of carrier ions at the secondary battery 100 due to SEI at initial formation. Further, an excess of carrier ions at the negative electrode 209 of the secondary battery 100 provided during the buffer process provides a technical benefit of mitigating the loss of carrier ions at the secondary battery 100 due to side reactions that deplete carrier ions in the secondary battery 100 as the secondary battery 100 is cycled during use, which reduces the capacity loss of the secondary battery 100 over time.

In some embodiments, transferring carrier ions from the auxiliary electrode 502 to the secondary battery 100 may occur concurrently with an initial formation of the secondary battery 100 (e.g., during the first charge of the secondary battery 100), and/or during a subsequent charge of the secondary battery 100 after initial formation. In these embodiments, carrier ions are transferred from the positive electrode 208 of the secondary battery 100 to the negative electrode 209 of the secondary battery 100. Concurrently with or based on a temporal delay or a temporal pattern, carrier ions are transferred from the auxiliary electrode 502 to the positive electrode 208 and/or the negative electrode 209 of the secondary battery 100.

Carrier ions are again transferred from the positive electrode 208 of the secondary battery 100 to the negative electrode 209 of the secondary battery 100 to charge the secondary battery 100 by applying a potential voltage across the electrical terminals 124, 125 of the secondary battery 100 until the negative electrode 209 has greater than 100% of the positive electrode 208 coulombic capacity stored as the carrier ions (see step 1810).

In yet another embodiment, the positive electrode 208 may be replenished with carrier ions by simultaneously transferring carrier ions from the auxiliary electrode 502 to the positive electrode 208 of the secondary battery 100, while also transferring carrier ions from the positive electrode 208 of the secondary battery 100 to the negative electrode 209 of the secondary battery 100. Referring to FIG. 6, a voltage is applied across the electrical terminals 124, 125 of the secondary battery 100, to drive carrier ions from the positive electrode 208 to the negative electrode 209 of the secondary battery 100. While the carrier ions are being transferred from the positive electrode 208 to the negative electrode 209, a voltage is applied across the conductive tab 508-1 of the auxiliary electrode 502 and the positive electrode 208 of secondary battery 100 to drive carrier ions from the auxiliary electrode 502 to the positive electrode 208 of the secondary battery 100. Thus, carrier ions are transferred from the auxiliary electrode 502 to the positive electrode 208 of the secondary battery 100 at the same time that carrier ions are being transferred from the positive electrode 208 to the negative electrode 209 of the secondary battery 100. That is, a voltage is maintained across the positive electrode 208 and the negative electrode 209 of the secondary battery 100 that is sufficient to drive carrier ions from the positive electrode 208 to the negative electrode 209 of the secondary battery 100, at the same time that a voltage is maintained across the conductive tab 508-1 of the auxiliary electrode 502 and the positive electrode 208 of the secondary battery 100 that is sufficient to drive carrier ions from the auxiliary electrode 502 to the positive electrode 208. In another embodiment, the onset of transfer of carrier ions from the auxiliary electrode 502 to the positive electrode 208 of the secondary battery 100 may commence simultaneously with onset of the transfer of carrier ions from the positive electrode 208 to the negative electrode 209 of the secondary battery 100. In one embodiment, the rate of transfer of carrier ions from the positive electrode 208 to the negative electrode 209 of the secondary battery 100 is greater than or equal to the rate of transfer of carrier ions from the auxiliary electrode 502 to the positive electrode 208 of the secondary battery 100, such that a good overall rate of transfer of carrier ions from the auxiliary electrode 502 to the negative electrode 209 of the secondary battery 100 via the positive electrode 208 can be maintained. That is, the relative rates of transfer between the positive electrode 208 and the negative electrode 209 of the secondary battery 100, and the auxiliary electrode 502 and the positive electrode 208, may be maintained such that the overall capacity of the positive electrode 208 for additional carrier ions is not exceeded. The positive electrode 208 may thus be maintained in a state where it has the ability to accept new carrier ions from the auxiliary electrode 502, which may allow for subsequent transfer of carrier ions to the negative electrode 209 of the secondary battery 100.

In one embodiment, without being limited by any particular theory, the carrier ions are transferred from the auxiliary electrode 502 to the positive electrode 208 of secondary battery 100 as a part of the replenishment of the negative electrode 209 of the secondary battery 100 (as opposed to transferring from the auxiliary electrode 502 directly to the negative electrode 209 of the secondary battery), because the positive electrode 208 may be capable of more uniformly accepting carrier ions across the surface thereof, thus allowing the carrier ions to more uniformly participate in the transfer thereof between the positive electrode 208 and the negative electrode 209 of the secondary battery 100.

In some embodiments of the method 1800, the enclosure 504 is opened (see step 1902 of FIG. 19), and the auxiliary electrode 502 is removed from the enclosure 504 (see step 1904). In response to removing the auxiliary electrode 502 from the enclosure 504, the enclosure is resealed into its final form to encapsulate the secondary battery 100 for use (see step 1906).

Although installing the auxiliary subassembly 516 in the enclosure 504 as previously described with respect to step 1804 detailed above, one particular embodiment comprises installing the auxiliary subassembly 516 on the first enclosure layer 510 (see step 2002 of FIG. 20). The second enclosure layer 511 is installed on the first enclosure layer 510 (see step 2004), and the first enclosure layer 510 and the second enclosure layer 511 are sealed together along the sealing line 1602 to form the enclosure 504 (see step 2006).

The enclosure layers 510, 511 may be sealed along the sealing line 1602 (see FIG. 16) by welding, heat sealing, adhesive, combinations thereof, or the like. In another embodiment, the enclosure layers 510, 511 may be sealed along three sides of the sealing line 1602 creating a pocket therein. In this embodiment, the secondary battery 100 may be placed within the pocket, and the final edge of the sealing line 1602 is subsequently sealed. In one embodiment, the sealing line 1602 is sealed using a hot press, that applies a controlled temperature and pressure to the sealing line 1602 causing the enclosure layers 510, 511 to adhere or fuse together along the sealing line 1602. In another embodiment, a vacuum is applied to the secondary battery 100 during the sealing process to evacuate any excess volume occupied by air or other gas. The time for which the sealing line 1602 is subject to the hot press may be controlled and is dependent upon the materials selected for the enclosure layers 510, 511. Once sealed over the secondary battery 100, the sealed enclosure layers 510, 511 form the buffer system 500. Upon sealing, the buffer system 500 is liquid tight and/or air-tight, depending on the desired application. The electrical terminals 124, 125 of the secondary battery 100 and the conductive tab 508 remain exposed and are not covered by the enclosure layers 510, 511.

In embodiments where the first enclosure layer 510 includes the pouch 514, installing the auxiliary subassembly 516 within the enclosure 504 initially comprises placing the auxiliary subassembly 516 within the pouch 514 (see step 2102 of FIG. 21). In some embodiments, an electrolyte is added to the pouch 514 (e.g., either before or after installing the auxiliary subassembly 516 in the pouch 514), with the enclosure 504 formed subsequent thereto by sealing the first enclosure layer 510 and the second enclosure layer 511 together along the sealing line 1602.

The formation process performed on the secondary battery 100 discussed above may be performed using any suitable system or systems for performing the formation process. In some embodiments, the formation process is performed by a distributed formation system, in which each secondary battery 100 is connected to a separate formation cluster that performs the formation process for the secondary battery 100 to which it is connected.

Figure 22:
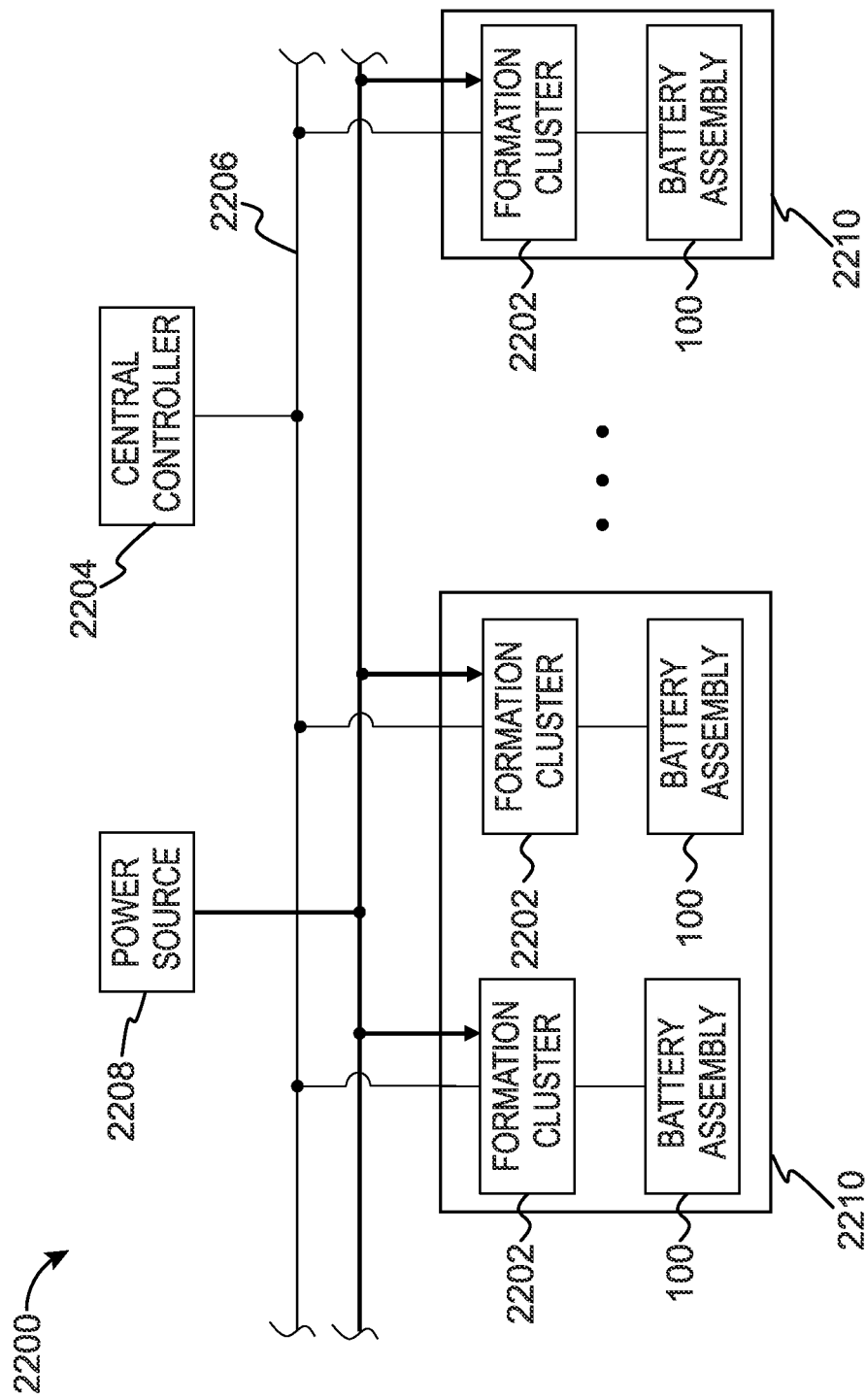
FIG. 22 is a block diagram of an example cell formation system for lithium containing secondary batteries.

FIG. 22 is a block diagram of an example cell formation system 2200 for lithium containing secondary batteries, such as the secondary battery 100. The cell formation system 2200 includes a population of formation clusters 2202 and a central controller 2204. Each formation cluster 2202 is connected to a secondary battery 100 and performs the formation process for the secondary battery 100 to which it is connected.

The formation clusters 2202 are communicatively coupled to the central controller 2204 by a network 2206. The network 2206 may be a wired or a wireless network of any type suitable for communication between the formation clusters 2202 and the central controller 2204. For example, the network 2206 may be an inter-integrated circuit (I2C) network, a controller area network (CAN), a local area network (LAN), a wide area network (WAN), or the like. Although shown connected to the same network 2206 in FIG. 22, the formation clusters 2202 and the central controller 2204 may be connected to different networks, or a combination of the same and different networks. For example, some of the formation clusters 2202 may be connected to a first LAN, some of the formation clusters may be connected to a second LAN, and the first and second LAN may be connected to the central controller 2204 through a WAN connected to both the first LAN and the second LAN.

Each formation cluster 2202 is connected to a power source 2208, such as an electrical grid, a generator, a photovoltaic system, a battery, or the like. The formation clusters 2202 use electrical power from the power source 2208 to power the formation cluster 2202 and to perform the formation process. Although illustrated connected to the same power source 2208 in FIG. 22, the formation clusters 2202 in the cell formation system 2200 may be connected to different power sources 2208.

Groups of formation clusters 2202 are supported by a housing 2210. The housing 2210 may be an enclosure, such as a cabinet, or an open support, such as a rack. Although two formation clusters 2202 are shown in one housing 2210, and a single formation cluster 2202 is shown in another housing 2210 for simplicity, in practice each housing 2210 will typically support a larger number of formation clusters 2202, such as 10, 25, 50, 100, 250, or a 1000 formation clusters 2202. Notably, the central controller 2204 is separate from (and may be remotely located from) the housings 2210 and their formation clusters 2202. Moreover, the housings 2210 may be located in different locations from each other, so long as they are located somewhere with access to the power source 2208 and the network 2206. Further, each housing 2210 may support a different number of formation clusters 2202.

Figure 23:
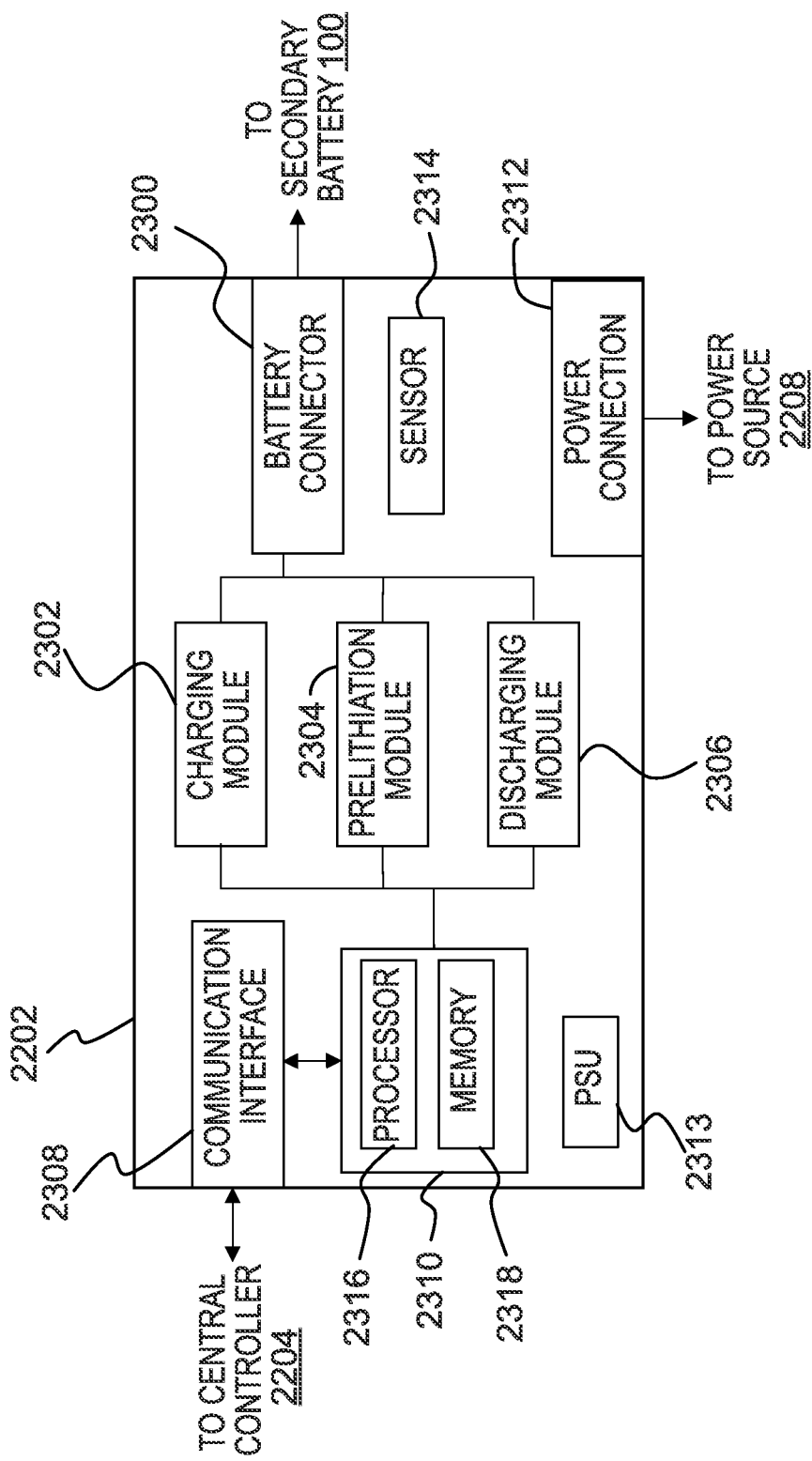
FIG. 23 is a block diagram of an example formation cluster for use in the cell formation system of FIG. 22.

FIG. 23 is a block diagram of an example formation cluster 2202. The formation cluster 2202 includes a battery connector 2300, a charging module 2302, a pre-lithiation module 2304 (sometimes also referred to as a buffer module), a discharging module 2306, a communication interface 2308, a formation cluster controller 2310, a power connection 2312, a power supply unit (PSU) 2313, and a sensor 2314.

The battery connector 2300 connects the formation cluster 2202 to the secondary battery 100. The battery connector 2300 may be any connector suitable for connection to the secondary battery 100, including a connector configured to mate with a similar connector on the battery 100, a clamping connector (such as an alligator clip), a wire soldered or welded to the battery 100 and the formation cluster 2202, and the like. The battery connector 2300 is configured to connect to the anode and the cathode of the secondary battery 100. In some embodiments, the battery connector 2300 also electrically connects the formation cluster 2202 to the auxiliary electrode 502. In other embodiments, the formation cluster 2202 includes a separate connector, referred to as a pre-lithiation connector, that electrically connects the formation cluster 2202 to the auxiliary electrode 502. In some embodiments, the formation cluster 2202 includes more than one battery connector 2300, with each battery connector 2300 connected to a separate one of the modules of the formation cluster 2202 (e.g., the charging module 2302, the pre-lithiation module 2304, and the discharging module 2306).

The charging module 2302 is connected to the battery connector 2300 and is configured to charge the secondary battery 100 connected to the battery connector 2300. The pre-lithiation module 2304 is connected to the battery connector 2300 and is configured to diffuse lithium carrier ions to the electrode active material layers (e.g., the cathodically active material layers 106 and/or the anodically active material layers 104) of the secondary battery 100. The discharging module 2306 is connected to the battery connector 2300 and is configured to discharge the secondary battery 100.

The communication interface 2308 connects the formation cluster 2202 to the central controller 2204. The communication interface 2308 may be any wired or wireless communications interface that permits the controller 2310 to communicate with the central controller 2204 directly or via a network. Wireless communication interfaces 2308 may include a radio frequency (RF) transceiver, a Bluetooth® adapter, a Wi-Fi transceiver, a ZigBee® transceiver, an infrared (IR) transceiver, and/or any other device and communication protocol for wireless communication. (Bluetooth is a registered trademark of Bluetooth Special Interest Group of Kirkland, Wash.; ZigBee is a registered trademark of the ZigBee Alliance of San Ramon, Calif.) Wired communication interfaces 2308 may use any suitable wired communication protocol for direct communication including, without limitation, USB, RS232, I2C, SPI, analog, and proprietary I/O protocols. In some embodiments, the wired communication interface 2308 includes a wired network adapter allowing the controller 2310 to be coupled to a network, such as the Internet, a local area network (LAN), a wide area network (WAN), a mesh network, and/or any other network to communicate with remote devices and systems via the network.

The formation cluster controller 2310 controls the operation of the formation cluster 2202 to operate as described herein. The formation cluster controller 2310 includes a processor 2316 and a memory 2318. The processor 2316 is any programmable system including a microcontroller, microcomputer, microprocessor, reduced instruction set circuit (RISC), application specific integrated circuit (ASIC), programmable logic circuit (PLC), and any other circuit or processor capable of executing the functions described herein. The memory 2318 stores computer-readable instructions executable by the processor 2316 for control of the formation cluster 2202 as described herein. The memory 2318 may be any suitable type of memory including, but not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). In some embodiments, the processor 2316 and the memory 2318 are both embodied in a microcontroller, while in other embodiments the processor 2316 and the memory 2318 are separate components.

In the example embodiment, the formation cluster controller 2310 is programmed (by instruction stored in the memory 2318) to directly control each of the modules 2302, 2304, and 2306. That is, the formation cluster controller 2310 is programmed to control the charging module 2302 to charge the secondary battery 100, to control the pre-lithiation module 2304 to pre-lithiate (also referred to as buffering) the secondary battery 100, and to control the discharging module 2306 to discharge the secondary battery 100. The formation cluster controller 2310 is also programmed to control the overall formation process, such as when to use each of the modules 2302, 2304, and 2306.

In other embodiments one or more of the modules 2302, 2304, and 2306 includes its own module controller (having a processor and memory). In such embodiments, the formation cluster controller 2310 controls the overall formation process, but the module controllers control the specific tasks of their modules. For example, the formation cluster controller 2310 may instruct the charging module 2302 to charge the secondary battery 100, and the module controller in the charging module 2302 will then control the charging module 2302 to charge the secondary battery 100 according to instructions stored in the memory of the charging module's module controller.

In further embodiments, the formation cluster 2202 does not include the formation cluster controller 2310. Rather, each of the modules 2302, 2304, and 2306 includes its own module controller. In such embodiments, the central controller 2204 controls the overall formation process and sends instructions to the module controllers through the communication interface 2308. In such embodiments, the multiple module controllers in the formation cluster 2202 may be considered as a distributed formation cluster controller 2310.

Various levels of interaction and control may be performed by the central controller 2204 and the formation cluster controller 2310 in different embodiments. For example, in some embodiments, the central controller 2204 merely sends instructions to the formation cluster 2202 to begin the formation process. Then, in response to the instructions, the formation cluster controller 2310 controls the modules 2302, 2304, and 2306 to perform the formation process. Alternatively, in response to the instructions, the formation cluster controller 2310 may instruct the modules 2302, 2304, and 2306 to perform their respective functions at the appropriate times. In other embodiments, the central controller 2204 sends instructions to the formation clusters 2202 to perform an individual portion of the formation process (e.g., "charge the battery now"), and the formation cluster controller 2310 or the module controllers perform the task commanded by the central controller 2204. In some embodiments, the central controller 2204 may send instructions to the formation clusters 2202 for how to perform one or more of the formation tasks, including sending control algorithms. In some embodiments, the formation cluster controller 2310 or the module controllers may store instructions for multiple ways of performing the same task (e.g., a fast charge, a slow charge, a charge with a rest period, and the like), and the central controller's instructions may instruct the formation cluster 2202 which method to use.

In some embodiments, the central controller 2204 may program or update the programming of the formation cluster controller 2310 or the module controllers. For example, the central controller 2204 may send control algorithms to the formation cluster 2202, and the formation cluster controller 2310 and/or the module controllers may store the control algorithms in their respective memories. In other embodiments, the central controller 2204 may send a modification of a control algorithm already stored in the formation cluster 2202, such as a change to a variable, a change in timing, or the like. The formation cluster controller 2310 or the controller modules then store the modification in memory for use in the formation process.

The formation cluster controller 2310 also transmits information back to the central controller 2204 in some embodiments. The information sent to the central controller 2204 can include confirmation that instructions were received, confirmation that a commanded process has begun, status of the operations being performed, data collected from the sensor 2314, or any other suitable information.

The power connection 2312 connects the formation cluster 2202 to the power source 2208. The power connection 2312 may be any connector suitable for connection to the power source 2208, including a plug configured for insertion into a mating socket of the power source 2208, a wire soldered or welded to the power source 2208, a clamping connector for clamping onto a terminal or wire of the power source 2208, or the like. The PSU 2313 converts and/or distributes power from the power source 2208 to the rest of the formation cluster 2202 for use in the formation process. The PSU 2313 may be an AC/DC power converter, a DC/DC power converter, an inverter, or any other unit for suitable for converting and/or distributing power to the formation cluster 2202. Some embodiments do not include a PSU, and utilize power from the power source 2208 directly.

The sensor 2314 is any sensor capable of monitoring a variable of interest to the formation process. For example, the sensor 2314 may be a voltage sensor for monitoring the voltage of the secondary battery 100, an ambient temperature sensor for monitoring the temperature around the formation cluster 2202, a temperature sensor for monitoring the temperature of the battery 100 or a component of the formation cluster 2202, a current sensor for monitoring current flowing into, out of, or through the battery 100, etc. Some embodiments include more than one sensor 2314, including combinations of the sensors described above. Moreover, some sensors 2314 may perform more than one of the above described monitoring tasks.

The modular and distributed nature of the cell formation system 2200 allows for the system to be easily expanded or contracted as desired. Unlike traditional centralized systems that are configured for formation of a set number of batteries at one time, the system 2200 can be expanded to any number of batteries simply by adding more formation clusters 2202 (including increasing the number of batteries by as few as one additional battery). With a traditional centralized system, increases to the number of batteries to be formed would require acquisition of an additional system and an increase by some set number of batteries (determined by the size and configuration of the centralized system acquired). Further, centralized systems typically require running significant additional wiring for each additional battery in order to provide controlled power and communication to the additional batteries. In contrast, the cell formation system 2200 merely requires connecting additional formation clusters 2202 to a power source and an already existing communication network. The formation clusters 2202 in the system 2200 need not all be the same, so long as the central controller 2204 knows the configuration of each formation cluster 2202. Moreover, the formation clusters 2202 in the system 2200 may be used to form different batteries, either at different times or at the same time, so long as the central controller 2204 or the formation cluster controller 2310 knows what secondary battery 100 is connected to the formation cluster 2202.

Figure 24:
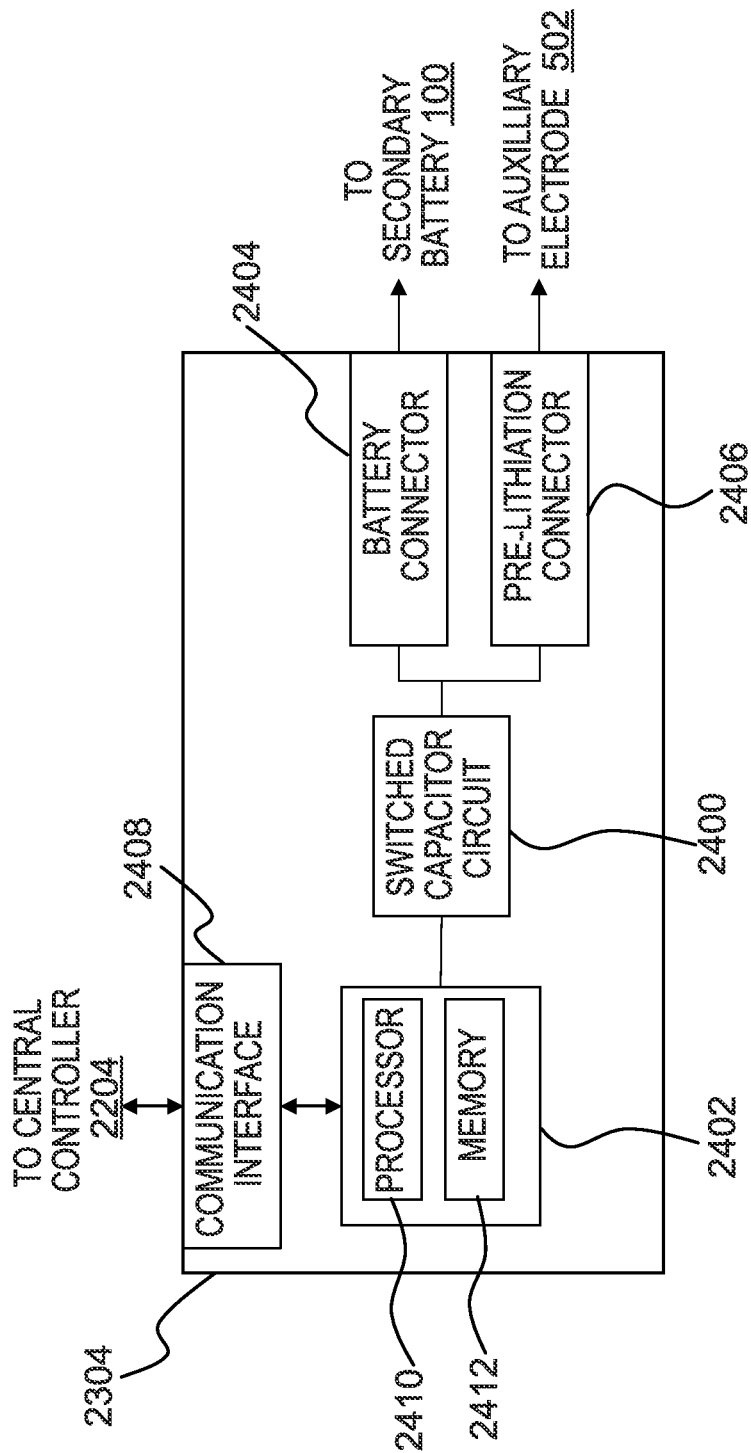
FIG. 24 is a block diagram of an example pre-lithiation module for use in the formation cluster of FIG. 23.

FIG. 24 is a block diagram of an example pre-lithiation module 2304 for use in the formation clusters 2202. As described above, the pre-lithiation module 2304 is configured to diffuse lithium to the electrode active material layers (e.g., the cathodically active material layers 106 and/or the anodically active material layers 104) of the secondary battery 100. The pre-lithiation module 2304 includes a switched capacitor circuit 2400, a pre-lithiation module controller 2402, a battery connector 2404, a pre-lithiation connector 2406, and a communication interface 2408.

The switched capacitor circuit 2400 is a switched resistor-capacitor network. The switched capacitor circuit 2400 will be described in more detail below with reference to FIG. 25. Generally, in a first stage, a current is allowed to flow through the circuit 2400 to charge a capacitor network, and the energy stored in the capacitor network is then discharged across a discharge resistor and released as heat in a second stage. In the pre-lithiation module 2304, the current allowed to flow to charge the capacitor network is a current between the auxiliary electrode 502 and one of the electrodes of the secondary battery 100 to diffuse lithium from the auxiliary electrode 502 to the electrode active material layers of the secondary battery 100.

The pre-lithiation module controller 2402 controls operation of the pre-lithiation module 2304 to pre-lithiate the secondary battery 100 by selectively conducting current through the auxiliary electrode 502 to diffuse lithium to the electrode active material layers of the secondary battery 100. The pre-lithiation module controller 2402 includes a processor 2410 and a memory 2412. The memory 2412 stores instructions that, when executed by the processor 2410 cause the processor 2410 to perform the pre-lithiation as described herein. The processor 2410 is any programmable system including a microcontroller, microcomputer, microprocessor, reduced instruction set circuit (RISC), application specific integrated circuit (ASIC), programmable logic circuit (PLC), and any other circuit or processor capable of executing the functions described herein. The memory 2412 may be any suitable type of memory, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). In some embodiments, the processor 2410 and the memory 2412 are both embodied in a microcontroller, while in other embodiments the processor and the memory are separate components.

The battery connector 2404 connects the pre-lithiation module 2304 to the secondary battery 100. The battery connector 2404 may be the battery connector 2300 or may be a separate battery connector connected only to the pre-lithiation module 2304. The battery connector 2404 may be any connector suitable for connection to the secondary battery 100, including a connector configured to mate with a similar connector on the battery 100, a clamping connector (such as an alligator clip), a wire soldered or welded to the battery 100 and the pre-lithiation module 2304, and the like. The battery connector 2404 is configured to connect to the anode and the cathode of the secondary battery 100.

The pre-lithiation connector 2406 connects the pre-lithiation module 2304 to the auxiliary electrode 502 of the secondary battery 100. The pre-lithiation connector 2404 may be any connector suitable for connection to the secondary battery 100, including a connector configured to mate with a similar connector on the battery 100, a clamping connector (such as an alligator clip), a wire soldered or welded to the battery 100 and the pre-lithiation module 2304, and the like. In some embodiments, the pre-lithiation connector 2406 is part of the battery connector 2300.

The communication interface 2408 connects the pre-lithiation module 2304 to the central controller 2204. The communication interface 2408 may be the communication interface 2308 or may be a separate communication interface. The communication interface 2408 may allow the pre-lithiation module 2304 to communicate directly with the central controller 2204, or it may allow the pre-lithiation module 2304 to communicate indirectly with the central controller 2204, such as via the formation cluster controller 2310. The communication interface 2408 may be any wired or wireless communications interface that permits the controller 2402 to communicate with the communication central controller 2204 directly or via a network. Wireless communication interfaces 2408 may include a radio frequency (RF) transceiver, a Bluetooth® adapter, a Wi-Fi transceiver, a ZigBee® transceiver, an infrared (IR) transceiver, and/or any other device and communication protocol for wireless communication. (Bluetooth is a registered trademark of Bluetooth Special Interest Group of Kirkland, Wash.; ZigBee is a registered trademark of the ZigBee Alliance of San Ramon, Calif.) Wired communication interfaces 2408 may use any suitable wired communication protocol for direct communication including, without limitation, USB, RS232, I2C, SPI, analog, and proprietary I/O protocols. In some embodiments, the wired communication interface 2308 includes a wired network adapter allowing the controller 2402 to be coupled to a network, such as the Internet, a local area network (LAN), a wide area network (WAN), a mesh network, and/or any other network to communicate with remote devices and systems via the network.

Figure 25:
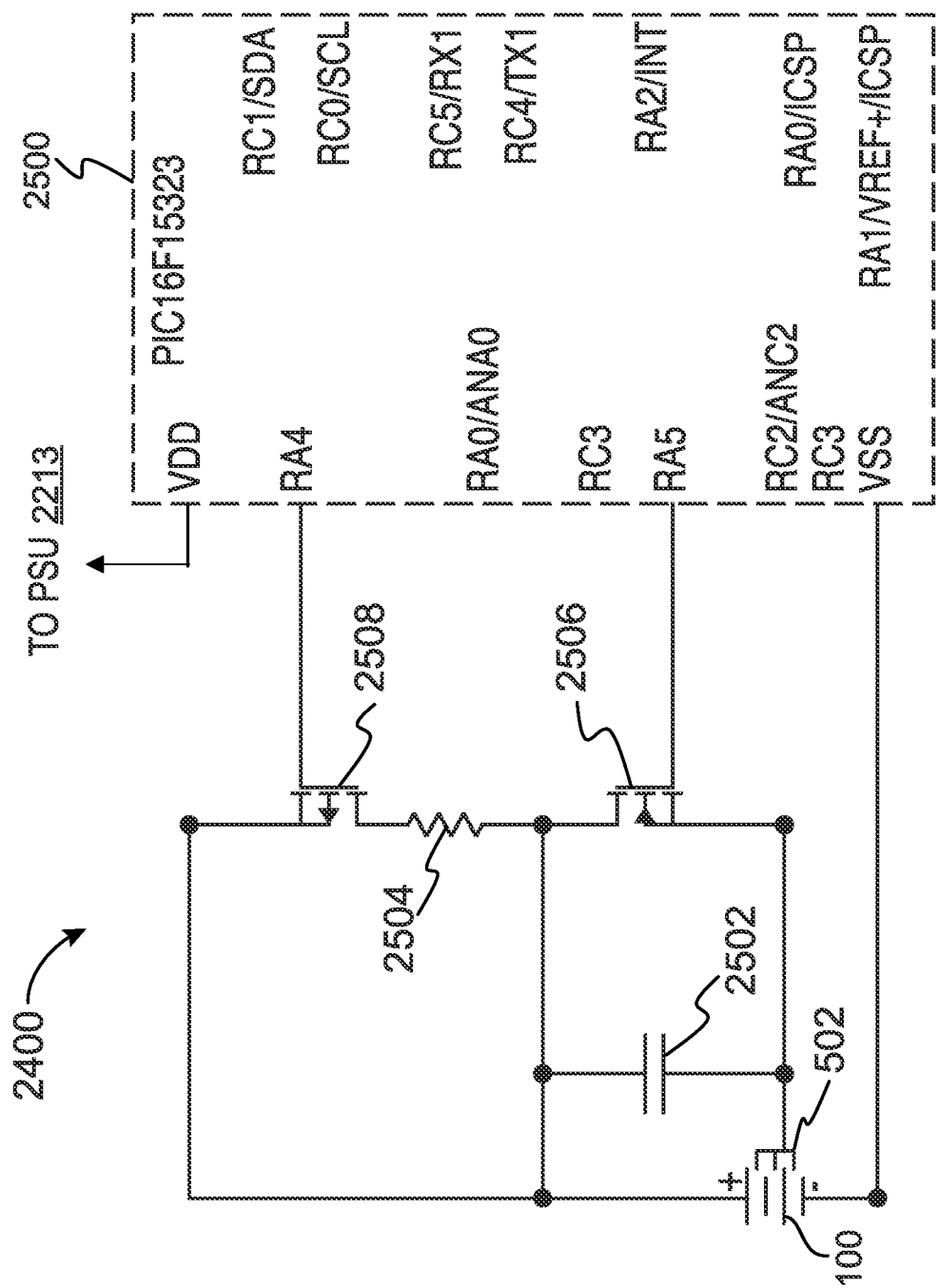
FIG. 25 is a simplified circuit diagram of an example embodiment of a switched capacitor circuit for use in the pre-lithiation module of FIG. 24.

FIG. 25 is a simplified circuit diagram of an example embodiment of the switched capacitor circuit 2400 connected to the secondary battery 100. The switched capacitor circuit 2400 includes a microcontroller 2500, a storage capacitor 2502, a discharge resistor 2504, a first switch 2506, and a second switch 2508.

The microcontroller 2500 controls the switched capacitor circuit 2400 according to a control algorithm stored in its memory. In the example embodiment, the microcontroller 2500 is also the pre-lithiation module controller 2402. In other embodiments, the pre-lithiation module controller 2402 is separate from the microcontroller 2500. In the example embodiment, the microcontroller is a PIC 16F15323 microcontroller from Microchip Technology Inc. of Chandler, Ariz., USA. In other embodiments, any other suitable microcontroller may be used. In this embodiment, the microcontroller 502 is powered by the power source 2208 through the PSU 2313.

The microcontroller 2500 controls pre-lithiation of the secondary battery 100 by selectively conducting current through the auxiliary electrode 502 by controlling the first switch 2506 and the second switch 2508. The first switch 2506 is an N-channel enhancement mode metal-oxide-semiconductor field-effect transistor (MOSFET), and the second switch 2508 is a P-Channel enhancement mode MOSFET. Other embodiments may use any other suitable switches. By closing the first switch 2506 and opening the second switch 2504, the microcontroller 2500 creates a first current path from the cathode busbar 112 of the secondary battery 100 to the auxiliary electrode 502 through the first switch 2506. The first current path includes the storage capacitor 2502. When current flows through the first current path, lithium is diffused from the auxiliary electrode 502 to the electrode active material layers of the secondary batter 100 and energy is stored in the storage capacitor 2502. Next, the microcontroller 2500 closes the second switch 2508 and opens the first switch 2506 to establish a second current path. The second current path includes the storage capacitor 2502, the discharge resistor 2504, and the second switch 2508. As current flows through the second current path, the energy stored in the capacitor 2502 is discharged across the discharge resistor 2504 and released as heat.

In the example embodiment, lithium is transferred from the auxiliary electrode 502 to the electrode active material layers of the positive electrodes of the secondary battery 100. In other embodiments, the diffusion is to the electrode active material layers of the negative electrodes of the secondary battery 100, by connecting the switched capacitor circuit 2400 such that the first current loop includes the anodic busbar 110 instead of the cathodic busbar 112. In still other embodiments, the switched capacitor circuit 2400 may be duplicated, such that there are two first current loops, one including the anodic busbar 110 and the other including the cathodic busbar 112. Such embodiments allow a single pre-lithiation module 2304 to transfer lithium from the auxiliary electrode 502 to the active material layers of the positive and negative electrodes of the secondary battery 100 without needing to stop the formation process to reconfigure the connections to the secondary battery 100 and the auxiliary electrode 502, and without needing to use two separate pre-lithiation modules 2304.

Pre-lithiation of the secondary battery 100 using the switched capacitor circuit 2400 generally pulls charge from the secondary battery 100 one small packet at a time at a high rate. Thus, the average current is equivalent to the frequency of the packet charge/discharge times the packet size in coulombs as shown by:

$$i = C\frac{dv}{dt} \to I = C \cdot \Delta V \cdot F \to I = QF \tag{1}$$

The total charge transferred is the sum of all charge packets, given by:

$$\sum_{n=0}^{N} Q_n = Q_{total} \tag{2}$$

To control the switched capacitor circuit 2400, the microcontroller 2500 uses pulse frequency modulation (PFM) control signals to the first switch 2506 and the second switch 2508. PFM is described by pulses having a fixed width (i.e., each pulse being on for a fixed length of time) with the time between pulses being variable. The time between the pulses is varied to yield a different frequency for charge movement. The faster that packets are moved (i.e., the higher the frequency of the fixed width pulses) the higher the current conducted through the auxiliary electrode 502. Conversely, the lower the frequency of the pulses (i.e., the longer the time between the pulses), the lower the current conducted through the auxiliary electrode 502. The upper limit of the current conducted through the auxiliary electrode 502 is determined by the settling time of the RC circuit elements of the switched capacitor circuit 2400. Thus, by varying the frequency of the control pulses to the switches 2506 and 2508, the microcontroller 2500 can control the current flowing through the auxiliary electrode 502. In other embodiments, the microcontroller 2500 uses pulse width modulation (PWM) control signals to the first switch 2506 and the second switch 2508. In PWM control, the pulses occur with a fixed frequency, but the length of each pulse may be varied to control the amount of charge moved to control the amount of current.

Figure 26:
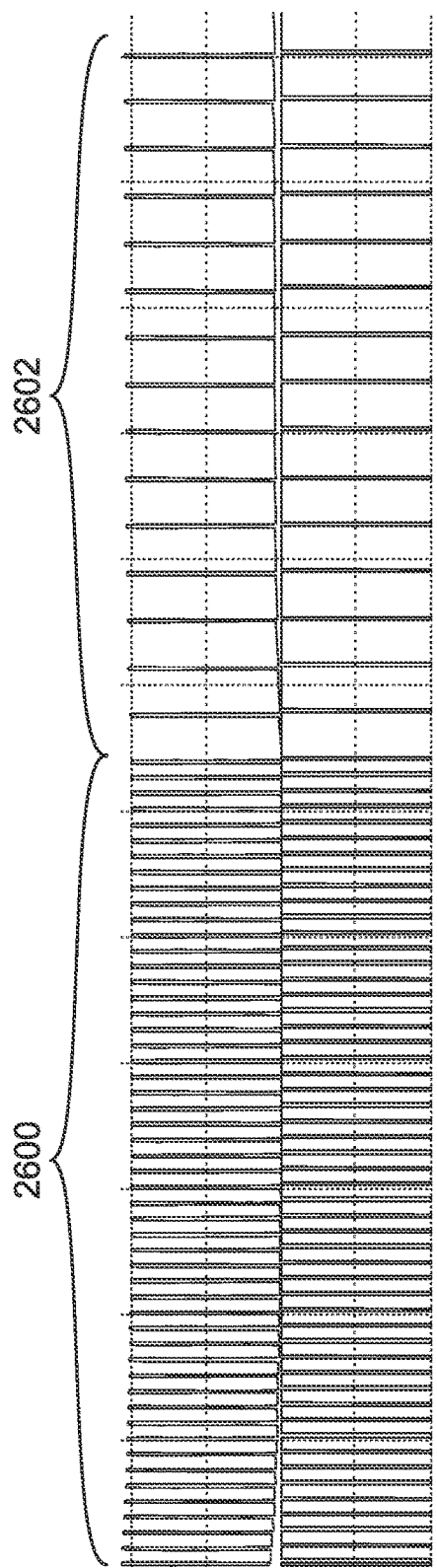
FIG. 26 is a graph of a series of PFM control pulses applied to the switches of the switched capacitor circuit of FIG. 25 as a function of time.
Figure 27:
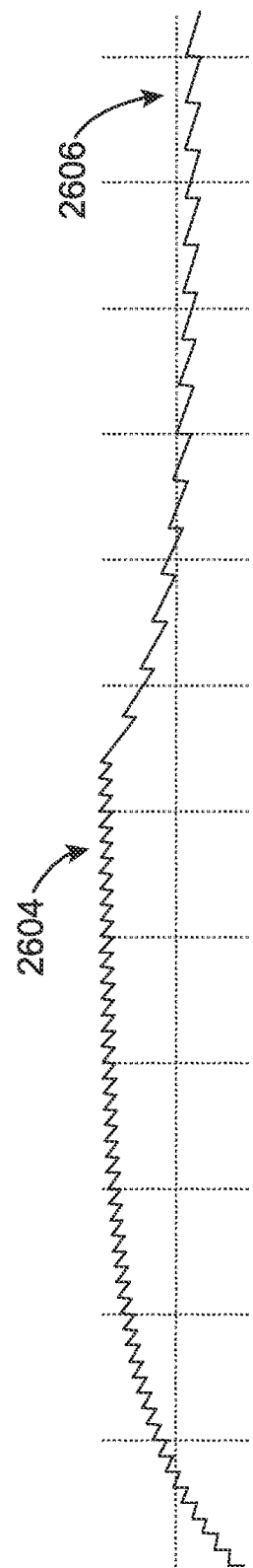
FIG. 27 is a graph of the resulting current through the auxiliary electrode in response to the control pulses of FIG. 26 as a function of time.

FIG. 26 is a graph of a series of PFM control pulses applied to the switches 2506 and 2508 as a function of time. As can be seen, in the first portion 2600 of the series, the fixed width pulses are applied at a higher frequency than in the second portion 2602 of the series of pulses. FIG. 27 is a graph of the resulting current through the auxiliary electrode 502 in response to the control pulses shown in FIG. 26 as a function of time. The current increases in a sawtooth pattern to a first maximum current 2604 during the first portion 2600. When the frequency of the pulses is reduced in the second portion 2602, the current through the auxiliary electrode 502 decreases to a second maximum current 2606 lower than the first maximum current 2604.

Figure 28:
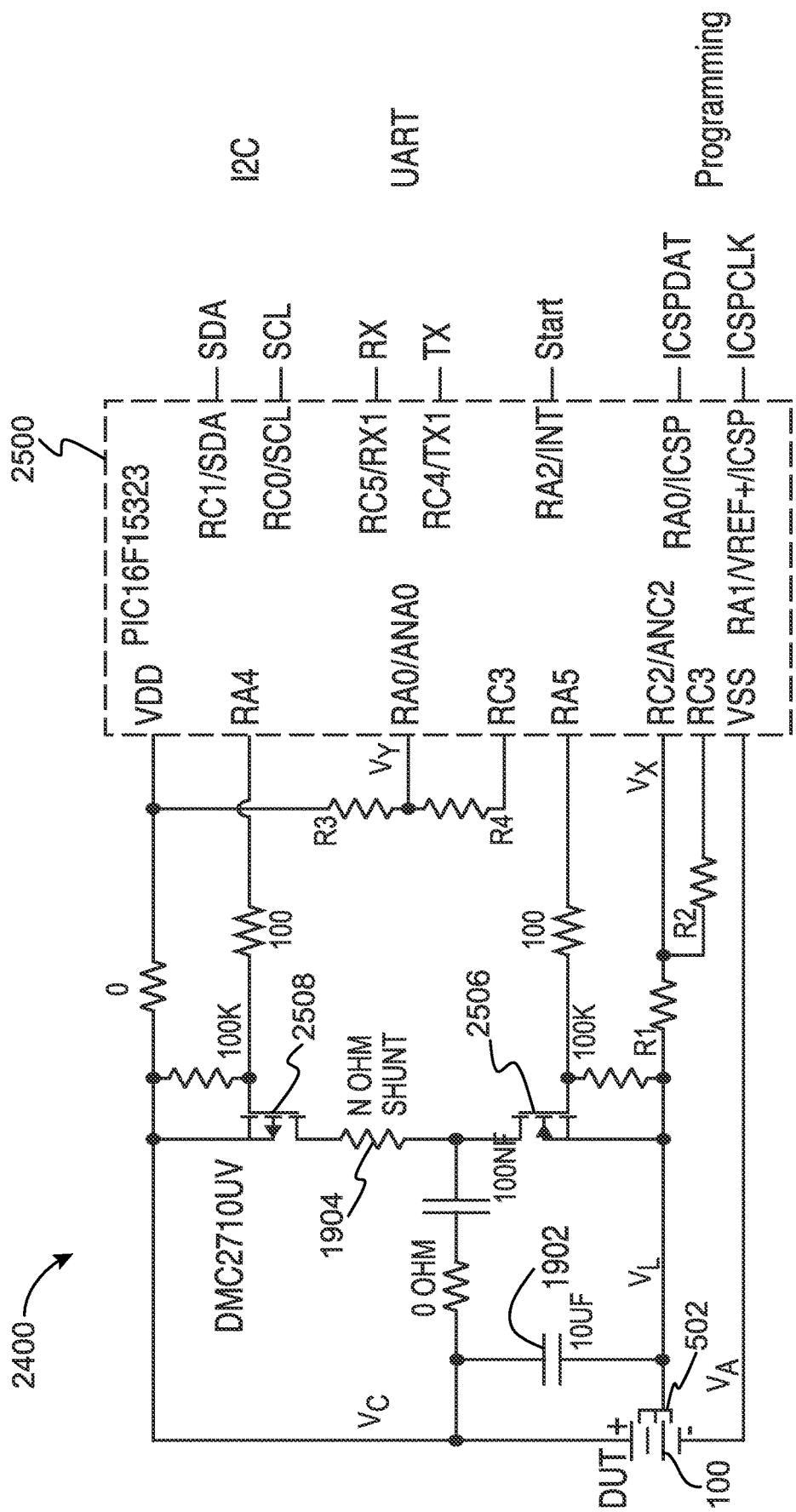
FIG. 28 is a circuit diagram of an example implementation of a switched capacitor circuit for use in the pre-lithiation module of FIG. 24.

FIG. 28 is a circuit diagram of an example implementation of the switched capacitor circuit 2400 connected to the secondary battery 100. Similar components share reference numbers with their corresponding components in FIG. 25. In this embodiment, the microcontroller 2500 is powered by the secondary battery 100, rather than the PSU 2313. The microcontroller 2500 presents a small leak on the secondary battery 100 generally in the range of 50 nA to 100 nA in most situations except when active.

During the pre-lithiation process, the microcontroller 2500 monitors the voltage $V_c$ of the cathode of the secondary battery 100 and the voltage $V_L$ at the auxiliary electrode 502. To measure the cathode voltage $V_c$, pin RC3 of the microcontroller 2500 is driven low to the anode of the secondary battery 100, which is considered the reference point in this circuit. This creates a voltage divider, and the voltage $V_y$ is read at pin RA0 of the microcontroller 2500. The cathode voltage V, is then calculated by the microcontroller 2500 as:

$$v_y \frac{R_3 + R_4}{R_4} = v_C \quad (3)$$

Measuring voltage $V_L$ at the auxiliary electrode node is a little more problematic because the node can be negative relative to the anode, which is the negative reference for the microcontroller 2500. Therefore, pin RC3 of the microcontroller 2500 is tied high to the cathode and the voltage divider in this situation pulls the voltage higher, ideally higher than the anode reference. The voltages $V_y$ and $V_x$ are read by the pins RA0 and RC2, respectively. The voltage $V_L$ at the auxiliary electrode node is then calculated as:

$$v_x \frac{R_1 + R_2}{R_1} - v_y \frac{R_2}{R_1} \frac{R_3 + R_4}{R_4} = v_L \quad (4)$$

If the resistors R1-R4 all have the same resistance, this leads to the significantly simplified relationships $$2v_y = v_C \quad (5)$$

and $$2v_x - 2v_y = v_L \quad (6)$$

When not measuring, pin RC3 is kept HiZ (floating) and there is no current flow through the resistor divider.

When measuring the voltages, the microcontroller 2500 may use filtering to enhance measurement stability. For example, the microcontroller 2500 may use decimation, non-linear IIR filtering, or some combination of such signal processing to enhance measurement stability. The filtering may improve resolution and reduce noise before the data is consumed by management functionality of the microcontroller 2500. This provides relatively clean decision making regardless of any external factory noise that might otherwise affect the measurements. Because pre-lithiation is a relatively slow process (frequently requiring tens of hours), fairly significant signal processing may be employed without much concern for time.

Figure 29:
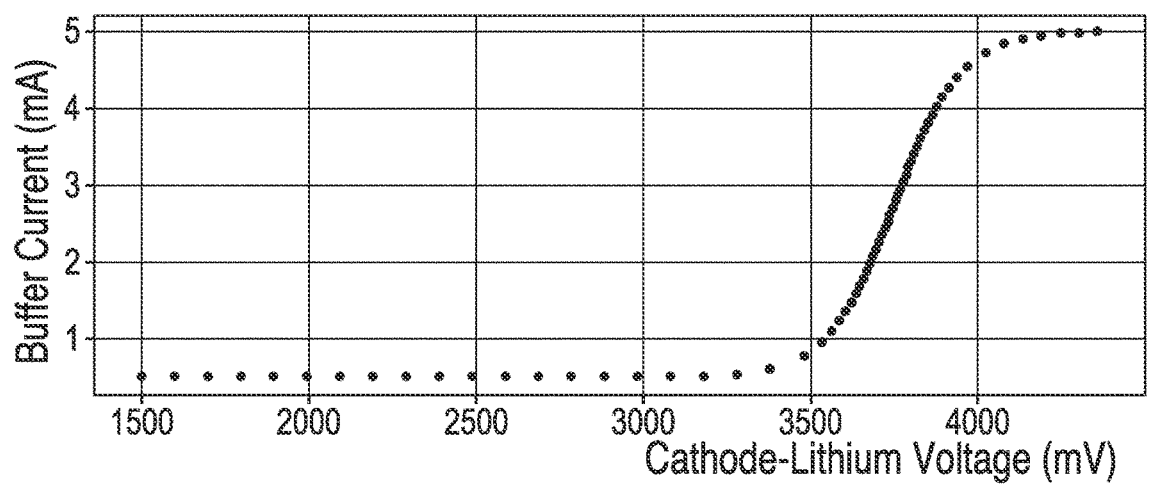
FIG. 29 is a graph of the buffer current for use as part of an example pre-lithiation profile.
Figure 30:
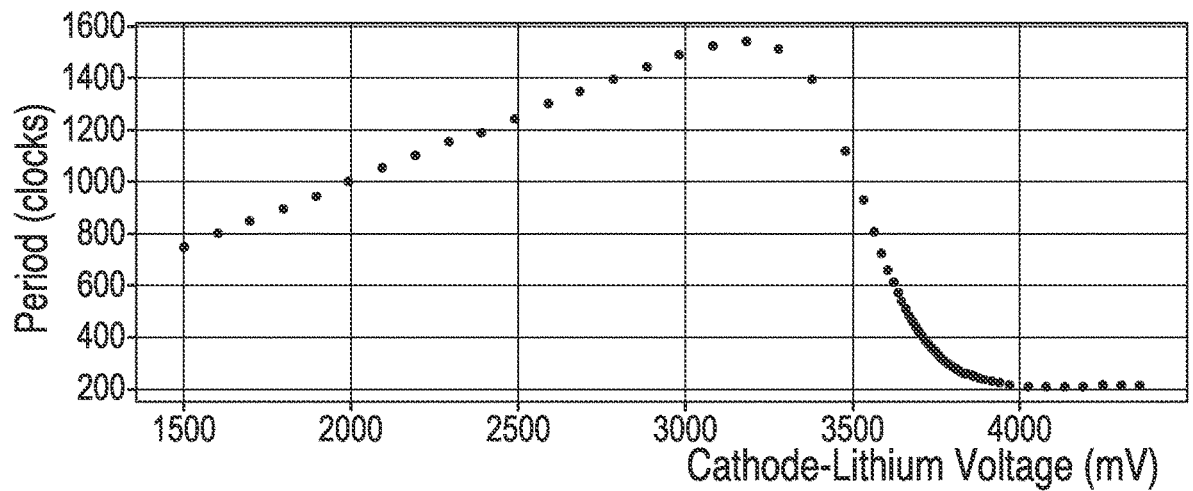
FIG. 30 is a graph of the period for pulses for the example pre-lithiation profile.
Figure 31:
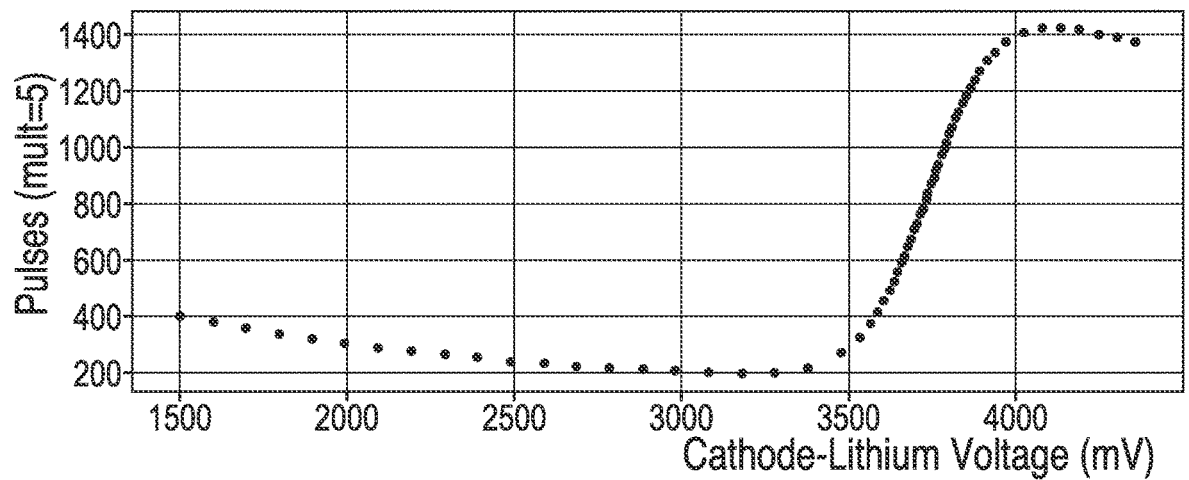
FIG. 31 is a graph of the number of pulses for the example pre-lithiation profile.

FIGS. 29-31 are graphs of an example pre-lithiation profile for use by the microcontroller 2500 to perform pre-lithiation of the secondary battery 100. FIG. 29 graphs the buffer current (i.e., the current through the auxiliary electrode 502) as a function of the voltage difference between the cathode of the secondary battery 100 and the auxiliary electrode 502 in millivolts (mV). FIG. 30 graphs the period for the pulses as a function of the voltage difference between the cathode of the secondary battery 100 and the auxiliary electrode 502 in mV. FIG. 31 graphs the number of pulses as a function of the voltage difference between the cathode of the secondary battery 100 and the auxiliary electrode 502 in mV. Of course, different profiles may be used for secondary batteries 100 having different capacities and/or different top of charge voltages.

Figure 32:
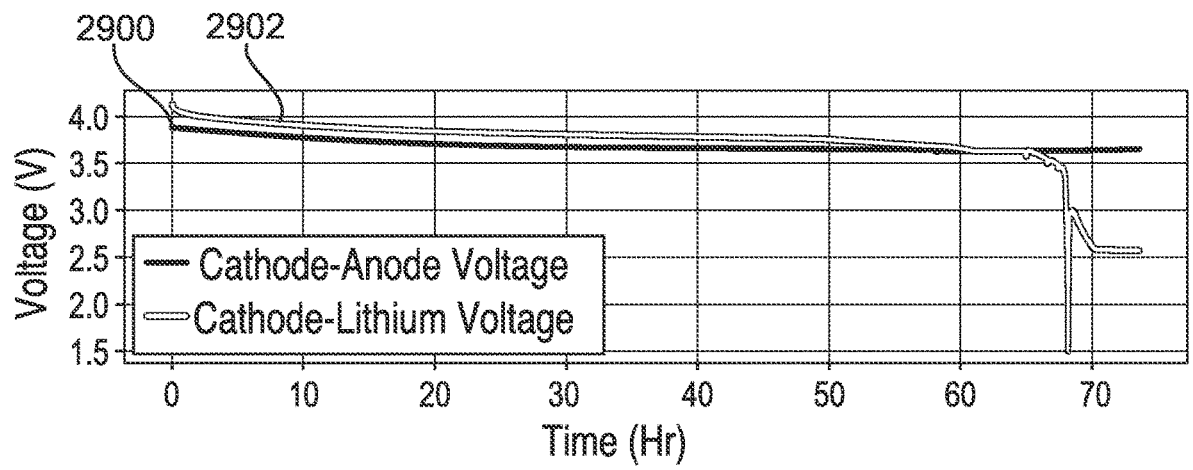
FIG. 32 is a graph of the cathode to anode voltage and the cathode to auxiliary electrode voltage as a function of time when pre-lithiating using the pre-lithiation profile of FIGS. 29-31.
Figure 33:
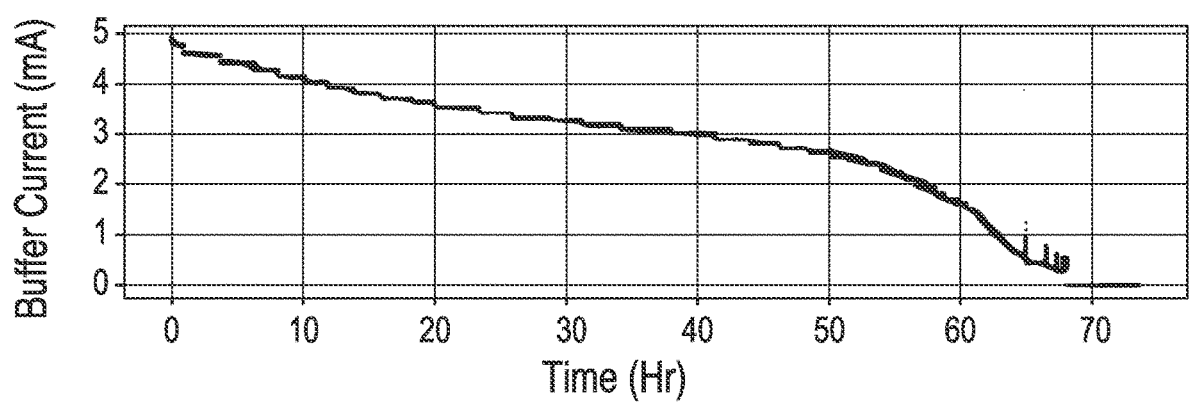
FIG. 33 is a graph of the buffer current as a function of time when pre-lithiating using the pre-lithiation profile of FIGS. 29-31.

The pre-lithiation profile shown in FIGS. 29-31 was used with the implementation of the switched capacitor circuit 2400 shown in FIG. 25 to pre-lithiate a secondary battery 100. The results of the process are shown in FIGS. 32 and 33. FIG. 32 is a graph of the cathode to anode voltage 2900 and the cathode to auxiliary electrode voltage 2902 as a function of time. FIG. 33 is a graph of the buffer current as a function of time.

Embodiments of the present disclosure utilize auxiliary electrodes to transfer or buffer carrier ions to a secondary battery during or subsequent to, initial formation of the secondary battery. Transferring carrier ions to the secondary battery (also referred to as pre-lithiating or buffering) mitigates carrier ion losses during formation due to, for example, SEI, thereby providing a technical benefit of improving the capacity of the secondary battery. Further, transferring carrier ions to the secondary battery provides the negative electrode of the secondary battery additional carrier ions beyond the coulombic capacity of the positive electrode of the secondary battery, thereby providing a reservoir of addition carrier ions over the cycle life of the secondary battery, further mitigating carrier ion loss during cycling due to side reactions which remove the carrier ions from availability during cycling. The result of the additional carrier ions at the negative electrode provides a further technical benefit of reducing the amount of capacity loss in the secondary battery from one discharge-charge cycle to the next, thereby improving the overall capacity of the secondary battery during its cycle life.

The following embodiments are provided to illustrate various aspects of the present disclosure. The following embodiments are not intended to be limiting and therefore, the present disclosure further supports other aspects and/or embodiments not specifically provided below.

Embodiment 1. A cell formation system for lithium containing secondary batteries. Each lithium containing secondary battery includes a population of bilayers, an electrode busbar, and a counter-electrode busbar, wherein each bilayer of the population of bilayers includes an electrode structure, a separator structure, and a counter-electrode structure, the electrode structure of each member of the bilayer population includes an electrode current collector and an electrode active material layer, and the counter-electrode structure of each member of the bilayer population includes a counter-electrode current collector and a counter-electrode active material layer. The cell formation system includes a population of formation clusters, each formation cluster of the population of formation clusters including: a connector configured for connecting to a lithium containing secondary battery; a charging module connected to the connector and configured to charge the lithium containing secondary battery connected to the connector; a pre-lithiation module connected to the connector and configured to diffuse lithium to the electrode active material layers of the lithium containing secondary battery connected to the connector; a discharging module connected to the connector and configured to discharge the lithium containing secondary battery connected to the connector; and a communication interface for communicatively coupling the formation cluster to a central controller. In response to received instructions from the central controller, the formation cluster is configured to: charge the lithium containing secondary battery connected to the connector using the charging module; diffuse lithium to the electrode active material layers of the lithium containing secondary battery using the pre-lithiation module after the lithium containing secondary battery has been charged; and discharge the lithium containing secondary battery using the discharging module after lithium has been diffused to the electrode active material layers of the lithium containing secondary battery using the pre-lithiation module.

Embodiment 2. The cell formation system of Embodiment 1, wherein the central controller includes a processor, a memory, and a controller communication interface for communicatively coupling the central controller to the population of formation clusters, wherein the central controller is programmed by instructions stored in the memory and executed by the processor to provide instructions to the population of formation clusters.

Embodiment 3. The cell formation system of any one of the preceding Embodiments, wherein each formation cluster further includes a power connection configured for connection to a power source, wherein the power connection is coupled to the charging module, the pre-lithiation module, and the discharging module.

Embodiment 4. The cell formation system of any one of the preceding Embodiments, wherein each formation cluster further includes a formation cluster controller including a processor and a memory, wherein the formation cluster controller is programmed by instructions stored in the memory and executed by the processor to control the charging module, the pre-lithiation module, and the discharging module in response to the received instructions from the central controller.

Embodiment 5. The cell formation system of Embodiment 4, wherein the formation cluster controller includes a microcontroller.

Embodiment 6. The cell formation system of Embodiment 4 or Embodiment 5, wherein each formation cluster further includes at least one sensor, wherein the formation cluster controller is programmed receive a signal output by the at least one sensor and to transmit the received signal output to the central controller using the communication interface.

Embodiment 7. The cell formation system of any one of the preceding Embodiments, wherein the charging module, the pre-lithiation module, and the discharging module of each formation cluster each further includes a module controller including a processor and a memory, wherein each module controller is programmed by instructions stored in the memory and executed by the processor to control its associated one of the charging module, the pre-lithiation module, and the discharging module in response to the received instructions from the central controller.

Embodiment 8. The cell formation system of Embodiment 7, wherein the module controllers comprise microcontrollers.

Embodiment 9. The cell formation system of Embodiment 7 or Embodiment 8, wherein each formation cluster further includes at least one sensor, wherein at least one of the module controllers is programmed receive a signal output by the at least one sensor and to transmit the received signal output to the central controller using the communication interface.

Embodiment 10. The cell formation system of Embodiment 6 or Embodiment 9, wherein the at least one sensor includes a temperature sensor.

Embodiment 11. The cell formation system of Embodiment 6, Embodiment 9, or Embodiment 10, wherein the at least one sensor includes a voltage sensor.

Embodiment 12. The cell formation system of Embodiment 6, Embodiment 9, Embodiment 10, or Embodiment 11, wherein the at least one sensor includes a current sensor.

Embodiment 13. The cell formation system of any one of the preceding Embodiments, further including a housing supporting the population of formation clusters.

Embodiment 14. The cell formation system of any one of the preceding Embodiments, further including a communication network connected to the communication interface of each formation cluster of the population of formation clusters.

Embodiment 15. The cell formation system of any one of Embodiments 1-13, wherein the communication interface of each formation cluster of the population of formation clusters includes a wireless communication interface.

Embodiment 16. The cell formation system of any one of the preceding Embodiments, further including a population of additional formation clusters, each additional formation cluster of the population of additional formation clusters includes: a connector configured for connection to a lithium containing secondary battery; a charging module connected to the connector and configured to charge a lithium containing secondary battery connected to the connector; a pre-lithiation module connected to the connector and configured to diffuse lithium to the electrode active material layers of a lithium containing secondary battery connected to the connector; a discharging module connected to the connector and configured to discharge a lithium containing secondary battery connected to the connector; and a communication interface for communicatively coupling the formation cluster to the central controller. In response to received instructions from the central controller, the formation cluster is configured to: charge a lithium containing secondary battery connected to the connector using the charging module; diffuse lithium to the electrode active material layers of the lithium containing secondary battery using the pre-lithiation module after the lithium containing secondary battery has been charged; and discharge the lithium containing secondary battery using the discharging module after lithium has been diffused to the electrode active material layers of the lithium containing secondary battery using the pre-lithiation module.

Embodiment 17. The cell formation system of Embodiment 16, further including an additional housing supporting the population of additional formation clusters.

Embodiment 18. The cell formation system of any one of the preceding Embodiments, wherein the lithium containing secondary battery connected to the connector includes an auxiliary electrode containing lithium, and the formation cluster is configured to selectively conduct current through the auxiliary electrode using the pre-lithiation module to diffuse lithium to the electrode active material layers of the lithium containing secondary battery.

Embodiment 19. The cell formation system of Embodiment 18, wherein the auxiliary electrode includes a first separator layer including an ionically permeable material, a conductive layer including an electrically conductive material, the conductive layer having a first surface contacting the first separator layer and a second surface opposing the first surface, a population of carrier ion supply layers disposed on the second surface of the conductive layer, each carrier ion supply layer including a material that supplies lithium ions for the electrode active material layers of the lithium containing secondary battery, and a second separator layer including an ionically permeable material and in contact with the carrier ion supply layers.

Embodiment 20. The cell formation system of Embodiment 19, wherein the second surface of the conductive layer includes a first region disposed at a first end of the conductive layer, a second region disposed at a second end of the conductive layer that opposes the first end, and a third region disposed between the first region and the second region, wherein one of the carrier ion supply layers is disposed within the first region and another one of carrier ion supply layer is disposed within the second region.

Embodiment 21. The cell formation system of Embodiment 20, wherein the second separator layer is in contact with the third region of the second surface of the conductive layer.

Embodiment 22. The cell formation system of Embodiment 20 or Embodiment 21, wherein the first region, the second region, and the third region are disposed across a length of the conductive layer.

Embodiment 23. The cell formation system of any one of Embodiments 19-22, wherein the first separator layer and the second separator layer are mechanically bonded together around at least a portion of a perimeter of the first separator layer and the second separator layer.

Embodiment 24. The cell formation system of any one of Embodiments 19-23, wherein the first separator layer and the second separator layer are formed from a continuous separator material, the first separator layer includes a first portion of the continuous separator material, the second separator layer includes a second portion of the continuous separator material, and the second portion is folded over the first portion to contact surfaces of the carrier ion supply layers.

Embodiment 25. The cell formation system of Embodiment 24, wherein the continuous separator material has a thickness in a range of about 0.01 millimeter to about 1 millimeter.

Embodiment 26. The cell formation system of Embodiment 25, wherein the thickness of the continuous separator material is about 0.025 millimeter.

Embodiment 27. The cell formation system of any one of Embodiments 19-26, wherein the first separator layer and the second separator layer have a thickness in a range of values of about 0.01 millimeter to about 1 millimeter.

Embodiment 28. The cell formation system of any one of Embodiments 19-27, wherein a thickness of the second separator layer is about 0.025 millimeter.

Embodiment 29. The cell formation system of any one of Embodiments 19-28, wherein the conductive layer includes one of copper and aluminum, or alloys of copper and aluminum.

Embodiment 30. The cell formation system of any one of Embodiments 19-29, wherein the conductive layer includes copper.

Embodiment 31. The cell formation system of any one of Embodiments 19-30, wherein the conductive layer has a thickness in a range of values of about 0.01 millimeter to about 1 millimeter.

Embodiment 32. The cell formation system of any one of Embodiments 19-31, wherein the conductive layer has a thickness of about 0.1 millimeter.

Embodiment 33. The cell formation system of any one of Embodiments 19-32, wherein the carrier ion supply layers have a thickness in a range of values of about 0.05 millimeter to about 1 millimeter.

Embodiment 34. The cell formation system of any one of Embodiments 19-33, wherein the carrier ion supply layers have a thickness of about 0.15 millimeter.

Embodiment 35. The cell formation system of any one of Embodiments 19-34, wherein the carrier ion supply layers provide a source of lithium ions.

Embodiment 36. The cell formation system of any one of Embodiments 19-35, wherein the carrier ion supply layers are cold welded to the second surface of the conductive layer.

Embodiment 37. The cell formation system of any one of Embodiments 19-36, wherein the auxiliary electrode includes a conductive tab including an electrically conductive material and coupled to the second surface of the conductive layer.

Embodiment 38. The cell formation system of Embodiment 37, wherein the conductive tab includes a first end that is coupled to the conductive layer and a second end distal to the first end that projects away from the conductive layer.

Embodiment 39. The cell formation system of Embodiment 37 or Embodiment 38, wherein the conductive tab includes one of nickel, copper, and aluminum, or alloys of copper, nickel, and aluminum.

Embodiment 40. The cell formation system of Embodiment 37 or Embodiment 38, wherein the conductive tab includes nickel.

Embodiment 41. The cell formation system of any one of the preceding Embodiments, wherein the electrode structure is one of a positive electrode and a negative electrode, the counter-electrode structure is the other one of the positive electrode and the negative electrode, the positive electrode has a positive electrode coulombic capacity, and the negative electrode has a negative electrode coulombic capacity exceeding the positive electrode coulombic capacity.

Embodiment 42. The cell formation system of Embodiment 41, wherein a ratio of the negative electrode coulombic capacity to the positive electrode coulombic capacity is at least 1.2:1.

Embodiment 43. The cell formation system of Embodiment 41, wherein a ratio of the negative electrode coulombic capacity to the positive electrode coulombic capacity is at least 1.3:1.

Embodiment 44. The cell formation system of Embodiment 41, wherein a ratio of the negative electrode coulombic capacity to the positive electrode coulombic capacity is at least 1.5:1.

Embodiment 45. The cell formation system of Embodiment 41, wherein a ratio of the negative electrode coulombic capacity to the positive electrode coulombic capacity is at least 2:1.

Embodiment 46. The cell formation system of Embodiment 41, wherein a ratio of the negative electrode coulombic capacity to the positive electrode coulombic capacity is at least 3:1.

Embodiment 47. The cell formation system of Embodiment 41, wherein a ratio of the negative electrode coulombic capacity to the positive electrode coulombic capacity is at least 4:1.

Embodiment 48. The cell formation system of Embodiment 41, wherein a ratio of the negative electrode coulombic capacity to the positive electrode coulombic capacity is at least 5:1.

Embodiment 49. The cell formation system of any one of Embodiments 18-40, wherein the electrode structure is one of a positive electrode and a negative electrode, the counter-electrode structure is the other one of the positive electrode and the negative electrode, the positive electrode has a positive electrode coulombic capacity, and the negative electrode has a negative electrode coulombic capacity exceeding the positive electrode coulombic capacity.

Embodiment 50. The cell formation system of Embodiment 49, wherein a ratio of the negative electrode coulombic capacity to the positive electrode coulombic capacity is at least 1.2:1, at least 1.3:1, at least 1.5:1, at least 2:1, at least 3:1, at least 4:1, or at least 5:1.

Embodiment 51. The cell formation system of Embodiment 49 or Embodiment 50, wherein a ratio of a coulombic capacity of the auxiliary electrode to the positive electrode coulombic capacity is at least 2:1.

Embodiment 52. The cell formation system of Embodiment 49 or Embodiment 50, wherein a ratio of a coulombic capacity of the auxiliary electrode to the positive electrode coulombic capacity is at least 3:1.

Embodiment 53. The cell formation system of Embodiment 49 or Embodiment 50, wherein a ratio of a coulombic capacity of the auxiliary electrode to the positive electrode coulombic capacity is at least 4:1.

Embodiment 54. The cell formation system of Embodiment 49 or Embodiment 50, wherein a ratio of a coulombic capacity of the auxiliary electrode to the positive electrode coulombic capacity is at least 5:1.

Embodiment 55. The cell formation system of any one of the preceding Embodiments, wherein the electrode active material layers or the counter-electrode active material layers of the lithium containing secondary battery include anodically active silicon or an alloy thereof.

Embodiment 56. The cell formation system of any one of the preceding Embodiments, wherein the electrode active material layers or the counter-electrode active material layers of the lithium containing secondary battery include an anodically active material that includes silicon and contains a void volume fraction to accommodate volume expansion and contraction as lithium ions are incorporated into or leave the electrode active material layers or the counter-electrode active material layers during charging and discharging cycles of the lithium containing secondary battery.

Embodiment 57. The cell formation system of Embodiment 56, wherein the void volume fraction of the anodically active material is at least 0.1.

Embodiment 58. The cell formation system of Embodiment 56, wherein the void volume fraction of the anodically active material is not greater than 0.8.

Embodiment 59. The cell formation system of Embodiment 56, wherein the void volume fraction of the anodically active material is about 0.15 to about 0.75.

Embodiment 60. The cell formation system of Embodiment 56, wherein the void volume fraction of the anodically active material is about 0.2 to about 0.7.

Embodiment 61. The cell formation system of Embodiment 56, wherein the void volume fraction of the anodically active material is about 0.25 to about 0.6.

Embodiment 62. The cell formation system of Embodiment 56, wherein the anodically active material includes macroporous, microporous, or mesoporous material layers, or a combination thereof.

Embodiment 63. The cell formation system of any one of the preceding Embodiments, wherein the separator structure includes a microporous separator between the electrode structure and the counter-electrode structure that is permeated with an electrolyte.

Embodiment 64. The cell formation system of Embodiment 63, wherein the separator or the electrolyte includes a polymer-based electrolyte selected from one or more of PEO-based polymer electrolytes, and polymer-ceramic composite electrolytes.

Embodiment 65. The cell formation system of Embodiment 63 or Embodiment 64, wherein the separator or the electrolyte includes an oxide-based electrolyte selected from one or more of lithium lanthanum titanate ($Li_{0.34}La_{0.56}TiO_3$), Al-doped lithium lanthanum zirconate ($Li_{6.24}La_3Zr_2Al_{0.24}O_{11.98}$), Ta-doped lithium lanthanum zirconate ($Li_{6.4}La_3Zr_{1.4}Ta_{0.6}O_{12}$), and lithium aluminum titanium phosphate ($Li_{1.4}Al_{0.4}Ti_{1.6}(PO_4)_3$).

Embodiment 66. The cell formation system of any one of Embodiments 63-65, wherein the separator or the electrolyte includes a solid electrolyte selected from one or more of lithium tin phosphorus sulfide ($Li_{10}SnP_2S_{12}$), lithium phosphorus sulfide ($\beta$-$Li_3PS_4$), and lithium phosphorus sulfur chloride iodide ($Li_6PS_5Cl_{0.9}I_{0.1}$).

Embodiment 67. The cell formation system of any one of Embodiments 63-66, wherein the separator or the electrolyte includes a solid-state lithium ion conducting ceramic.

Embodiment 68. The cell formation system of any one of Embodiments 63-67, wherein the separator or the electrolyte includes a non-aqueous electrolyte selected from one or more of $LiClO_4$, $LiBF_4$, $LiPF_6$, $LiAsF_6$, $LiCl$, and $LiBr$; and organic lithium salts such as $LiB(C_6H_5)_4$, $LiN(SO_2CF_3)_2$, $LiN(SO_2CF_3)_3$, $LiNSO_2CF_3$, $LiNSO_2CF_5$, $LiNSO_2C_4F_9$, $LiNSO_2C_5F_{11}$, $LiNSO_2C_6F_{13}$, and $LiNSO_2C_7F_{15}$.

Embodiment 69. The cell formation system of any one of the preceding Embodiments, wherein the electrode active material layers or the counter-electrode active material layers of the lithium containing secondary battery include an anodically active material selected from (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide, $ZnCo_2O_4$; (f) particles of graphite and carbon; (g) lithium metal; and (h) combinations thereof.

Embodiment 70. The cell formation system of any one of the preceding Embodiments, wherein the electrode active material layers or the counter-electrode active material layers of the lithium containing secondary battery include an anodically active material selected from graphite, soft carbon, hard carbon, graphene, or any of a range of metals, semi-metals, alloys, oxides, nitrides, and compounds capable of intercalating lithium or forming an alloy with lithium.

Embodiment 71. The cell formation system of any one of the preceding Embodiments, wherein the electrode active material layers or the counter-electrode active material layers of the lithium containing secondary battery include an anodically active material selected from tin, lead, magnesium, aluminum, boron, gallium, silicon, Si/C composites, Si/graphite blends, silicon oxide (SiOx), porous Si, intermetallic Si alloys, indium, zirconium, germanium, bismuth, cadmium, antimony, silver, zinc, arsenic, hafnium, yttrium, lithium, sodium, graphite, carbon, lithium titanate, palladium, and mixtures thereof.

Embodiment 72. The cell formation system of any one of the preceding Embodiments, wherein the electrode active material layers or the counter-electrode active material layers of the lithium containing secondary battery include an anodically active material selected from aluminum, tin, or silicon, or an oxide thereof, a nitride thereof, a fluoride thereof, or other alloy thereof.

Embodiment 73. The cell formation system of any one of the preceding Embodiments, wherein the electrode active material layers or the counter-electrode active material layers of the lithium containing secondary battery include an anodically active material selected from fibers of aluminum, tin, or silicon, or an alloy thereof.

Embodiment 74. The cell formation system of any one of the preceding Embodiments, wherein the electrode active material layers or the counter-electrode active material layers of the lithium containing secondary battery include an anodically active material coated with a particulate lithium material selected from stabilized lithium metal particles.

Embodiment 75. The cell formation system of any one of the preceding Embodiments, wherein the electrode active material layers or the counter-electrode active material layers of the lithium containing secondary battery include a cathodically active material that includes an intercalation-type chemistry active material, a conversion chemistry active material, or a combination thereof.

Embodiment 76. The cell formation system of any one of the preceding Embodiments, wherein the electrode active material layers or the counter-electrode active material layers of the lithium containing secondary battery include a cathodically active material that includes a conversion chemistry material selected from one or more of S, LiF, Fe, Cu, Ni, $FeF_2$, $FeO_dF_{3.2d}$, $FeF_3$, $CoF_3$, $CoF_2$, $CuF_2$, $NiF_2$, where $0 \leq d \leq 0.5$.

Embodiment 77. The cell formation system of any one of the preceding Embodiments, wherein the electrode active material layers or the counter-electrode active material layers of the lithium containing secondary battery include a cathodically active material that includes one or more of transition metal oxides, transition metal sulfides, transition metal nitrides, lithium-transition metal oxides, lithium-transition metal sulfides, and lithium-transition metal nitrides.

Embodiment 78. A formation cluster for connection to a single lithium containing secondary battery in a cell formation system for lithium containing secondary batteries, each lithium containing secondary battery including a population of bilayers, an electrode busbar, and a counter-electrode busbar, wherein each bilayer of the population of bilayers includes an electrode structure, a separator structure, and a counter-electrode structure, the electrode structure of each member of the bilayer population includes an electrode current collector and an electrode active material layer, and the counter-electrode structure of each member of the bilayer population includes a counter-electrode current collector and a counter-electrode active material layer. The formation cluster includes: a connector configured for connecting to the lithium containing secondary battery; a charging module connected to the connector and configured to charge the lithium containing secondary battery connected to the connector; a pre-lithiation module connected to the connector and configured to diffuse lithium to the electrode active material layers of the lithium containing secondary battery connected to the connector; a discharging module connected to the connector and configured to discharge the lithium containing secondary battery connected to the connector; and at least one microcontroller. The at least one microcontroller is programmed to: charge the lithium containing secondary battery connected to the connector using the charging module; diffuse lithium to the electrode active material layers of the lithium containing secondary battery using the pre-lithiation module after the lithium containing secondary battery has been charged; and discharge the lithium containing secondary battery using the discharging module after lithium has been diffused to the electrode active material layers of the lithium containing secondary battery using the pre-lithiation module.

Embodiment 79. The formation cluster of Embodiment 78, further including a communication interface for communicatively coupling the formation cluster to a central controller.

Embodiment 80. The formation cluster of Embodiment 79, wherein the at least one microcontroller is programmed to charge, diffuse, and discharge the lithium containing secondary battery in response to instructions received from the central controller.

Embodiment 81. The formation cluster of Embodiment 79 or Embodiment 80, wherein the communication interface is a wired communication interface for connection to a wired communication network.

Embodiment 82. The formation cluster of Embodiment 79 or Embodiment 80, wherein the communication interface is a wireless communication interface for connection to a wireless communication network.

Embodiment 83. The formation cluster of any one of Embodiments 78-82, further including a power connection configured for connection to a power source, wherein the power connection is coupled to the charging module, the pre-lithiation module, and the discharging module.

Embodiment 84. The formation cluster of any one of Embodiments 78-83, wherein the at least one microcontroller includes a charging module controller, a pre-lithiation module controller, and a discharging module controller.

Embodiment 85. The formation cluster of Embodiment 84, wherein the charging module controller is programmed to control the charging module, the pre-lithiation module controller is programmed to control the pre-lithiation module, and the discharging module controller is programmed to control the discharging module.

Embodiment 86. The formation cluster of any one of Embodiments 78-85, further including at least one sensor to monitor a condition of the formation cluster or a lithium containing secondary battery connected to the connector, wherein the at least one microcontroller is programmed receive a signal output by the at least one sensor.

Embodiment 87. The formation cluster of Embodiment 86, wherein the at least one sensor includes a temperature sensor.

Embodiment 88. The formation cluster of Embodiment 86 or Embodiment 87, wherein the at least one sensor includes a voltage sensor.

Embodiment 89. The formation cluster of Embodiment 86, Embodiment 87, or Embodiment 88, wherein the at least one sensor includes a current sensor.

Embodiment 90. The formation cluster of any one of Embodiments 78-89, wherein the lithium containing secondary battery connected to the connector includes an auxiliary electrode containing lithium, and the pre-lithiation module is configured to selectively conduct current through the auxiliary electrode to diffuse lithium to the electrode active material layers of the lithium containing secondary battery.

Embodiment 91. The formation cluster of Embodiment 90, wherein the auxiliary electrode includes a first separator layer including an ionically permeable material, a conductive layer including an electrically conductive material, the conductive layer having a first surface contacting the first separator layer and a second surface opposing the first surface, a population of carrier ion supply layers disposed on the second surface of the conductive layer, each carrier ion supply layer including a material that supplies lithium ions for the electrode active material layers of the lithium containing secondary battery, and a second separator layer including an ionically permeable material and in contact with the carrier ion supply layers.

Embodiment 92. The formation cluster of Embodiment 91, wherein the second surface of the conductive layer includes a first region disposed at a first end of the conductive layer, a second region disposed at a second end of the conductive layer that opposes the first end, and a third region disposed between the first region and the second region, wherein one of the carrier ion supply layers is disposed within the first region and another one of carrier ion supply layer is disposed within the second region.

Embodiment 93. The formation cluster of Embodiment 92, wherein the second separator layer is in contact with the third region of the second surface of the conductive layer.

Embodiment 94. The formation cluster of Embodiment 91 or Embodiment 92, wherein the first region, the second region, and the third region are disposed across a length of the conductive layer.

Embodiment 95. The formation cluster of any one of Embodiments 91-94, wherein the first separator layer and the second separator layer are mechanically bonded together around at least a portion of a perimeter of the first separator layer and the second separator layer.

Embodiment 96. The formation cluster of any one of Embodiments 91-95, wherein the first separator layer and the second separator layer are formed from a continuous separator material, the first separator layer includes a first portion of the continuous separator material, the second separator layer includes a second portion of the continuous separator material, and the second portion is folded over the first portion to contact surfaces of the carrier ion supply layers.

Embodiment 97. The formation cluster of Embodiment 96, wherein the continuous separator material has a thickness in a range of about 0.01 millimeter to about 1 millimeter.

Embodiment 98. The formation cluster of Embodiment 97, wherein the thickness of the continuous separator material is about 0.025 millimeter.

Embodiment 99. The formation cluster of any one of Embodiments 91-98, wherein the first separator layer and the second separator layer have a thickness in a range of values of about 0.01 millimeter to about 1 millimeter.

Embodiment 100. The formation cluster of any one of Embodiments 91-99, wherein a thickness of the second separator layer is about 0.025 millimeter.

Embodiment 101. The formation cluster of any one of Embodiments 91-100, wherein the conductive layer includes one of copper and aluminum, or alloys of copper and aluminum.

Embodiment 102. The formation cluster of any one of Embodiments 91-101, wherein the conductive layer includes copper.

Embodiment 103. The formation cluster of any one of Embodiments 91-102, wherein the conductive layer has a thickness in a range of values of about 0.01 millimeter to about 1 millimeter.

Embodiment 104. The formation cluster of any one of Embodiments 91-103, wherein the conductive layer has a thickness of about 0.1 millimeter.

Embodiment 105. The formation cluster of any one of Embodiments 91-104, wherein the carrier ion supply layers have a thickness in a range of values of about 0.05 millimeter to about 1 millimeter.

Embodiment 106. The formation cluster of any one of Embodiments 91-105, wherein the carrier ion supply layers have a thickness of about 0.15 millimeter.

Embodiment 107. The formation cluster of any one of Embodiments 91-106, wherein the carrier ion supply layers provide a source of lithium ions.

Embodiment 108. The formation cluster of any one of Embodiments 91-107, wherein the carrier ion supply layers are cold welded to the second surface of the conductive layer.

Embodiment 109. The formation cluster of any one of Embodiments 91-108, wherein the auxiliary electrode includes a conductive tab including an electrically conductive material and coupled to the second surface of the conductive layer.

Embodiment 110. The formation cluster of Embodiment 109, wherein the conductive tab includes a first end that is coupled to the conductive layer and a second end distal to the first end that projects away from the conductive layer.

Embodiment 111. The formation cluster of any one of Embodiment 109 or Embodiment 110, wherein the conductive tab includes one of nickel, copper, and aluminum, or alloys of copper, nickel, and aluminum.

Embodiment 112. The formation cluster of any one of Embodiment 109 or Embodiment 110, wherein the conductive tab includes nickel.

Embodiment 113. The formation cluster of any one of Embodiments 78-112, wherein the electrode structure is one of a positive electrode and a negative electrode, the counter-electrode structure is the other one of the positive electrode and the negative electrode, the positive electrode has a positive electrode coulombic capacity, and the negative electrode has a negative electrode coulombic capacity exceeding the positive electrode coulombic capacity.

Embodiment 114. The formation cluster of Embodiment 113, wherein a ratio of the negative electrode coulombic capacity to the positive electrode coulombic capacity is at least 1.2:1.

Embodiment 115. The formation cluster of Embodiment 113, wherein a ratio of the negative electrode coulombic capacity to the positive electrode coulombic capacity is at least 1.3:1.

Embodiment 116. The formation cluster of Embodiment 113, wherein a ratio of the negative electrode coulombic capacity to the positive electrode coulombic capacity is at least 1.5:1.

Embodiment 117. The formation cluster of Embodiment 113, wherein a ratio of the negative electrode coulombic capacity to the positive electrode coulombic capacity is at least 2:1.

Embodiment 118. The formation cluster of Embodiment 113, wherein a ratio of the negative electrode coulombic capacity to the positive electrode coulombic capacity is at least 3:1.

Embodiment 119. The formation cluster of Embodiment 113, wherein a ratio of the negative electrode coulombic capacity to the positive electrode coulombic capacity is at least 4:1.

Embodiment 120. The formation cluster of Embodiment 113, wherein a ratio of the negative electrode coulombic capacity to the positive electrode coulombic capacity is at least 5:1.

Embodiment 121. The formation cluster of any one of Embodiments 90-112, wherein the electrode structure is one of a positive electrode and a negative electrode, the counter-electrode structure is the other one of the positive electrode and the negative electrode, the positive electrode has a positive electrode coulombic capacity, and the negative electrode has a negative electrode coulombic capacity exceeding the positive electrode coulombic capacity.

Embodiment 122. The formation cluster of Embodiment 121, wherein a ratio of the negative electrode coulombic capacity to the positive electrode coulombic capacity is at least 1.2:1, at least 1.3:1, at least 1.5:1, at least 2:1, at least 3:1, at least 4:1, or at least 5:1.

Embodiment 123. The formation cluster of Embodiment 121 or Embodiment 122, wherein a ratio of a coulombic capacity of the auxiliary electrode to the positive electrode coulombic capacity is at least 2:1.

Embodiment 124. The formation cluster of Embodiment 121 or Embodiment 122, wherein a ratio of a coulombic capacity of the auxiliary electrode to the positive electrode coulombic capacity is at least 3:1.

Embodiment 125. The formation cluster of Embodiment 121 or Embodiment 122, wherein a ratio of a coulombic capacity of the auxiliary electrode to the positive electrode coulombic capacity is at least 4:1.

Embodiment 126. The formation cluster of Embodiment 121 or Embodiment 122, wherein a ratio of a coulombic capacity of the auxiliary electrode to the positive electrode coulombic capacity is at least 5:1.

Embodiment 127. The formation cluster of any one of Embodiments 78-126, wherein the electrode active material layers or the counter-electrode active material layers of the lithium containing secondary battery include anodically active silicon or an alloy thereof.

Embodiment 128. The formation cluster of any one of Embodiments 78-127, wherein the electrode active material layers or the counter-electrode active material layers of the lithium containing secondary battery include an anodically active material that includes silicon and contains a void volume fraction to accommodate volume expansion and contraction as lithium ions are incorporated into or leave the electrode active material layers or the counter-electrode active material layers during charging and discharging cycles of the lithium containing secondary battery.

Embodiment 129. The formation cluster of Embodiment 128, wherein the void volume fraction of the anodically active material is at least 0.1.

Embodiment 130. The formation cluster of Embodiment 128, wherein the void volume fraction of the anodically active material is not greater than 0.8.

Embodiment 131. The formation cluster of Embodiment 128, wherein the void volume fraction of the anodically active material is about 0.15 to about 0.75.

Embodiment 132. The formation cluster of Embodiment 128, wherein the void volume fraction of the anodically active material is about 0.2 to about 0.7.

Embodiment 133. The formation cluster of Embodiment 128, wherein the void volume fraction of the anodically active material is about 0.25 to about 0.6.

Embodiment 134. The formation cluster of Embodiment 128, wherein the anodically active material includes macroporous, microporous, or mesoporous material layers, or a combination thereof.

Embodiment 135. The formation cluster of any one of Embodiments 78-134, wherein the separator structure includes a microporous separator between the electrode structure and the counter-electrode structure that is permeated with an electrolyte.

Embodiment 136. The formation cluster of Embodiment 135, wherein the separator or the electrolyte includes a polymer-based electrolyte selected from one or more of PEO-based polymer electrolytes, and polymer-ceramic composite electrolytes.

Embodiment 137. The formation cluster of Embodiment 135 or Embodiment 136, wherein the separator or the electrolyte includes an oxide-based electrolyte selected from one or more of lithium lanthanum titanate ($Li_{0.34}La_{0.56}TiO_3$), Al-doped lithium lanthanum zirconate ($Li_{6.24}La_3Zr_2Al_{0.24}O_{11.98}$), Ta-doped lithium lanthanum zirconate ($Li_{6.4}La_3Zr_{1.4}Ta_{0.6}O_{12}$), and lithium aluminum titanium phosphate ($Li_{1.4}Al_{0.4}Ti_{1.6}(PO_4)_3$).

Embodiment 138. The formation cluster of any one of Embodiments 135-137, wherein the separator or the electrolyte includes a solid electrolyte selected from one or more of lithium tin phosphorus sulfide ($Li_{10}SnP_2S_{12}$), lithium phosphorus sulfide ($\beta$-$Li_3PS_4$), and lithium phosphorus sulfur chloride iodide ($Li_6PS_5Cl_{0.9}I_{0.1}$).

Embodiment 139. The formation cluster of any one of Embodiments 135-138, wherein the separator or the electrolyte includes a solid-state lithium ion conducting ceramic.

Embodiment 140. The formation cluster of any one of Embodiments 135-139, wherein the separator or the electrolyte includes a non-aqueous electrolyte selected from one or more of $LiClO_4$, $LiBF_4$, $LiPF_6$, $LiAsF_6$, LiCl, and LiBr; and organic lithium salts such as $LiB(C_6H_5)_4$, $LiN(SO_2CF_3)_2$, $LiN(SO_2CF_3)_3$, $LiNSO_2CF_3$, $LiNSO_2CF_5$, $LiNSO_2C_4F_9$, $LiNSO_2C_5F_{11}$, $LiNSO_2C_6F_{13}$, and $LiNSO_2C_7F_{15}$.

Embodiment 141. The formation cluster of any one of Embodiments 78-140, wherein the electrode active material layers or the counter-electrode active material layers of the lithium containing secondary battery include an anodically active material selected from (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide, $ZnCo_2O_4$; (f) particles of graphite and carbon; (g) lithium metal; and (h) combinations thereof.

Embodiment 142. The formation cluster of any one of Embodiments 78-141, wherein the electrode active material layers or the counter-electrode active material layers of the lithium containing secondary battery include an anodically active material selected from graphite, soft carbon, hard carbon, graphene, or any of a range of metals, semi-metals, alloys, oxides, nitrides, and compounds capable of intercalating lithium or forming an alloy with lithium.

Embodiment 143. The formation cluster of any one of Embodiments 78-142, wherein the electrode active material layers or the counter-electrode active material layers of the lithium containing secondary battery include an anodically active material selected from tin, lead, magnesium, aluminum, boron, gallium, silicon, Si/C composites, Si/graphite blends, silicon oxide (SiOx), porous Si, intermetallic Si alloys, indium, zirconium, germanium, bismuth, cadmium, antimony, silver, zinc, arsenic, hafnium, yttrium, lithium, sodium, graphite, carbon, lithium titanate, palladium, and mixtures thereof.

Embodiment 144. The formation cluster of any one of Embodiments 78-143, wherein the electrode active material layers or the counter-electrode active material layers of the lithium containing secondary battery include an anodically active material selected from aluminum, tin, or silicon, or an oxide thereof, a nitride thereof, a fluoride thereof, or other alloy thereof.

Embodiment 145. The formation cluster of any one of Embodiments 78-144, wherein the electrode active material layers or the counter-electrode active material layers of the lithium containing secondary battery include an anodically active material selected from fibers of aluminum, tin, or silicon, or an alloy thereof.

Embodiment 146. The formation cluster of any one of Embodiments 78-145, wherein the electrode active material layers or the counter-electrode active material layers of the lithium containing secondary battery include an anodically active material coated with a particulate lithium material selected from stabilized lithium metal particles.

Embodiment 147. The formation cluster of any one of Embodiments 78-146, wherein the electrode active material layers or the counter-electrode active material layers of the lithium containing secondary battery include a cathodically active material that includes an intercalation-type chemistry active material, a conversion chemistry active material, or a combination thereof.

Embodiment 148. The formation cluster of any one of Embodiments 78-147, wherein the electrode active material layers or the counter-electrode active material layers of the lithium containing secondary battery include a cathodically active material that includes a conversion chemistry material selected from one or more of S, LiF, Fe, Cu, Ni, $FeF_2$, $FeO_dF_{3-2d}$, $FeF_3$, $CoF_3$, $CoF_2$, $CuF_2$, $NiF_2$, where $0 \leq d \leq 0.5$.

Embodiment 149. The formation cluster of any one of Embodiments 78-148, wherein the electrode active material layers or the counter-electrode active material layers of the lithium containing secondary battery include a cathodically active material that includes one or more of transition metal oxides, transition metal sulfides, transition metal nitrides, lithium-transition metal oxides, lithium-transition metal sulfides, and lithium-transition metal nitrides.

Embodiment 150. A distributed cell formation system for lithium containing secondary batteries, each lithium containing secondary battery including a population of bilayers, an electrode busbar, and a counter-electrode busbar, wherein each bilayer of the population of bilayers includes an electrode structure, a separator structure, and a counter-electrode structure, the electrode structure of each member of the bilayer population includes an electrode current collector and an electrode active material layer, and the counter-electrode structure of each member of the bilayer population includes a counter-electrode current collector and a counter-electrode active material layer. The distributed cell formation system includes: a central controller including a processor, a memory, and a communication interface; and a population of formation clusters positioned apart from the central controller. Each formation cluster is configured to perform multiple steps of a cell formation process for a single lithium containing secondary battery, and each formation cluster includes: a connector configured for connecting to the lithium containing secondary battery; a population of modules, each module of the population of modules configured to perform a different one of the multiple steps on the lithium containing secondary battery connected to the connector; a communication interface communicatively coupled to the central controller; and at least one microcontroller. The at least one microcontroller is programmed to control the population of modules to perform the multiple steps of the cell formation process in response to instructions received from the central controller.

Embodiment 151. The distributed cell formation system of Embodiment 150, wherein the multiple steps of the cell formation process include charging the lithium containing secondary battery connected to the connector, and discharging the lithium containing secondary battery connected to the connector.

Embodiment 152. The distributed cell formation system of Embodiment 150, wherein the multiple steps of the cell formation process include diffusing lithium to the electrode active material layers of the lithium containing secondary battery connected to the connector.

Embodiment 153. The distributed cell formation system of Embodiment 151, wherein the multiple steps of the cell formation process include diffusing lithium to the electrode active material layers of the lithium containing secondary battery connected to the connector.

Embodiment 154. The distributed cell formation system of Embodiment 153, wherein the at least one microcontroller is programmed to control the population of modules to charge the lithium containing secondary battery connected to the connector first, diffuse lithium to the electrode active material layers of the lithium containing secondary battery connected to the connector after the lithium containing secondary battery is charged, and discharge the lithium containing secondary battery after diffusing lithium to the electrode active material layers of the lithium containing secondary battery.

Embodiment 155. The distributed cell formation system of any one of Embodiments 150-154, further including a housing, wherein the population of formation clusters is located in the housing, and the central controller is not located within the housing.

Embodiment 156. The distributed cell formation system of any one of Embodiments 150-155, wherein the at least one microcontroller includes a memory storing instructions executable by the at least one microcontroller for controlling performance of the multiple steps by the population of modules.

Embodiment 157. The distributed cell formation system of Embodiment 156, wherein the central controller is programmed by instructions stored in the memory to transmit instructions to each formation cluster using the communication interface, wherein the instructions inform each formation cluster when to perform each step of the multiple steps without informing the formation cluster how to perform each step.

Embodiment 158. The distributed cell formation system of Embodiment 156, wherein the central controller is programmed by instructions stored in the memory to transmit the instructions for controlling performance of the multiple steps by the population of modules to each formation cluster using the communication interface.

Embodiment 159. The distributed cell formation system of any one of Embodiments 150-158, wherein the at least one microcontroller includes a population of module controllers, each module controller of the population of module controllers programmed to control a different one of the modules to perform its associated one of the multiple steps.

Embodiment 160. The distributed cell formation system of Embodiment 159, wherein each module controller includes a microcontroller.

Embodiment 161. The distributed cell formation system of any one of Embodiments 150-160, wherein the lithium containing secondary battery connected to the connector of each formation cluster includes an auxiliary electrode containing lithium, and each formation cluster is configured to selectively conduct current through the respective auxiliary electrode to diffuse lithium to the electrode active material layers of the lithium containing secondary battery.

Embodiment 162. The distributed cell formation system of Embodiment 161, wherein the auxiliary electrode includes a first separator layer including an ionically permeable material, a conductive layer including an electrically conductive material, the conductive layer having a first surface contacting the first separator layer and a second surface opposing the first surface, a population of carrier ion supply layers disposed on the second surface of the conductive layer, each carrier ion supply layer including a material that supplies lithium ions for the electrode active material layers of the lithium containing secondary battery, and a second separator layer including an ionically permeable material and in contact with the carrier ion supply layers.

Embodiment 163. The distributed cell formation system of Embodiment 162, wherein the second surface of the conductive layer includes a first region disposed at a first end of the conductive layer, a second region disposed at a second end of the conductive layer that opposes the first end, and a third region disposed between the first region and the second region, wherein one of the carrier ion supply layers is disposed within the first region and another one of carrier ion supply layer is disposed within the second region.

Embodiment 164. The distributed cell formation system of Embodiment 163, wherein the second separator layer is in contact with the third region of the second surface of the conductive layer.

Embodiment 165. The distributed cell formation system of Embodiment 163 or Embodiment 164, wherein the first region, the second region, and the third region are disposed across a length of the conductive layer.

Embodiment 166. The distributed cell formation system of any one of Embodiments 162-165, wherein the first separator layer and the second separator layer are mechanically bonded together around at least a portion of a perimeter of the first separator layer and the second separator layer.

Embodiment 167. The distributed cell formation system of any one of Embodiments 162-166, wherein the first separator layer and the second separator layer are formed from a continuous separator material, the first separator layer includes a first portion of the continuous separator material, the second separator layer includes a second portion of the continuous separator material, and the second portion is folded over the first portion to contact surfaces of the carrier ion supply layers.

Embodiment 168. The distributed cell formation system of Embodiment 167, wherein the continuous separator material has a thickness in a range of about 0.01 millimeter to about 1 millimeter.

Embodiment 169. The distributed cell formation system of Embodiment 168, wherein the thickness of a continuous separator material is about 0.025 millimeter.

Embodiment 170. The distributed cell formation system of any one of Embodiments 162-169, wherein the first separator layer and the second separator layer have a thickness in a range of values of about 0.01 millimeter to about 1 millimeter.

Embodiment 171. The distributed cell formation system of any one of Embodiments 162-170, wherein a thickness of the second separator layer is about 0.025 millimeter.

Embodiment 172. The distributed cell formation system of any one of Embodiments 162-171, wherein the conductive layer includes one of copper and aluminum, or alloys of copper and aluminum.

Embodiment 173. The distributed cell formation system of any one of Embodiments 162-172, wherein the conductive layer includes copper.

Embodiment 174. The distributed cell formation system of any one of Embodiments 162-173, wherein the conductive layer has a thickness in a range of values of about 0.01 millimeter to about 1 millimeter.

Embodiment 175. The distributed cell formation system of any one of Embodiments 162-174, wherein the conductive layer has a thickness of about 0.1 millimeter.

Embodiment 176. The distributed cell formation system of any one of Embodiments 162-175, wherein the carrier ion supply layers have a thickness in a range of values of about 0.05 millimeter to about 1 millimeter.

Embodiment 177. The distributed cell formation system of any one of Embodiments 162-176, wherein the carrier ion supply layers have a thickness of about 0.15 millimeter.

Embodiment 178. The distributed cell formation system of any one of Embodiments 162-177, wherein the carrier ion supply layers provide a source of lithium ions.

Embodiment 179. The distributed cell formation system of any one of Embodiments 162-178, wherein the carrier ion supply layers are cold welded to the second surface of the conductive layer.

Embodiment 180. The distributed cell formation system of any one of Embodiments 162-179, wherein the auxiliary electrode includes a conductive tab including an electrically conductive material and coupled to the second surface of the conductive layer.

Embodiment 181. The distributed cell formation system of Embodiment 180, wherein the conductive tab includes a first end that is coupled to the conductive layer and a second end distal to the first end that projects away from the conductive layer.

Embodiment 182. The distributed cell formation system of Embodiment 180 or Embodiment 181, wherein the conductive tab includes one of nickel, copper, and aluminum, or alloys of copper, nickel, and aluminum.

Embodiment 183. The distributed cell formation system of Embodiment 180 or Embodiment 181, wherein the conductive tab includes nickel.

Embodiment 184. The distributed cell formation system of any one Embodiments 150-183, wherein the electrode structure is one of a positive electrode and a negative electrode, the counter-electrode structure is the other one of the positive electrode and the negative electrode, the positive electrode has a positive electrode coulombic capacity, and the negative electrode has a negative electrode coulombic capacity exceeding the positive electrode coulombic capacity.

Embodiment 185. The distributed cell formation system of Embodiment 184, wherein a ratio of the negative electrode coulombic capacity to the positive electrode coulombic capacity is at least 1.2:1.

Embodiment 186. The distributed cell formation system of Embodiment 184, wherein a ratio of the negative electrode coulombic capacity to the positive electrode coulombic capacity is at least 1.3:1.

Embodiment 187. The distributed cell formation system of Embodiment 184, wherein a ratio of the negative electrode coulombic capacity to the positive electrode coulombic capacity is at least 1.5:1.

Embodiment 188. The distributed cell formation system of Embodiment 184, wherein a ratio of the negative electrode coulombic capacity to the positive electrode coulombic capacity is at least 2:1.

Embodiment 189. The distributed cell formation system of Embodiment 184, wherein a ratio of the negative electrode coulombic capacity to the positive electrode coulombic capacity is at least 3:1.

Embodiment 190. The distributed cell formation system of Embodiment 184, wherein a ratio of the negative electrode coulombic capacity to the positive electrode coulombic capacity is at least 4:1.

Embodiment 191. The distributed cell formation system of Embodiment 184, wherein a ratio of the negative electrode coulombic capacity to the positive electrode coulombic capacity is at least 5:1.

Embodiment 192. The distributed cell formation system of any one of Embodiments 161-183, wherein the electrode structure is one of a positive electrode and a negative electrode, the counter-electrode structure is the other one of the positive electrode and the negative electrode, the positive electrode has a positive electrode coulombic capacity, and the negative electrode has a negative electrode coulombic capacity exceeding the positive electrode coulombic capacity.

Embodiment 193. The distributed cell formation system of Embodiment 192, wherein a ratio of the negative electrode coulombic capacity to the positive electrode coulombic capacity is at least 1.2:1, at least 1.3:1, at least 1.5:1, at least 2:1, at least 3:1, at least 4:1, or at least 5:1.

Embodiment 194. The distributed cell formation system of Embodiment 192 or Embodiment 193, wherein a ratio of a coulombic capacity of the auxiliary electrode to the positive electrode coulombic capacity is at least 2:1.

Embodiment 195. The distributed cell formation system of Embodiment 192 or Embodiment 193, wherein a ratio of a coulombic capacity of the auxiliary electrode to the positive electrode coulombic capacity is at least 3:1.

Embodiment 196. The distributed cell formation system of Embodiment 192 or Embodiment 193, wherein a ratio of a coulombic capacity of the auxiliary electrode to the positive electrode coulombic capacity is at least 4:1.

Embodiment 197. The distributed cell formation system of Embodiment 192 or Embodiment 193, wherein a ratio of a coulombic capacity of the auxiliary electrode to the positive electrode coulombic capacity is at least 5:1.

Embodiment 198. The distributed cell formation system of any one of Embodiments 150-197, wherein the electrode active material layers or the counter-electrode active material layers of the lithium containing secondary battery include anodically active silicon or an alloy thereof.

Embodiment 199. The distributed cell formation system of any one of Embodiments 150-198, wherein the electrode active material layers or the counter-electrode active material layers of the lithium containing secondary battery include an anodically active material that includes silicon and contains a void volume fraction to accommodate volume expansion and contraction as lithium ions are incorporated into or leave the electrode active material layers or the counter-electrode active material layers during charging and discharging cycles of the lithium containing secondary battery.

Embodiment 200. The distributed cell formation system of Embodiment 199, wherein the void volume fraction of the anodically active material is at least 0.1.

Embodiment 201. The distributed cell formation system of Embodiment 199, wherein the void volume fraction of the anodically active material is not greater than 0.8.

Embodiment 202. The distributed cell formation system of Embodiment 199, wherein the void volume fraction of the anodically active material is about 0.15 to about 0.75.

Embodiment 203. The distributed cell formation system of Embodiment 199, wherein the void volume fraction of the anodically active material is about 0.2 to about 0.7.

Embodiment 204. The distributed cell formation system of Embodiment 199, wherein the void volume fraction of the anodically active material is about 0.25 to about 0.6.

Embodiment 205. The distributed cell formation system of Embodiment 199, wherein the anodically active material includes macroporous, microporous, or mesoporous material layers, or a combination thereof.

Embodiment 206. The distributed cell formation system of any one of Embodiments 150-205, wherein the separator structure includes a microporous separator between the electrode structure and the counter-electrode structure that is permeated with an electrolyte.

Embodiment 207. The distributed cell formation system of Embodiment 206, wherein the separator or the electrolyte includes a polymer-based electrolyte selected from one or more of PEO-based polymer electrolytes, and polymer-ceramic composite electrolytes.

Embodiment 208. The distributed cell formation system of Embodiment 206 or Embodiment 207, wherein the separator or the electrolyte includes an oxide-based electrolyte selected from one or more of lithium lanthanum titanate ($Li_{0.34}La_{0.56}TiO_3$), Al-doped lithium lanthanum zirconate ($Li_{6.24}La_3Zr_2Al_{0.24}O_{11.98}$), Ta-doped lithium lanthanum zirconate ($Li_{6.4}La_3Zr_{1.4}Ta_{0.6}O_{12}$), and lithium aluminum titanium phosphate ($Li_{1.4}Al_{0.4}Ti_{1.6}(PO_4)_3$).

Embodiment 209. The distributed cell formation system of any one of Embodiments 206-208, wherein the separator or the electrolyte includes a solid electrolyte selected from one or more of lithium tin phosphorus sulfide ($Li_{10}SnP_2S_{12}$), lithium phosphorus sulfide ($\beta$-$Li_3PS_4$), and lithium phosphorus sulfur chloride iodide ($Li_6PS_5Cl_{0.9}I_{0.1}$).

Embodiment 210. The distributed cell formation system of any one of Embodiments 206-209, wherein the separator or the electrolyte includes a solid-state lithium ion conducting ceramic.

Embodiment 211. The distributed cell formation system of any one of Embodiments 206-210, wherein the separator or the electrolyte includes a non-aqueous electrolyte selected from one or more of $LiClO_4$, $LiBF_4$, $LiPF_6$, $LiAsF_6$, $LiCl$, and $LiBr$; and organic lithium salts such as $LiB(C_6H_5)_4$, $LiN(SO_2CF_3)_2$, $LiN(SO_2CF_3)_3$, $LiNSO_2CF_3$, $LiNSO_2CF_5$, $LiNSO_2C_4F_9$, $LiNSO_2C_5F_{11}$, $LiNSO_2C_6F_{13}$, and $LiNSO_2C_7F_{15}$.

Embodiment 212. The distributed cell formation system of any one of Embodiments 150-211, wherein the electrode active material layers or the counter-electrode active material layers of the lithium containing secondary battery include an anodically active material selected from (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide, $ZnCo_2O_4$; (f) particles of graphite and carbon; (g) lithium metal; and (h) combinations thereof.

Embodiment 213. The distributed cell formation system of any one of Embodiments 150-212, wherein the electrode active material layers or the counter-electrode active material layers of the lithium containing secondary battery include an anodically active material selected from graphite, soft carbon, hard carbon, graphene, or any of a range of metals, semi-metals, alloys, oxides, nitrides, and compounds capable of intercalating lithium or forming an alloy with lithium.

Embodiment 214. The distributed cell formation system of any one of Embodiments 150-213, wherein the electrode active material layers or the counter-electrode active material layers of the lithium containing secondary battery include an anodically active material selected from tin, lead, magnesium, aluminum, boron, gallium, silicon, Si/C composites, Si/graphite blends, silicon oxide (SiOx), porous Si, intermetallic Si alloys, indium, zirconium, germanium, bismuth, cadmium, antimony, silver, zinc, arsenic, hafnium, yttrium, lithium, sodium, graphite, carbon, lithium titanate, palladium, and mixtures thereof.

Embodiment 215. The distributed cell formation system of any one of Embodiments 150-214, wherein the electrode active material layers or the counter-electrode active material layers of the lithium containing secondary battery include an anodically active material selected from aluminum, tin, or silicon, or an oxide thereof, a nitride thereof, a fluoride thereof, or other alloy thereof.

Embodiment 216. The distributed cell formation system of any one of Embodiments 150-215, wherein the electrode active material layers or the counter-electrode active material layers of the lithium containing secondary battery include an anodically active material selected from fibers of aluminum, tin, or silicon, or an alloy thereof.

Embodiment 217. The distributed cell formation system of any one of Embodiments 150-216, wherein the electrode active material layers or the counter-electrode active material layers of the lithium containing secondary battery include an anodically active material coated with a particulate lithium material selected from stabilized lithium metal particles.

Embodiment 218. The distributed cell formation system of any one of Embodiments 150-217, wherein the electrode active material layers or the counter-electrode active material layers of the lithium containing secondary battery include a cathodically active material that includes an intercalation-type chemistry active material, a conversion chemistry active material, or a combination thereof.

Embodiment 219. The distributed cell formation system of any one of Embodiments 150-218, wherein the electrode active material layers or the counter-electrode active material layers of the lithium containing secondary battery include a cathodically active material that includes a conversion chemistry material selected from one or more of S, LiF, Fe, Cu, Ni, $FeF_2$, $FeO_dF_{3.2d}$, $FeF_3$, $CoF_3$, $CoF_2$, $CuF_2$, $NiF_2$, where $0 \leq d \leq 0.5$.

Embodiment 220. The distributed cell formation system of any one of Embodiments 150-219, wherein the electrode active material layers or the counter-electrode active material layers of the lithium containing secondary battery include a cathodically active material that includes one or more of transition metal oxides, transition metal sulfides, transition metal nitrides, lithium-transition metal oxides, lithium-transition metal sulfides, and lithium-transition metal nitrides.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A cell formation system for lithium containing secondary batteries, each lithium containing secondary battery comprising a population of bilayers, an electrode busbar, and a counter-electrode busbar, wherein each bilayer of the population of bilayers comprises an electrode structure, a separator structure, and a counter-electrode structure, the electrode structure of each member of the bilayer population comprises an electrode current collector and an electrode active material layer, and the counter-electrode structure of each member of the bilayer population comprises a counter-electrode current collector and a counter-electrode active material layer, the cell formation system comprising:
a population of formation clusters, each formation cluster of the population of formation clusters including:
a connector configured for connecting to a lithium containing secondary battery;
a charging module connected to the connector and configured to charge the lithium containing secondary battery connected to the connector;
a pre-lithiation module connected to the connector and configured to diffuse lithium to the electrode active material layers of the lithium containing secondary battery connected to the connector;
a discharging module connected to the connector and configured to discharge the lithium containing secondary battery connected to the connector; and
a communication interface for communicatively coupling the formation cluster to a central controller, wherein in response to received instructions from the central controller, the formation cluster is configured to:
charge the lithium containing secondary battery connected to the connector using the charging module;
diffuse lithium to the electrode active material layers of the lithium containing secondary battery using the pre-lithiation module after the lithium containing secondary battery has been charged; and
discharge the lithium containing secondary battery using the discharging module after lithium has been diffused to the electrode active material layers of the lithium containing secondary battery using the pre-lithiation module.

2. The cell formation system of claim 1, wherein the central controller comprises a processor, a memory, and a controller communication interface for communicatively coupling the central controller to the population of formation clusters, wherein the central controller is programmed by instructions stored in the memory and executed by the processor to provide instructions to the population of formation clusters.

3. The cell formation system of claim 1, wherein each formation cluster further comprises a power connection configured for connection to a power source, wherein the power connection is coupled to the charging module, the pre-lithiation module, and the discharging module.

4. The cell formation system of claim 1, wherein each formation cluster further comprises a formation cluster controller including a processor and a memory, wherein the formation cluster controller is programmed by instructions stored in the memory and executed by the processor to control the charging module, the pre-lithiation module, and the discharging module in response to the received instructions from the central controller.

5. The cell formation system of claim 4, wherein the formation cluster controller comprises a microcontroller.

6. The cell formation system of claim 4, wherein each formation cluster further comprises at least one sensor, wherein the formation cluster controller is programmed receive a signal output by the at least one sensor and to transmit the received signal output to the central controller using the communication interface, and wherein the at least one sensor comprises a temperature sensor, a voltage sensor, or a current sensor.

7. The cell formation system of claim 1, wherein the charging module, the pre-lithiation module, and the discharging module of each formation cluster each further comprises a module controller including a processor and a memory, wherein each module controller is programmed by instructions stored in the memory and executed by the processor to control its associated one of the charging module, the pre-lithiation module, and the discharging module in response to the received instructions from the central controller.

8. The cell formation system of claim 7, wherein the module controllers comprise microcontrollers.

9. The cell formation system of claim 7, wherein each formation cluster further comprises at least one sensor, wherein at least one of the module controllers is programmed receive a signal output by the at least one sensor and to transmit the received signal output to the central controller using the communication interface.

10. The cell formation system of claim 9, wherein the at least one sensor comprises a temperature sensor, a voltage sensor, or a current sensor.

11. The cell formation system of claim 1, further comprising a housing supporting the population of formation clusters.

12. The cell formation system of claim 1, further comprising a communication network connected to the communication interface of each formation cluster of the population of formation clusters.

13. The cell formation system of claim 1, wherein the communication interface of each formation cluster of the population of formation clusters comprises a wireless communication interface.

14. The cell formation system of claim 1, further comprising a population of additional formation clusters, each additional formation cluster of the population of additional formation clusters including:
  a connector configured for connection to a lithium containing secondary battery;
  a charging module connected to the connector and configured to charge a lithium containing secondary battery connected to the connector;
  a pre-lithiation module connected to the connector and configured to diffuse lithium to the electrode active material layers of a lithium containing secondary battery connected to the connector;
  a discharging module connected to the connector and configured to discharge a lithium containing secondary battery connected to the connector; and
  a communication interface for communicatively coupling the formation cluster to the central controller, wherein in response to received instructions from the central controller, the formation cluster is configured to:
    charge a lithium containing secondary battery connected to the connector using the charging module;
    diffuse lithium to the electrode active material layers of the lithium containing secondary battery using the pre-lithiation module after the lithium containing secondary battery has been charged; and
    discharge the lithium containing secondary battery using the discharging module after lithium has been diffused to the electrode active material layers of the lithium containing secondary battery using the pre-lithiation module.

15. The cell formation system of claim 14, further comprising an additional housing supporting the population of additional formation clusters.

\* \* \* \* \*